US012118777B2

(12) United States Patent
Park et al.

(10) Patent No.: US 12,118,777 B2
(45) Date of Patent: *Oct. 15, 2024

(54) METHOD AND DEVICE FOR SITUATION AWARENESS

(71) Applicant: Seadronix Corp., Ulsan (KR)

(72) Inventors: Byeol Teo Park, Daejeon (KR); Han Keun Kim, Hwaseong-si (KR); Dong Hoon Kim, Daejeon (KR)

(73) Assignee: Seadronix Corp., Ulsan (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/364,281

(22) Filed: Aug. 2, 2023

(65) Prior Publication Data

US 2023/0377326 A1  Nov. 23, 2023

Related U.S. Application Data

(63) Continuation of application No. 17/976,296, filed on Oct. 28, 2022, now Pat. No. 11,776,250, which is a
(Continued)

(30) Foreign Application Priority Data

Dec. 20, 2018 (KR) .................. 10-2018-0165857
Dec. 20, 2018 (KR) .................. 10-2018-0165858
Dec. 20, 2018 (KR) .................. 10-2018-0165859

(51) Int. Cl.
  G06V 20/00 (2022.01)
  B63B 79/15 (2020.01)
  (Continued)

(52) U.S. Cl.
  CPC .............. G06V 20/00 (2022.01); B63B 79/15 (2020.01); G06F 18/21 (2023.01);
  (Continued)

(58) Field of Classification Search
  None
  See application file for complete search history.

(56) References Cited

U.S. PATENT DOCUMENTS 8,989,948 B2  3/2015  Huntsberger et al.
10,394,242 B2  8/2019  Kaspi et al.
(Continued)

FOREIGN PATENT DOCUMENTS

EP    2049873 B1  10/2012
EP    3291206 A1   3/2018
(Continued)

OTHER PUBLICATIONS

Bovcon, B. et al., "Stereo obstacle detection for unmanned surface vehicles by IMU-assisted semantic segmentation," arXiv preprint arXiv:1802.07956, Feb. 22, 2018, 14 pages.
(Continued)

Primary Examiner — Vikkram Bali
(74) Attorney, Agent, or Firm — WTA Patents

(57) ABSTRACT

A method for situation awareness is provided. The method comprises: preparing a neural network trained by a learning set, wherein the learning set includes a plurality of maritime images and maritime information including object type information which includes a first type index for a vessel, a second type index for a water surface and a third type index for a ground surface, and distance level information which includes a first level index indicating that a distance is undefined, a second level index indicating a first distance range and a third level index indicating a second distance range greater than the first distance range; obtaining a target maritime image generated from a camera; and determining a distance of a target vessel based on the distance level index
(Continued)

of the maritime information being outputted from the neural network which receives the target maritime image and having the first type index.

20 Claims, 43 Drawing Sheets

Related U.S. Application Data continuation of application No. 17/010,177, filed on Sep. 2, 2020, now Pat. No. 11,514,668, which is a continuation-in-part of application No. 16/557,859, filed on Aug. 30, 2019, now Pat. No. 10,803,360.

(60) Provisional application No. 62/741,394, filed on Oct. 4, 2018, provisional application No. 62/726,913, filed on Sep. 4, 2018.

(51) Int. Cl.
| | | |
|---|---|---|
| *G06F 18/21* | (2023.01) | |
| *G06F 18/2431* | (2023.01) | |
| *G06N 3/08* | (2023.01) | |
| *G06T 7/50* | (2017.01) | |
| *G06T 7/70* | (2017.01) | |
| *G08G 3/02* | (2006.01) | |
| *G06T 7/11* | (2017.01) | |

(52) U.S. Cl.
CPC .......... *G06F 18/2431* (2023.01); *G06N 3/08* (2013.01); *G06T 7/50* (2017.01); *G06T 7/70* (2017.01); *G08G 3/02* (2013.01); *G06T 7/11* (2017.01); *G06T 2207/20081* (2013.01); *G06T 2207/20084* (2013.01); *G06T 2207/30252* (2013.01)

(56) References Cited

U.S. PATENT DOCUMENTS

| 10,803,360 | B2 | 10/2020 | Park et al. |
|---|---|---|---|
| 2005/0134440 | A1 | 6/2005 | Breed |
| 2010/0332475 | A1 | 12/2010 | Birdwell et al. |
| 2017/0323154 | A1 | 11/2017 | Kollmann et al. |
| 2018/0025644 | A1 | 1/2018 | Jeong et al. |
| 2019/0258885 | A1 | 8/2019 | Piette et al. |
| 2020/0050893 | A1 | 2/2020 | Suresh et al. |

FOREIGN PATENT DOCUMENTS

| JP | 2004-175187 A | 6/2004 |
|---|---|---|
| JP | 2004-178258 A | 6/2004 |
| JP | 2009-122063 A | 6/2009 |
| JP | 2016-212849 A | 12/2016 |
| JP | 2017-215947 A | 12/2017 |
| KR | 10-2009-0035589 A | 4/2009 |
| KR | 10-2011-0059206 A | 6/2011 |
| KR | 10-2011-0113608 A | 10/2011 |
| KR | 10-1283759 B1 | 7/2013 |
| KR | 10-2014-0096595 A | 8/2014 |
| KR | 10-1452994 B1 | 10/2014 |
| KR | 10-2014-0126998 A | 11/2014 |
| KR | 10-2014-0133713 A | 11/2014 |
| KR | 10-2015-0125863 A | 11/2015 |
| KR | 10-2016-0001271 A | 1/2016 |
| KR | 10-2016-0129212 A | 11/2016 |
| KR | 10-2017-0031829 A | 3/2017 |
| KR | 10-2017-0065894 A | 6/2017 |
| KR | 10-1771146 B1 | 8/2017 |
| KR | 10-1772916 B1 | 8/2017 |
| KR | 10-2017-0117994 A | 10/2017 |
| KR | 10-2017-0133010 A | 12/2017 |
| KR | 10-1812994 B1 | 12/2017 |
| KR | 10-2018-0010633 A | 1/2018 |
| KR | 10-1805564 B1 | 1/2018 |
| KR | 10-2018-0065411 A | 6/2018 |
| KR | 10-2018-0081979 A | 7/2018 |

OTHER PUBLICATIONS

Daranda, A., "A Neural Network Approach to Predict Marine Traffic," Vilnius University Institute of Mathematics and Informatics Lithuania, Informatics Engineering (07 T), Oct. 2016, 26 pages, Technical Report MII-DS-07T-16-9-16.
Korean Intellectual Property Office, Notice of Allowance, Korean Patent Application No. 10-2018-0165861, Jul. 22, 2020, three pages.
Korean Intellectual Property Office, Notice of Allowance, Korean Patent Application No. 10-2018-0165859, Mar. 26, 2020, three pages.
Korean Intellectual Property Office, Notice of Allowance, Korean Patent Application No. 10-2019-0122817, Mar. 25, 2020, three pages (with concise explanation of relevance).
Korean Intellectual Property Office, Notice of Allowance, Korean Patent Application No. 10-2020-0058550, Jan. 6, 2021, three pages.
Korean Intellectual Property Office, Notification of Reason for Refusal, Korean Patent Application No. 10-2018-0165860, Mar. 15, 2019, seven pages.
Korean Intellectual Property Office, Notification of Reason for Refusal, Korean Patent Application No. 10-2018-0165858, Feb. 21, 2019, 22 pages.
Korean Intellectual Property Office, Notification of Reason for Refusal, Korean Patent Application No. 10-2020-0058550, Sep. 26, 2020, nine pages.
Korean Intellectual Property Office, Office Action, Korean Patent Application No. 10-2018-0165857, Jul. 31, 2020, 16 pages.
Korean Intellectual Property Office, Office Action, Korean Patent Application No. 10-2018-0165861, Feb. 11, 2020, nine pages (with concise explanation of relevance).
Korean Intellectual Property Office, Office Action, Korean Patent Application No. 10-2018-0165857, Jan. 30, 2020, 10 pages (with concise explanation of relevance).
Korean Intellectual Property Office, Office Action, Korean Patent Application No. 10-2019-0122817, Jan. 3, 2020, 10 pages (with concise explanation of relevance).
PCT International Search Report and Written Opinion, PCT Application No. PCT/KR2021/000036, Apr. 15, 2021, 17 pages.
PCT International Search Report, PCT Application No. PCT/KR2019/009244, Nov. 26, 2019, four pages (with concise explanation of relevance).
PCT International Search Report, PCT Application No. PCT/KR2019/009231, Nov. 26, 2019, four pages (with concise explanation of relevance).
PCT International Search Report, PCT Application No. PCT/KR2019/009241, Nov. 25, 2019, four pages (with concise explanation of relevance).
PCT International Search Report, PCT Application No. PCT/KR2019/013011, Jan. 17, 2020, four pages (with concise explanation of relevance).
Polvara, R. et al., "Obstacle Avoidance Approaches for Autonomous Navigation of Unmanned Surface Vehicles," The Journal of Navigation, Jan. 2018, pp. 241-256, vol. 71, No. 1.
United States Office Action, U.S. Appl. No. 16/557,859, filed Mar. 9, 2020, eight pages.
United States Office Action, U.S. Appl. No. 17/010,177, filed Jun. 20, 2022, five pages.

FIG. 8
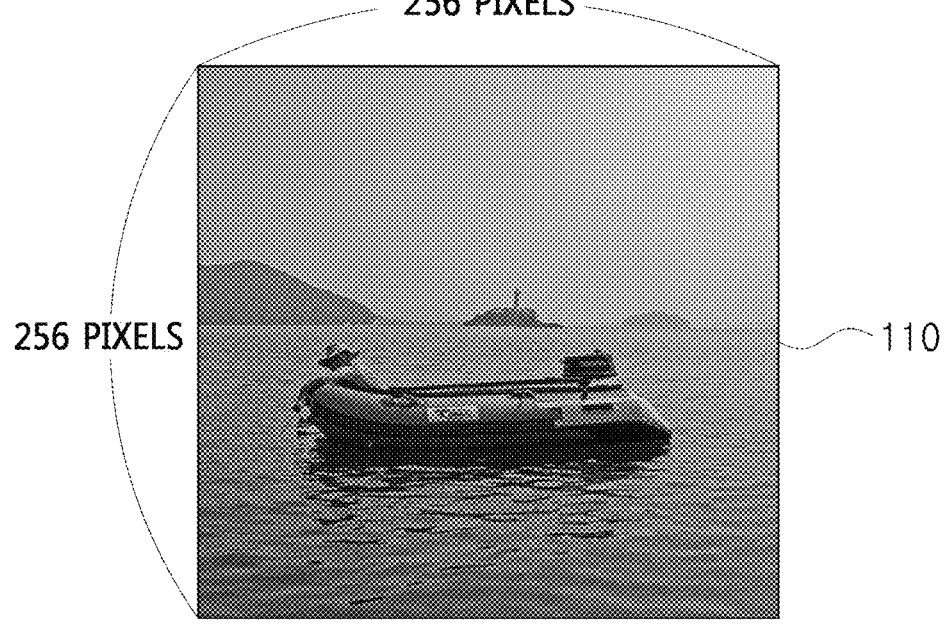
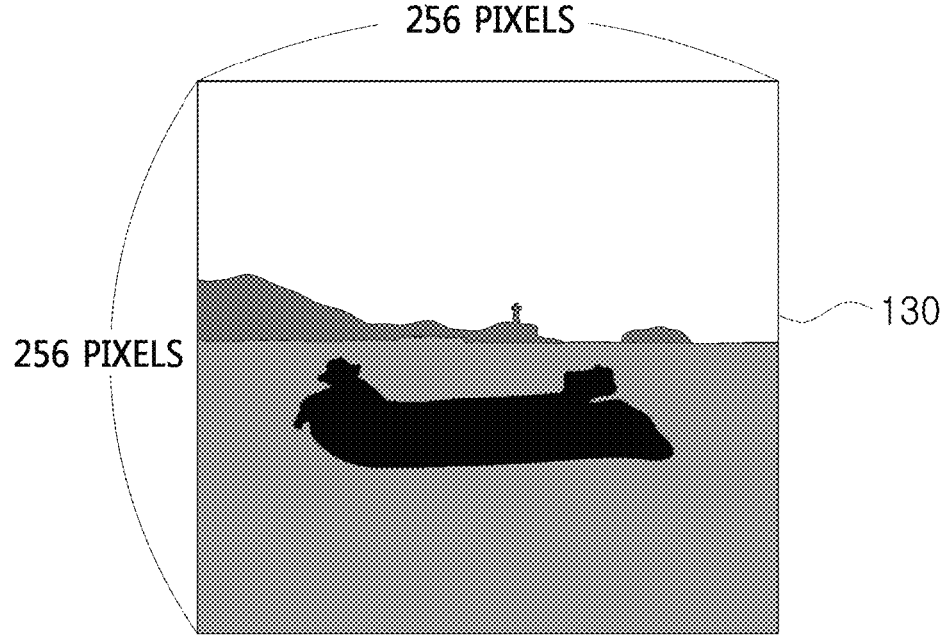

PATH-PLANNING

LOCAL MAP

FIG. 42
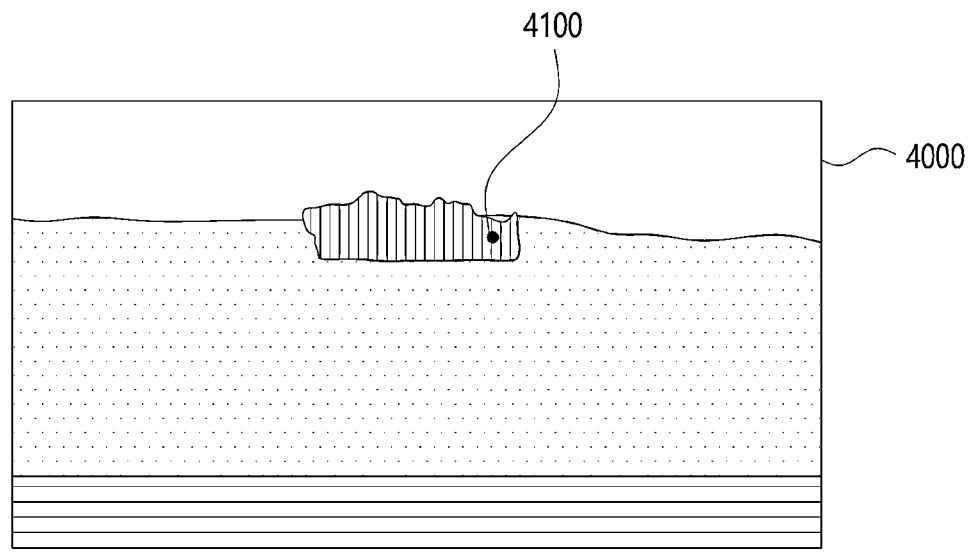
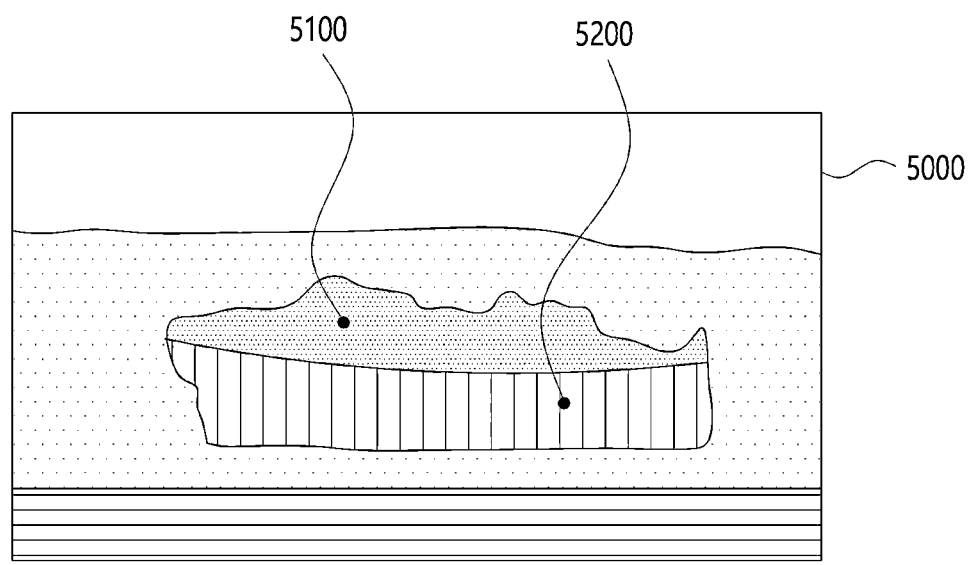

METHOD AND DEVICE FOR SITUATION AWARENESS

CROSS-REFERENCE TO RELATED APPLICATIONS

This application is a continuation of U.S. patent application Ser. No. 17/976,296, filed on Oct. 28, 2022, which is a continuation of U.S. patent application Ser. No. 17/010,177, filed on Sep. 2, 2020, which is a continuation-in-part of U.S. application Ser. No. 16/557,859, filed on Aug. 30, 2019, which claims the benefit of U.S. Provisional Application No. 62/726,913, filed on Sep. 4, 2018 and 62/741,394, filed on Oct. 4, 2018; and also claims priority to and the benefit of Republic of Korea Patent Application Nos. 10-2018-0165857, 10-2018-0165858 and 10-2018-0165859 all filed on Dec. 20, 2018, which are incorporated by reference in their entirety.

BACKGROUND OF THE INVENTION

1. Field of the Invention

The present invention relates to a situation awareness method and device using image segmentation and more particularly, to a situation awareness method and device using a neural network which performs image segmentation.

2. Description of the Related Art

Many accidents occur in vessel navigation, and the main cause thereof is known to be ship operators' carelessness. When autonomous ships which are not operated by humans and operate by themselves or unmanned ships are commercialized, marine accidents are expected to be remarkably reduced. To this end, global companies are carrying out autonomous ship development projects. Rolls-Royce are developing an autonomous ship in cooperation with Google, and Yara and Kongsberg of Norway, Nippon Yusen of Japan, etc. are also working on autonomous ship development.

To complete an autonomous ship, it is necessary to be able to sense an obstacle without depending on visual inspection. Although various kinds of obstacle sensors are currently used, there remain limitations due to low effectiveness. For example, an electronic chart display and information system (ECDIS) has limitations due to the inaccuracy of a global positioning system (GPS), update periods of an automatic identification system (AIS), moving objects which have not been registered in the AIS, etc., and a radar has limitations due to the presence of a non-observation region and noise. As a result, in order to accurately detect an obstacle, it is necessary to check an obstacle visually, which makes it difficult to complete an autonomous ship.

SUMMARY OF THE INVENTION

The present invention is directed to providing a situation awareness method and device using a neural network which performs image segmentation.

The present invention is directed to providing a learning method of a neural network for situation awareness.

Objectives of the present invention are not limited to those mentioned above, and objectives which have not been mentioned above should be clearly understood by those of ordinary skill in the technical field to which the present invention pertains from this specification and the appended drawings.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings.

FIGS. 6, 7, and 8 show examples of image segmentation according to an exemplary embodiment of the present invention.

FIG. 42 is a set of diagrams relating to an index which is set so that type information depends on distance information.

DETAILED DESCRIPTION

Figure 1:
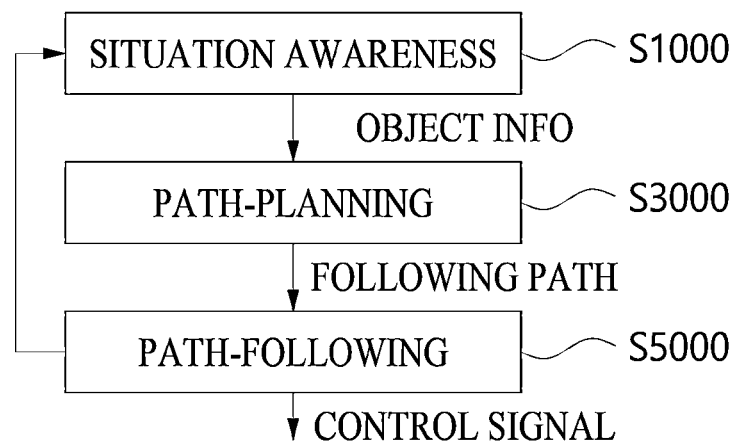
FIG. 1 is a block diagram relating to an autonomous navigation method according to an exemplary embodiment of the present invention.

Exemplary embodiments described herein are intended to clarify the spirit of the present invention to those of ordinary skill in the technical field to which the present invention pertains. Accordingly, the present invention is not limited to the exemplary embodiments described herein, and the scope of the present invention should be construed as including modifications or alterations within the spirit of the present invention.

Terminology used herein has been selected from among general terms which are widely used at the present time in consideration of functionality in the present invention but may vary according to intentions of those of ordinary skill in the art to which the present invention pertains, precedents, the advent of new technology, or the like. However, when a specific term is arbitrarily defined and used, the meaning of the term will be described. Therefore, terms used herein should not simply be defined literally but should be defined on the basis of the meanings thereof and the overall content of the present invention.

Drawings in this specification are intended to readily describe the present invention. Shapes shown in the drawings may be exaggerated as necessary to aid in understanding the present invention, and the present invention is not limited to the drawings. It will be also understood that, although the terms first, second, etc. may be used herein to describe various elements, these elements should not be limited by these terms. These terms are only used to distinguish one element from another. Thus, a first element could be termed a second element without departing from the technical spirit of the present invention.

When it is determined in this specification that detailed descriptions of known configurations or functions related to the present invention may obscure the gist of the present invention, the detailed descriptions will be omitted as necessary.

According to an aspect of the present invention, a method for learning a neural network performed by a computing means wherein the neural network receives a marine image and outputs information about a type and a distance of at least one object included in the marine image, the method may comprises: obtaining a marine image including a sea and an obstacle; obtaining a labelling data including a plurality of labelling values generated based on the marine image, wherein the plurality of labelling values includes at least one first labelling value corresponding to the sea and at least one second labelling value corresponding to the obstacle and determined by reflecting a type information and a distance information of the obstacle; obtaining an output data including a plurality of output values by using a neural network, wherein the neural network receives the marine image and outputs the output data, and the plurality of output values includes a first output value corresponding to the first labelling value and a second output value corresponding to the second labelling value; calculating an error value by using the labelling data and the output data, wherein the error value is calculated by considering the difference between the first labelling value and the first output value and the difference between the second labelling value and the second output value; and updating the neural network based on the error value; wherein the plurality of labelling values and the plurality of output values are selected from a plurality of identification values, and at least one identification value of the plurality of identification values is determined by a combination of information about a type and a distance of an object.

Herein, the error value may be calculated by considering the difference between the first labelling value and the first output value as a first weight and the difference between the second labelling value and the second output value as a second weight, and the first weight may decrease as the number of the first labelling value increases, and the second weight may decrease as the number of the second labelling value increases.

Herein, the marine image may further include a sky, the plurality of labelling values may further include at least one third labelling value corresponding to the sky, the plurality of output values may further include a third output value corresponding to the third labelling value, and the error value may not change when the difference between the third labelling value and the third output value changes.

Herein, the obtaining a labelling data may further include reflecting the second labelling value to the first labelling value.

Herein, the first labelling value may not include a distance information of the sea.

According to another aspect of the present invention, a method for learning a neural network performed by a computing means wherein the neural network receives an image and outputs information about a type and a distance of at least one object included in the image, the method may comprise: obtaining an image including a drivable region and an obstacle; obtaining a labelling data including a plurality of labelling values generated based on the image, wherein the plurality of labelling values includes at least one first labelling value corresponding to the drivable region and at least one second labelling value corresponding to the obstacle and determined by reflecting a type information and a distance information of the obstacle; obtaining an output data including a plurality of output values by using a neural network, wherein the neural network receives the image and outputs the output data, and the plurality of output values includes a first output value corresponding to the first labelling value and a second output value corresponding to the second labelling value; calculating an error value by using the labelling data and the output data, wherein the error value is calculated by considering the difference between the first labelling value and the first output value and the difference between the second labelling value and the second output value; and updating the neural network based on the error value; wherein the plurality of labelling values and the plurality of output values may be selected from a plurality of identification values, and at least one identification value of the plurality of identification values may be determined by a combination of information about a type and a distance of an object.

According to another aspect of the present invention, a method for situation awareness of a ship using a neural network performed by a computing means, the method may comprise: obtaining a marine image including a sailable region and an obstacle by a camera installed on a ship, wherein the marine image includes a first pixel corresponding to the sailable region and a second pixel corresponding to the obstacle; obtaining an output data by using a neural network performing image segmentation, wherein the neural network receives the marine image and outputs the output data, and the output data includes a first output value corresponding to the first pixel and a second output value corresponding to the second pixel and determined by reflecting a type information of the obstacle and a first distance information of the second pixel; obtaining a second distance information of the second pixel based on a location of the second pixel on the marine image and a position information of the camera, wherein the position information of the camera is calculated by considering a position information of the ship; and updating the second output value by reflecting a final distance information, wherein the final distance information may be calculated based on the first distance information and the second distance information.

Herein, the first distance information may be selected from a plurality of categories and the second distance information may be represented by a distance value, wherein each of the plurality of categories may include a distance range, and the updating the second output value may comprise: determining an error based on whether the second distance information is included in the first distance information; calculating the final distance information based on the error; and updating the second output value by reflecting the final distance information.

Herein, the calculating the final distance information may be calculating the first distance information as the final distance information when the error occurs.

Herein, the calculating the final distance information may be calculating a distance from the second distance information to a maximum value of the first distance information as the final distance information when the error does not occur.

According to another aspect of the present invention, an autonomous navigation method of a ship based on a marine image and a neural network may include an operation of obtaining a training image including a plurality of pixel values and labeling data corresponding to the training image and including a plurality of labeling values which are determined by reflecting type information and distance information of a training obstacle included in the training image, an operation in which the neural network receives the training image and outputs output data including a plurality of output values corresponding to the labeling values, an operation of training the neural network using an error function in which differences between the labeling values and the output values are taken into consideration, an operation of obtaining the marine image from a camera installed on the ship, an operation of obtaining type information and distance information of an obstacle included in the marine image using the neural network, the obstacle including a plurality of pixel values, an operation of obtaining direction information of the obstacle included in the marine image on the basis of locations of the pixel values of the obstacle on the marine image, an operation of obtaining a location of the obstacle included in the marine map on an obstacle map using the distance information and the direction information of the obstacle included in the marine image, an operation of generating the obstacle map using the location on the obstacle map, an operation of generating a following path followed by the ship using the obstacle map and ship status information including location information and position information of the ship, and an operation of generating a control signal including a propeller control signal and a heading control signal using the following path so that the ship may follow the following path.

Herein, the labeling values and the output values may be selected from among a plurality of identification values determined by combinations of the type information and the distance information of the obstacle.

Herein, distance information of the obstacle for determining the identification values may include a plurality of categories each having a distance range.

Herein, the control signal may be generated on the basis of at least one of a control signal of a previous frame, tidal current, and wind.

Herein, the autonomous navigation method may further include an operation of training a second neural network, which receives a following path and outputs a control signal, through reinforcement learning, and the control signal may be generated by the second neural network on the basis of a control signal of a previous frame.

Herein, the operation of generating the obstacle map may further use information on movement of the obstacle included in the marine image.

Herein, the operation of obtaining the marine image may include obtaining an image from the camera and generating the marine image by preprocessing the image, and the preprocessing may be defogging of the image.

According to another aspect of the present invention, an autonomous navigation method of a ship based on a marine image and a neural network may include an operation of obtaining a training image including a plurality of pixel values and labeling data corresponding to the training image and including a plurality of labeling values which are determined by reflecting type information and distance information of a training obstacle included in the training image, an operation in which the neural network receives the training image and outputs output data including a plurality of output values corresponding to the labeling values, an operation of training a first neural network using an error function in which differences between the labeling values and the output values are taken into consideration, an operation of training a second neural network which outputs a control signal using the type information and the distance information of the training obstacle, an operation of obtaining the marine image from a camera installed on the ship, an operation of obtaining type information and distance information of an obstacle included in the marine image using the first neural network, the obstacle including a plurality of pixel values, an operation of obtaining direction information of the obstacle included in the marine image on the basis of locations of the pixel values of the obstacle on the marine image, and an operation of generating a control signal including a propeller control signal and a heading control signal for the ship by inputting the type information, the distance information, direction information, and ship status information including location information and position information of the ship to the second neural network.

According to another aspect of the present invention, an autonomous navigation method of a ship using end-to-end learning may include: an operation of training a first neural network using training data including images, location information, and position information and labeling data including a propeller control signal and a heading control signal; an operation of obtaining a marine image from a camera installed on the ship; an operation of obtaining ship status information including location information and position information of the ship; and an operation of generating a control signal, which includes a propeller control signal and a heading control signal for the ship, using the first neural network, wherein the first neural network may include at least one of object information of obstacles including distance information of the obstacles, information on an obstacle map, and information on a path followed by the ship.

Herein, the autonomous navigation method may further include an operation of obtaining at least one of the object information, the information on an obstacle map, and the information on a path followed by the ship from the first neural network.

According to another aspect of the present invention, a method of processing an obstacle map related to a sailing path of a ship may include an operation of obtaining an obstacle map including a plurality of unit regions to which weights used for setting the sailing path are allocated, an operation of obtaining a marine image of the sea, an operation of obtaining distance information and type information of an obstacle included in the marine image from the marine image using a neural network which is trained to output result values reflecting a distance and a type of object included in an image, an operation of obtaining location information of the obstacle on the basis of the distance information of the obstacle obtained from the neural network and a direction in which the marine image has been captured, and an operation of setting weights of first unit regions corresponding to a zone within a sensing range of the marine image among the unit regions, wherein when the first unit regions are 1-1 unit regions corresponding to a zone detected in the marine image, the weights may be set on the basis of the location information of the obstacle, and when the first unit regions are 1-2 unit regions corresponding to a zone occluded by the obstacle, the weights may be set on the basis of the type information of the obstacle.

Herein, in the operation of setting weights of the first unit regions, when the 1-1 unit regions correspond to a location of the obstacle on the basis of the location information of the obstacle, the weights may be set to a first value reflecting unsuitability for sailing, and when the 1-1 unit regions do not correspond to the location of the obstacle on the basis of the location information of the obstacle, the weights may be set to a second value reflecting suitability for sailing.

Herein, in the operation of setting weights of the first unit regions, an area occupied by the obstacle may be determined according to the type information of the obstacle, and the weights may be set to the first value when the 1-2 unit regions correspond to the area occupied by the obstacle and may be set to a third value between the first value and the second value when the 1-2 unit regions do not correspond to the area occupied by the obstacle.

According to another aspect of the present invention, a method of processing an obstacle map related to a sailing path may include: an operation of obtaining an obstacle map including a plurality of unit regions to which weights reflecting sailing suitability used for setting the sailing path are allocated in a range between a first value indicating the maximum sailing suitability and a second value indicating the minimum sailing suitability; an operation of obtaining a marine video including a plurality of consecutive marine images; an operation of obtaining obstacle information related to a distance and a type of obstacle included in the plurality of marine images from the plurality of marine images using a neural network which is trained to output result values reflecting a distance and a type of object included in an image; an operation of obtaining, from a first marine image, the obstacle map in which the obstacle information obtained using the neural network has been applied to the weights of the plurality of unit regions; and an operation of updating the weights of the plurality of unit regions using the obstacle information obtained using the neural network from a second marine image captured after the first marine image, wherein when the plurality of unit regions corresponds to a zone within a sensing range of the second marine image, the weights may be updated by considering the obstacle information related to the second marine image, and when the plurality of unit regions corresponds to a zone not within the sensing range of the second marine image, the weights may be updated by considering the obstacle information related to the first marine image.

Herein, the operation of updating the weights by considering the obstacle information related to the second marine image may include an operation of overriding the weights with values set according to the obstacle information related to the second marine image, and the operation of updating the weights by considering the obstacle information related to the first marine image may include any one of a first operation of adjusting the weights to a third value between the first value and the second value by considering the obstacle information related to the first marine image and a second operation of maintaining the weights.

Herein, the operation of updating the weights by considering the obstacle information related to the first marine image may include an operation of performing the second operation on unit regions corresponding to a stationary obstacle included in the first marine image.

Herein, the zone within the sensing range of the second marine image may include a zone detected in the second marine image and a zone not detected in the second marine image, and the undetected zone may include a zone occluded by an obstacle included in the second marine image.

According to another aspect of the present invention, a method of generating a sailing path in relation to obstacle avoidance of a ship may include: an operation of obtaining an obstacle map including a plurality of unit regions to which weights used for generating the sailing path are allocated; an operation of obtaining a marine image using a camera installed on the ship; an operation of obtaining object information, which includes type information and distance information, of an obstacle included in the marine image using a neural network to which the marine image is input; an operation of obtaining direction information of the obstacle on the basis of a location of the obstacle on the marine image; an operation of obtaining location information of the obstacle on the obstacle map using the distance information and the direction information; an operation of setting an update region of the obstacle map on the basis of a location and a direction of the camera which are dependent on a location and a direction of the ship, respectively; an operation of updating weights of unit regions included in the update region using the location information and the obstacle map; and an operation of generating a following path followed by the ship by considering the weights and ship status information which includes location information and position information of the ship.

Herein, the object information may further include information on a movement direction of the obstacle, and the operation of updating weights of the unit regions may include an operation of updating the weights of the unit regions included in the update region by additionally using the information on the movement direction.

Herein, the operation of updating weights of the unit regions may include an operation of updating the weights of the unit regions included in the update region by additionally using information on sailing regulations.

Herein, the method may further include an operation of obtaining weather environment information including at least one of tidal current and wind, and the operation of updating weights of the unit regions may include an operation of updating the weights of the unit regions included in the update region by additionally using the weather environment information.

According to another aspect of the present invention, a method for situation awareness may comprises: preparing a neural network trained by a learning set, wherein the learning set may include a plurality of maritime images and maritime information including object type information which includes a first type index for a vessel, a second type index for a water surface and a third type index for a ground surface, and distance level information which includes a first level index indicating that a distance is undefined, a second level index indicating a first distance range and a third level index indicating a second distance range greater than the first distance range, wherein pixels, in the plurality of maritime images, being labeled with the first type index, may be labeled with the second level index or the third level index, and pixels, in the plurality of maritime images, being labeled with the first level index, may be labeled with the second type index or the third type index; obtaining a target maritime image generated from a camera, the camera being installed on a port or a vessel and monitoring surroundings thereof; and determining a distance of a target vessel in the surroundings based on the distance level index of the maritime information being outputted from the neural network which receives the target maritime image and having the first type index.

Herein, the object type information may further include a fourth type index for a top surface of a vessel and a fifth type index for a side surface of a vessel, and pixels, in the plurality of maritime images, being labeled with the first type index, may be labeled with the third level index, and pixels, in the plurality of maritime images, being labeled with the fourth type index or the fifth type index, may be labeled with the second level index.

Herein, the object type information may further include a fourth type index for a top surface of a vessel and a fifth type index for a side surface of a vessel, and pixels, in the plurality of maritime images, being labeled with the first type index and the second level index, may be labeled with one of the fourth type index and the fifth type index.

Herein, the object type information may further include a fourth type index for a crane, and pixels, in the plurality of maritime images, being labeled with the fourth type index, may be labeled with the first type index or the third type index.

Herein, the method may further comprise: detecting a water surface in the surroundings, using the neural network, from the target maritime image, according to the object type information of the maritime information being outputted from the neural network based on the target maritime image and having the second type index; and determining a distance to the detected water surface as an undefined distance.

Herein, the determining may comprise ignoring the distance level information of the maritime information being outputted from the neural network based on the target maritime image and having the second type index.

Herein, the maritime information may further include an object identifier, and pixels, in the plurality of maritime images, being labeled with the first type index and the second level index, may be labeled with the object identifier.

Herein, the pixels being labeled with the first type index and the second level index may include one or more first pixels and one or more second pixels, and the object identifier labeled to the first pixels may be different from the object identifier labeled to the second pixels.

Herein, the method may further comprise: generating an obstacle map based on the measured distance of the vessel, wherein the target vessel is reflected on the obstacle map when the outputted distance level index corresponds to the second level index.

Herein, the determining may comprise obtaining distance information of the target vessel based on at least one of a location of the target vessel on the target maritime image and a position information of the camera, and the distance of the target vessel may be determined further based on the obtained distance information.

Herein, the obtained distance information may be represented by a distance value, the determining further may comprise determining an error based on whether the obtained distance information is included in the outputted distance level index, and the distance of the target vessel may be determined further based on the error.

Herein, when the error occurs, the distance of the target vessel may be determined as a distance range corresponding to the outputted distance level index, and when the error does not occur, the distance of the target vessel may be determined as a distance range from the distance value to a maximum value of the distance range corresponding to the outputted distance level index.

According to another aspect of the present invention, a device for situation awareness may comprises: a memory for storing a neural network trained by a learning set, wherein the learning set may include a plurality of maritime images and maritime information including object type information which includes a first type index for a vessel, a second type index for a water surface and a third type index for a ground surface, and distance level information which includes a first level index indicating that a distance is undefined, a second level index indicating a first distance range and a third level index indicating a second distance range greater than the first distance range, wherein pixels, in the plurality of maritime images, being labeled with the first type index, may be labeled with the second level index or the third level index, and pixels, in the plurality of maritime images, being labeled with the first level index, may be labeled with the second type index or the third type index; and a controller configured to: obtain a target maritime image generated from a camera, the camera being installed on a port or a vessel and monitoring surroundings thereof; and determine a distance of a target vessel in the surroundings based on the distance level index of the maritime information being outputted from the neural network which receives the target maritime image and having the first type index.

According to another aspect of the present invention, a method for situation awareness may comprises: preparing a neural network trained by a learning set, wherein the learning set may include a plurality of maritime images and maritime information including: object type information which includes a first type index for a vessel and a second type index for a water surface, distance level information which includes a first level index indicating that a distance is undefined, a second level index indicating a first distance range and a third level index indicating a second distance range greater than the first distance range, and surface type information which includes a first surface index for a side surface of a vessel and a second surface index for a top surface of a vessel, wherein the first surface index and the second surface index may be only labeled to pixels being labeled with the first type index and the second level index; obtaining a target maritime image generated from a camera which is installed on a port or a vessel and monitors surroundings thereof; detecting the vessel in the surroundings based on the object type information of the maritime information being outputted from the neural network which receives the target maritime image and having the first type index; determining a distance to the detected vessel based on the distance level information of the maritime information being outputted from the neural network which receives the target maritime image and having the first type index; and detecting a boundary of the detected vessel based on the surface type information of the maritime information being outputted from the neural network which receives the target maritime image and having the first type index and the second level index.

Herein, the boundary of the detected vessel may correspond to a boundary between a side surface of the detected vessel and a top surface of the detected vessel.

According to another aspect of the present invention, a method for measuring a distance may comprise: preparing a neural network trained by a learning set including a plurality of images and object information labeled to pixels of the plurality of images, wherein at least a portion of the plurality of images may include at least a portion of a reference object being located at a lower portion of the at least the portion of the plurality of images, a moving object and a drivable area, and the object information may reflect an object type and a relative proximity level from the reference object, wherein pixels corresponding to the moving object may be labeled with the object information of which the object type indicates the moving object and of which the relative proximity level indicates a corresponding section where the moving object is disposed among a plurality of sections dividing the drivable area, wherein the plurality of sections may be sequentially arranged from a borderline between the drivable area and the reference object to an upper boundary of the drivable area, and wherein pixels corresponding to the drivable area may be labeled with the object information of which the object type indicates the drivable area and of which the relative proximity level indicates that a proximity is undefined; obtaining a target image; calculating the object information related to the target image from the target image by using the neural network; detecting the moving object in the target image based on the calculated object information; and determining a proximity of the moving object in the target image based on the relative proximity level being reflected by the calculated object information.

Herein, the relative proximity level may include a first proximity level and a second proximity level indicating further proximity than the first proximity level.

Herein, the target image may be captured by a camera which is installed on a port or a vessel, and the reference object is one of the port or the vessel where the camera is installed.

Herein, one or more boundaries between two adjacent sections may be formed considering a shape of the reference object.

Hereinafter, an autonomous navigation method and device using image segmentation according to an exemplary embodiment of the present invention will be described.

For autonomous navigation of a moving object according to an exemplary embodiment of the present invention, the moving object may perform situation awareness, path planning, and path-following operations. The moving object may determine surrounding obstacles and/or a navigable region through situation awareness, generate a path on the basis of the surrounding obstacles and/or navigable region, and then travel by itself along the generated path.

FIG. 1 is a block diagram relating to an autonomous navigation method according to an exemplary embodiment of the present invention. Referring to FIG. 1, a moving object may obtain object information through a situation awareness operation S1000, obtain a following path on the basis of the obtained object information through a path-planning operation S3000, generate a control signal on the basis of the obtained following path through a path-following operation S5000, and travel autonomously.

The aforementioned operations may be consecutively performed for autonomous navigation of the moving object. One cycle of the situation awareness operation S1000, the path-planning operation S3000, and the path-following operation S5000 will be described as one frame.

Among the types of autonomous navigation of moving objects, autonomous navigation of a ship will be mainly described below. However, autonomous navigation is not limited to a ship and may be applied to various moving objects, such as a car and a drone.

Autonomous navigation may be performed using a neural network. A neural network is an algorithm modeled after the neural network structure of human brain. A neural network may include one or more layers including one or more nodes or neurons, and the nodes may be connected through synapses. Data input to a neural network (input data) may be passed through synapses and output through nodes (output data), and information may be obtained accordingly.

The types of neural networks include a convolutional neural network (CNN) which extracts features using a filter and a recurrent neural network (RNN) which has a structure in which an output of a node is fed back as an input. Besides, there are various types of neural networks, such as a restricted Boltzmann machine (RBM), a deep belief network (DBN), a generative adversarial network (GAN), and a relation network (RN).

Before using a neural network, it is necessary to train the neural network. Alternatively, it is possible to train a neural network while using another neural network. An operation of training a neural network will be referred to as a training operation, and an operation of using the neural network will be referred to as an inference operation.

There are various learning methods of a neural network, such as supervised learning, unsupervised learning, reinforcement learning, and imitation learning. Reinforcement learning may be referred to as a Markov decision process. Alternatively, reinforcement learning may refer to a method for an agent to maximize a reward in a certain environment.

Figure 2:
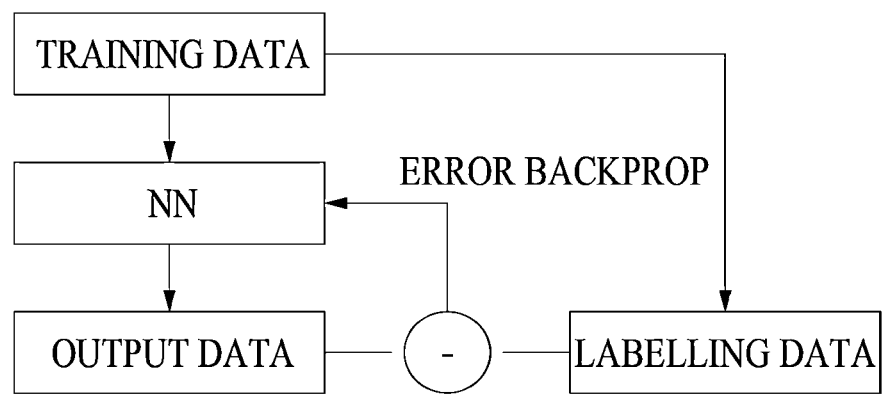
FIG. 2 is a block diagram relating to a learning operation of a neural network according to an exemplary embodiment of the present invention.

FIG. 2 is a block diagram relating to supervised learning as an example of a learning operation of a neural network according to an exemplary embodiment of the present invention. Referring to FIG. 2, an untrained neural network may receive training data, output output data, compare the output data with labeling data, backpropagate the error, and thus be trained. The training data may include an image, and the labeling data may include ground truth. Alternatively, the labeling data may be data generated by a user or a program.

Figure 3:
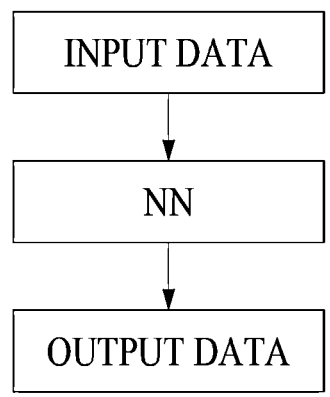
FIG. 3 is a block diagram relating to an inference operation of a neural network according to an exemplary embodiment of the present invention.

FIG. 3 is a block diagram relating to an inference operation of a neural network according to an exemplary embodiment of the present invention. Referring to FIG. 3, a trained neural network may receive input data and output output data. Information which is inferable in the inference operation may vary according to information of training data in a learning operation. Also, the accuracy of the output data may vary according to the degree of learning of the neural network.

Figure 4:
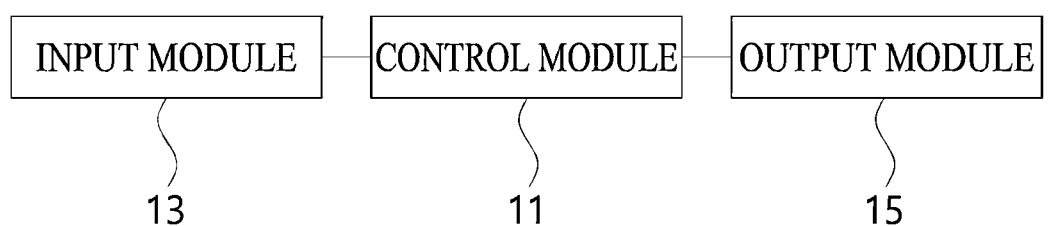
FIG. 4 is a block diagram of a system which performs calculation related to situation awareness, autonomous navigation, etc. according to an exemplary embodiment of the present invention.

FIG. 4 is a block diagram of a system 10 which performs calculation related to situation awareness, autonomous navigation, etc. according to an exemplary embodiment of the present invention. The system 10 may perform training and/or inference of a neural network.

Referring to FIG. 4, the system 10 may include a control module 11, an input module 13, and an output module 15.

The control module 11 may perform a neural network's learning, inference, image segmentation, situation awareness based thereon, path planning, such as obstacle map update and path generation, control signal generation for path following, autonomous navigation, and the like. Also, it is possible to perform an operation of receiving various inputs through the input module 13, an operation of outputting various outputs through the output module 15, and an operation of storing various data in a memory or obtaining various data from the memory under the control of the control module 11. Various operations or steps set forth herein as embodiments may be construed as being performed by the control module 11 or under the control of the control module 11 unless specifically mentioned.

The input module 13 may receive information from the outside of the system 10. As an example, the input module 13 may be a ship sensor system which will be described below but is not limited thereto.

The output module 15 may output results of calculation and the like performed by the control module 11. For example, the output module 15 may output an image, such as a marine image, image segmentation results, a control signal, and the like. For example, the output module 15 may be a display, a signal output circuit, and the like but is not limited thereto.

The input module 13 and the output module 15 may be separate modules but may be implemented as one module. For example, the input module 13 and the output module 15 may be implemented as one integrated module, which may receive information from the outside and output results of calculation and the like performed by the control module 11.

The control module 11, the input module 13, and the output module 15 may include a controller. The controller may process and calculate various information and control components of the modules. The controller may be physically provided in the form of an electronic circuit which processes an electrical signal. The modules may physically include only a single controller but, to the contrary, may include a plurality of controllers. As an example, the controller may be one or more processors installed in one computing means. As another example, the controller may be provided as processors which are installed on a server and a terminal physically separate from each other and cooperate with each other through communication.

The control module 11, the input module 13, and the output module 15 may include a communicator. The modules may transmit and receive information through the communicator. As an example, the input module 13 may transmit information obtained from the outside through the communicator, and the control module 11 may receive the information transmitted by the input module 13 through the communicator. As another example, the control module 11 may transmit a calculation result through the communicator, and the output module 15 may receive the information transmitted by the control module 11 through the communicator. The communicator may perform wired or wireless communication. The communicator may perform bidirectional or unidirectional communication.

The control module 11, the input module 13, and the output module 15 may include a memory. The memory may store various processing programs, parameters for processing of the programs, the processing result data, or the like. For example, the memory may store data required for training and/or inference, a neural network in which learning is in progress or completed, and the like. The memory may be implemented as a non-volatile semiconductor memory, a hard disk, a flash memory, a random access memory (RAM), a read only memory (ROM), an electrically erasable programmable read-only memory (EEPROM), a tangible non-volatile recording medium, or the like.

The system 10 shown in FIG. 4 is only an example, and a configuration of the system 10 is not limited thereto.

When a neural network is used for autonomous navigation, referring to FIG. 1, the situation awareness operation S1000, the path-planning operation S3000, or the path-following operation S5000 may be performed by the neural network. Alternatively, two or more of the aforementioned operations may be performed by the neural network, or one thereof may be performed by a plurality of neural networks. When a plurality of neural networks is used, the neural networks may be connected in parallel or series. For example, when the neural networks are connected in series, an output of one neural network may be an input to another neural network.

The situation awareness operation, the path-planning operation, and the path-following operation will be described in detail below. In order to perform an autonomous navigation method, it is unnecessary to perform all of the following operations. Only some of the operations may be performed, and a specific operation may be performed repeatedly.

For sailing of a ship, it is necessary to find obstacles and/or a sailable region through situation awareness, and this is the same for autonomous navigation. Obstacles refer to all objects which hinder sailing such as geographical features, structures, ships, buoys, and people. Situation awareness is not only to detect an obstacle but also to obtain information on surroundings of the ship. Detecting an obstacle is to obtain information about whether there is an obstacle, the type of obstacle, a location of an obstacle, and the like.

Figure 5:
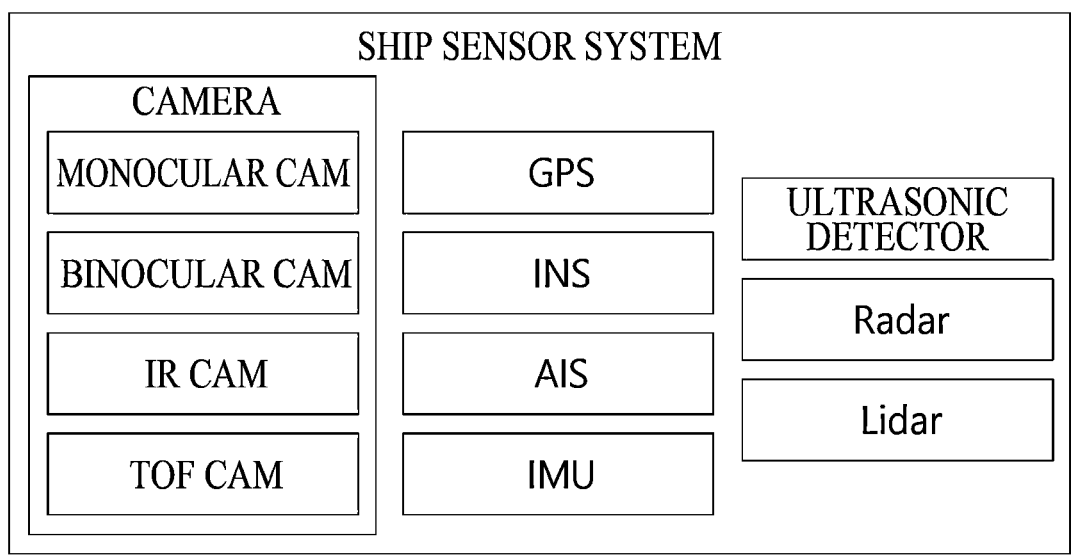
FIG. 5 is a block diagram of a ship sensor system according to an exemplary embodiment of the present invention.

FIG. 5 is a block diagram of a ship sensor system according to an exemplary embodiment of the present invention. Referring to FIG. 5, during sailing of a ship, an obstacle detection sensor, such as radar, light detection and ranging (LiDAR), or an ultrasonic detector, and an automatic identification system (AIS) are used in general.

In addition, it is possible to detect an obstacle using a camera. Referring to FIG. 5, examples of a camera include a monocular camera, a binocular camera, an infrared (IR) camera, and a time-of-flight (TOF) camera but are not limited thereto.

As a method of detecting an obstacle with an image obtained from a camera, image segmentation may be used. A situation awareness operation performed using image segmentation will be described in detail below.

Image segmentation may be to divide an image into regions according to an attribute. Alternatively, image segmentation may be a process of allocating an attribute value to each pixel of an image. For example, the attribute may be a type of object. In this case, image segmentation may divide an object included in an image into pixels. Alternatively, image segmentation may indicate which object corresponds to a specific pixel.

Image segmentation may be performed using a neural network. One neural network may be used, or a plurality of neural networks may separately perform image segmentation, and the results may be combined for situation awareness. As the network structure of a neural network for image segmentation, various structures, such as an efficient neural network (ENet) and its variations, may be used.

The case of performing the situation awareness operation S1000 of FIG. 1 through image segmentation based on a neural network will be described in detail below.

A neural network which performs image segmentation to sense surroundings may receive an image and output object information. Referring to FIGS. 2 and 3, training data and input data may be in the form of an image, which may include a plurality of pixels. Output data and labeling data may be object information. Additionally, it is possible to visually deliver information by visualizing output data and labeling data.

Any kind of image may be used to perform image segmentation. The image may be an image captured by a camera. Referring to FIG. 5, it is possible to use images obtained from various cameras, such as a monocular camera, a binocular camera, an IR camera, and a TOF camera. Also, the image is not limited to a two-dimensional (2D) image and may be a three-dimensional (3D) image or the like.

When image segmentation is performed once, only one image may be input. Alternatively, a plurality of images may be input.

The image captured by the camera may be preprocessed and then input to the neural network. Preprocessing refers to any kind of processing performed on a captured image and may include image normalization, image resizing, cropping, noise removal, image defogging, fine dust removal, salt removal, waterdrop removal, and combinations thereof. As an example of preprocessing, defogging may be converting an image of a foggy area into an image of a clear area through preprocessing. As another example of preprocessing, normalization may be averaging red, green, blue (RGB) values of entire pixels of an RGB image and subtracting the average from the RGB image. Waterdrop removal may be removing waterdrops from an image showing waterdrops on the lens of a camera through preprocessing, removing raindrops from an image captured on a rainy day through preprocessing, and the like. Performance and/or accuracy of the neural network may be improved through such image preprocessing.

A method of preprocessing an image and then inputting the preprocessed image to a neural network has been described above. However, a neural network including a preprocessing operation may be trained and used. For example, a neural network may be trained to output a result as if an image of a clear area was input even when an image of a foggy area is input to the neural network.

Output data and/or labeling data of the neural network may correspond to an input image and/or a training image, respectively. Also, output data and labeling data may correspond to each other.

Output data and labeling data may include a plurality of pieces of information. Alternatively, output data and labeling data may be determined on the basis of a plurality of pieces of information.

Output data and labeling data may include a plurality of output values and a plurality of labeling values, respectively. The output values and the labeling values may include a plurality of pieces of information. Alternatively, the output values and the labeling values may be determined on the basis of a plurality of pieces of information.

Output values and labeling values may correspond to pixels of an image input to the neural network. Also, the output values and the labeling values may correspond to each other.

The number of output values and the number of labeling values are identical to the number of pixels of an input image. For example, when a 256×256 pixel image is input, the number of output values and the number of labeling values may be 256×256=65,536. Alternatively, the number of output values and the number of labeling values may be n times (n is an integer) the number of pixels of an input image. A case in which the number of output values and the number of labeling values are identical to the number of pixels of an input image will be mainly described. However, the present invention is not limited to this case, and the number of pixels, the number of output values, and the number of labeling values may differ from each other.

Output data and labeling data may be object information. The term "object information" refers to information on an attribute of an object included in an image, and any information relating to the object may be the object information.

Objects may include obstacles, such as geographical features, structures, ships, buoys, and people, a zone in which a ship may sail, such as the ocean, and a zone which may not be related to sailing of a ship, such as the sky. The information may be any kind of information, such as whether there is an object, a type of object, the location of an object, the movement direction of an object, the movement speed of an object, and navigation mark information. The navigation mark information may include a lateral mark, cardinal marks, an isolated danger mark, a safe water mark, a special mark, and other marks. The location of an object may include the distance and the direction to the object and may be a relative location or an absolute location. Object information may include only some or all of the objects and the pieces of information. For example, information on an obstacle among objects may be referred to as obstacle information.

Among the pieces of object information, location information will be described in detail below.

When location information is learned in the training operation of a neural network, it is possible to infer location information. The location information is information related to the location of an object. For example, location information may be a distance and/or a direction. Alternatively, location information may be coordinates at which an object is present.

Distance information of an object may be the distance from a camera, which captures an image of the object, to the object. Alternatively, distance information of an object may be the distance from an arbitrary point to the object. Direction information of an object may be the angle between the object and a camera which captures an image of the object. Alternatively, direction information of an object may be the angle between an arbitrary point and the object.

Location information may be a relative location of an object or an absolute location of the object.

Figure 6:
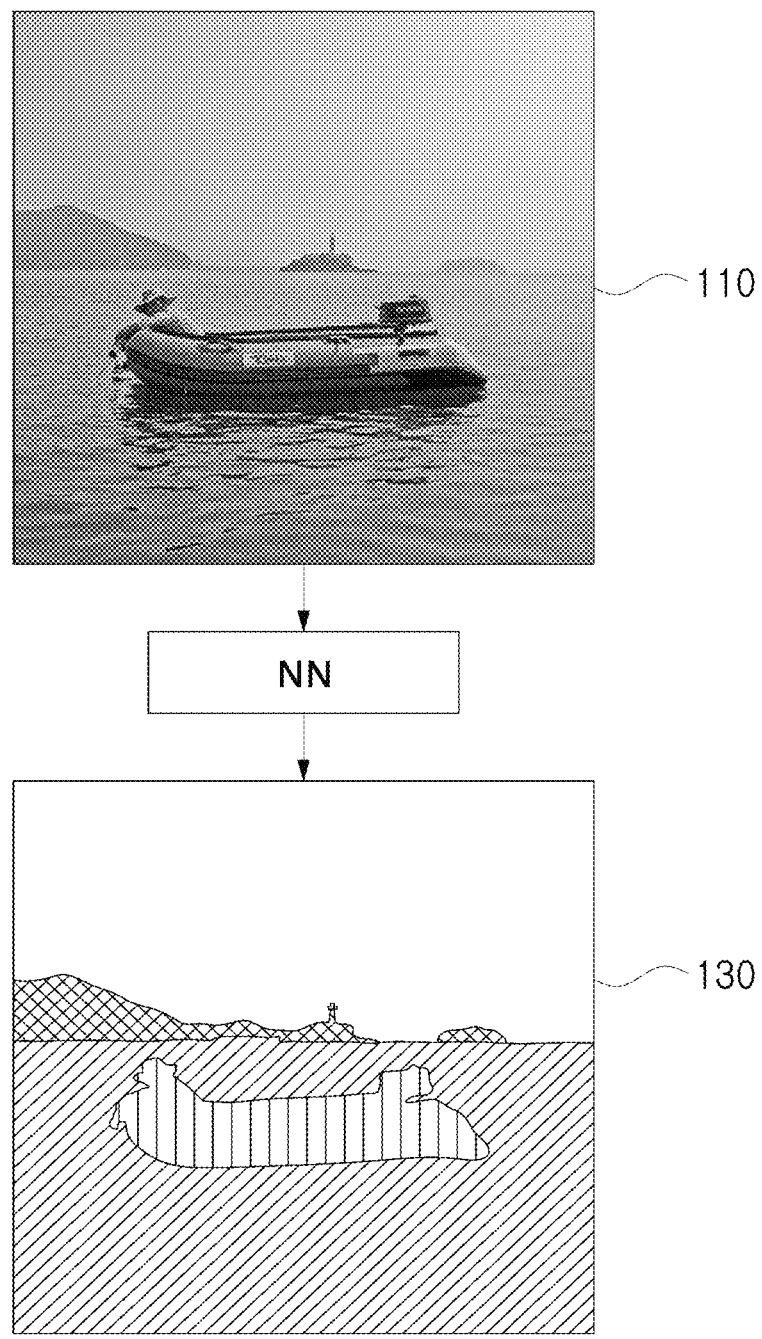

It is possible to obtain location information of an object included in an image through image segmentation. Alternatively, it is possible to obtain location information of pixels or pixel groups in an image. FIG. 6 is a diagram relating to image segmentation according to an exemplary embodiment of the present invention. Referring to FIG. 6, output data 130 in which an input image 110 has been divided according to a specific attribute may be obtained through image segmentation. The input image 110 includes objects including two ships, the sea, and the land, and the output data 130 in which the objects are discriminated according to types and distances may be obtained by inputting the input image 110 to the neural network. For example, the two ships having different pieces of distance information may be shown to be different in the output data 130.

FIG. 6 is an example of a location information presentation method based on image segmentation. Location information may be also presented in various other ways. Location information may include only distance information or may include other object information, such as direction information, whether there is an object, and a type of object, in addition to the distance information.

Figure 7:
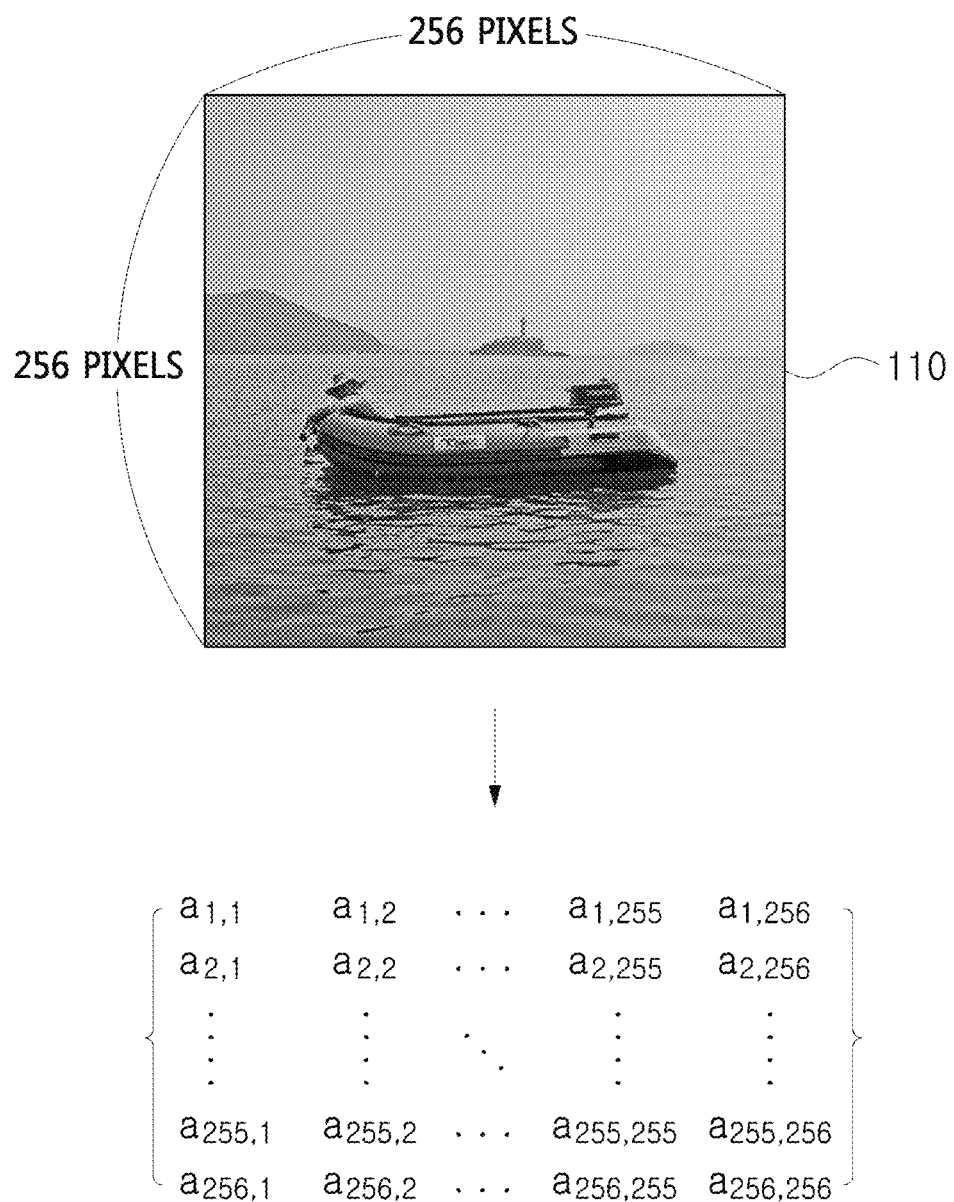

FIGS. 7 and 8 are diagrams relating to image segmentation according to an exemplary embodiment of the present invention. Exemplary embodiments for presenting location information will be described below with reference to FIGS. 7 and 8, but the presentation method is not limited thereto.

Location information may be presented as a plurality of categories having a certain range. For example, distance information may be presented as short distance, middle distance, long distance, and the like, and direction information may be presented as a left direction, a forward direction, a right direction, and the like. It is also possible to combine location information and direction information and present the combination as short distance to the left side, long distance to the right side, and the like.

The category may be presented in numbers. For example, among the pieces of distance information, the short distance, the middle distance, and the long distance may be presented as −1, 0, and +1, respectively. Referring to FIG. 7, when images of 256×256 pixels are used as training images and the input image 110, output data and labeling data may be 256×256 matrices, and each element of the matrices may have any one value of −1, 0, and +1 according to distance information.

Location information may be presented with an actual distance value and direction value. For example, distance information may be presented in units of meters, and direction information may be presented in units of degrees. Referring to FIG. 7, each element of output data and labeling data matrices presenting distance information may have a distance value in units of meters, such as 10 m and 15 m.

Location information may be presented by converting an actual distance value and direction value into values in a certain range. Location information may be uniformly normalized or may be non-uniformly normalized using a log function or an exponential function. For example, distance information may be normalized into a value of 0 to 1. Referring to FIG. 7, each element of output data and labeling data matrices presenting distance information may have a value of 0 to 1.

Location information may be presented as an RGB value. In this case, output data and labeling data become RGB images such that a user may easily recognize location information without a visualization operation. Referring to FIG. 8, a ship and geographical features included in labeling data and the output data 130 may correspond to different RGB values due to different pieces of distance information and may be presented in different colors. In comparison to FIG. 7, the labeling data and the output data 130 may be 256×256×3 matrices in a matrix representation.

Location information and other object information may be presented together. Object information other than location information is referred to as additional information below.

Additional information may be presented independently of location information. Alternatively, location information and additional information may be presented simultaneously.

When location information and additional information are independently presented, the location information and the additional information may be presented as separate data sets. For example, when a 256×256 pixel image is input to the neural network, location information may be a 256×256 matrix, and additional information may be n 256×256 matrices. n may be the number of pieces of additional information.

When location information and additional information are presented simultaneously, the location information and the additional information may be presented as one data set. For example, location information and a type of obstacle may be presented together using the above-described method of presenting location information in a plurality of categories having a certain range. Table 1 shows a presentation method in which distance information and a type of obstacle are taken into consideration together according to an exemplary embodiment of the present invention. Referring to Table 1, it is possible to set classes by considering distance information and types of obstacles together and allocate an identification value to each of the classes. For example, an identification value of 1 may be allocated by considering short distance which is distance information and geographical features which is obstacle type information. Referring to Table 1 and FIG. 7, each element of output data and labeling data matrices may have an identification value of 1 to 10. Table 1 shows an example in which distance information and obstacle type information are taken into consideration together, and it is also possible to consider other additional information, such as direction information, obstacle movement directions, speed, and navigation marks, together. It is unnecessary for all identification values to correspond to a plurality of pieces of information or the same type of information. For example, a specific identification value may correspond to only distance information, another identification value may correspond to only obstacle type information, and another identification value may correspond to both distance information and obstacle type information. As such, identification values may be presented in various ways according to circumstances.

TABLE 1

| Identification value | Class |
| --- | --- |
| 1 | Short distance + Geographical features |
| 2 | Middle distance + Geographical features |
| 3 | Long distance + Geographical features |
| 4 | Short distance + Stationary obstacle |
| 5 | Middle distance + Stationary obstacle |
| 6 | Long distance + Stationary obstacle |
| 7 | Short distance + Moving obstacle |
| 8 | Middle distance + Moving obstacle |
| 9 | Long distance + Moving obstacle |
| 10 | Others |

For the accuracy of a neural network, the learning process is important. A neural network may be trained in various ways, such as supervised learning, unsupervised learning, reinforcement learning, and imitation learning, without limitation.

To improve the accuracy of a neural network, it may be necessary to obtain various training images. When a neural network is trained using various training images, it is possible to handle various input images. For example, foggy training images may be required to obtain information from foggy images through image segmentation. Alternatively, it may be necessary to use images of a rainy day as training images in order to obtain accurate image segmentation results from a rainy day image.

In the case of a marine image, it may be difficult to obtain training images because it is necessary to take a picture on a ship in the sea. In particular, it may be more difficult because it is necessary to consider various marine situations for the accuracy of a neural network. Marine situations may include sea fog, fog, sea clutter, snow, rain, and the like.

Figure 9:
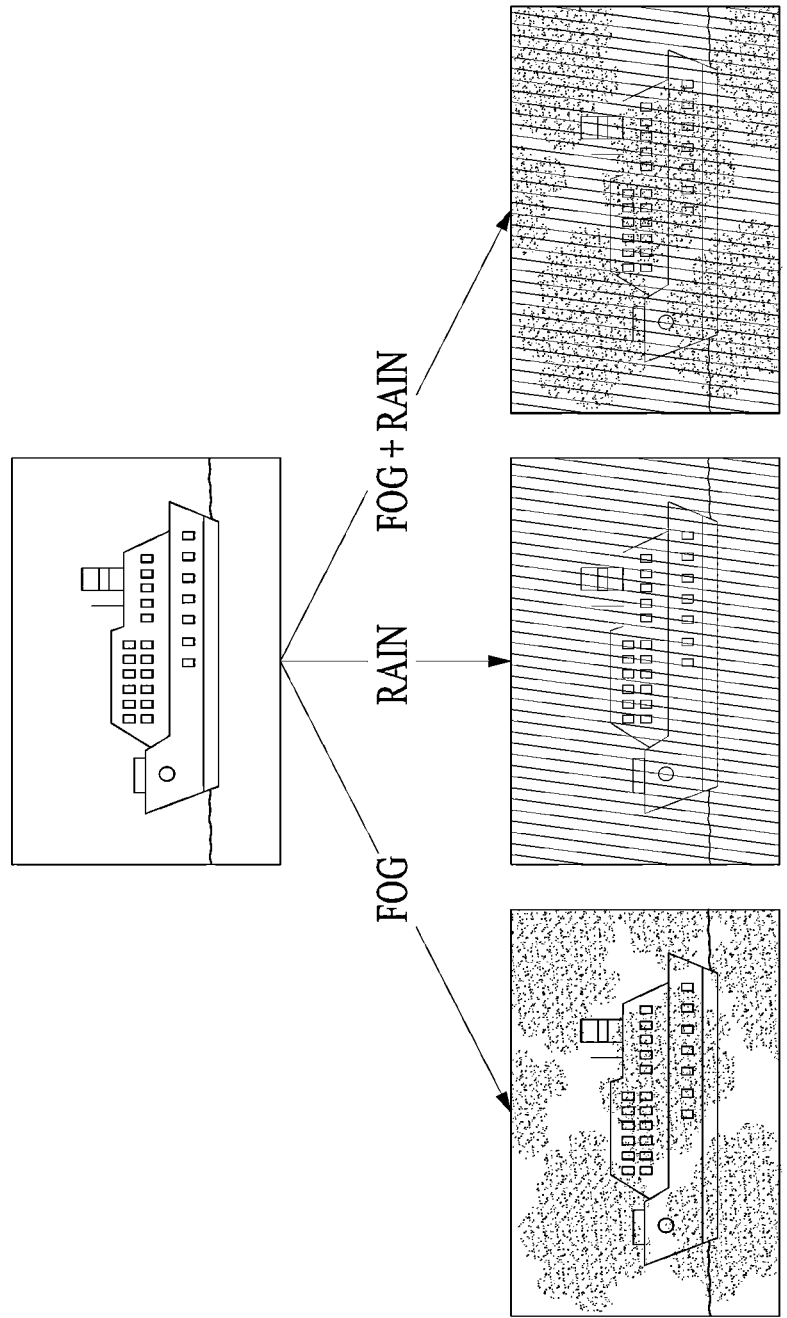
FIG. 9 is a set of diagrams relating to data augmentation according to an exemplary embodiment of the present invention.

In addition to the method of obtaining training images on a ship in the sea, it is possible to obtain training images through data augmentation. Data augmentation refers to all methods other than a method of obtaining training images by directly taking pictures. As an example, a training image may be obtained by superimposing fog on an image of a clear day through a program or the like. As another example, training images in which different sea colors are taken into consideration according to regions may be generated by arbitrarily changing a sea color. FIG. 9 is a set of diagrams relating to data augmentation according to an exemplary embodiment of the present invention. Referring to FIG. 9, it is possible to obtain images of a foggy day, a rainy day, and a foggy rainy day from a marine image of a clear day.

There are some cases of requiring labeling data corresponding to a training image according to a learning method of a neural network. For example, supervised learning may require labeling data. Labeling data may be generated from a training image.

Labeling data may include various kinds of information according to the purpose of training a neural network. As an example, labeling data may include location information corresponding to each of pixels and/or pixel groups of an image or location information corresponding to each of regions of an image. Alternatively, labelling data may include location information of an object included in an image. Since a labeling data presentation method varies according to the aforementioned location information presentation methods, it may be necessary to generate labeling data by considering a corresponding location information presentation method.

Obtaining labelling data including distance information will be described in further detail. Distance information may be obtained using a depth camera. The depth camera may be a stereo type, a structured pattern type, a TOF type, or the like or may be a combination of two or more thereof. It is possible to generate one piece of labelling data by obtaining distance information of each pixel in an image from the depth camera. In addition to this, various methods for obtaining distance information may be used.

Labelling data may be generated to include additional information as well as distance information. When labelling data is generated to separately include distance information and additional information, the above-described method may be used without change. When distance information and additional information are taken into consideration together and presented as one value, modified data in which distance information obtained through a depth camera or the like and additional information are taken into consideration together may be labelling data as shown in Table 1.

Figure 10:
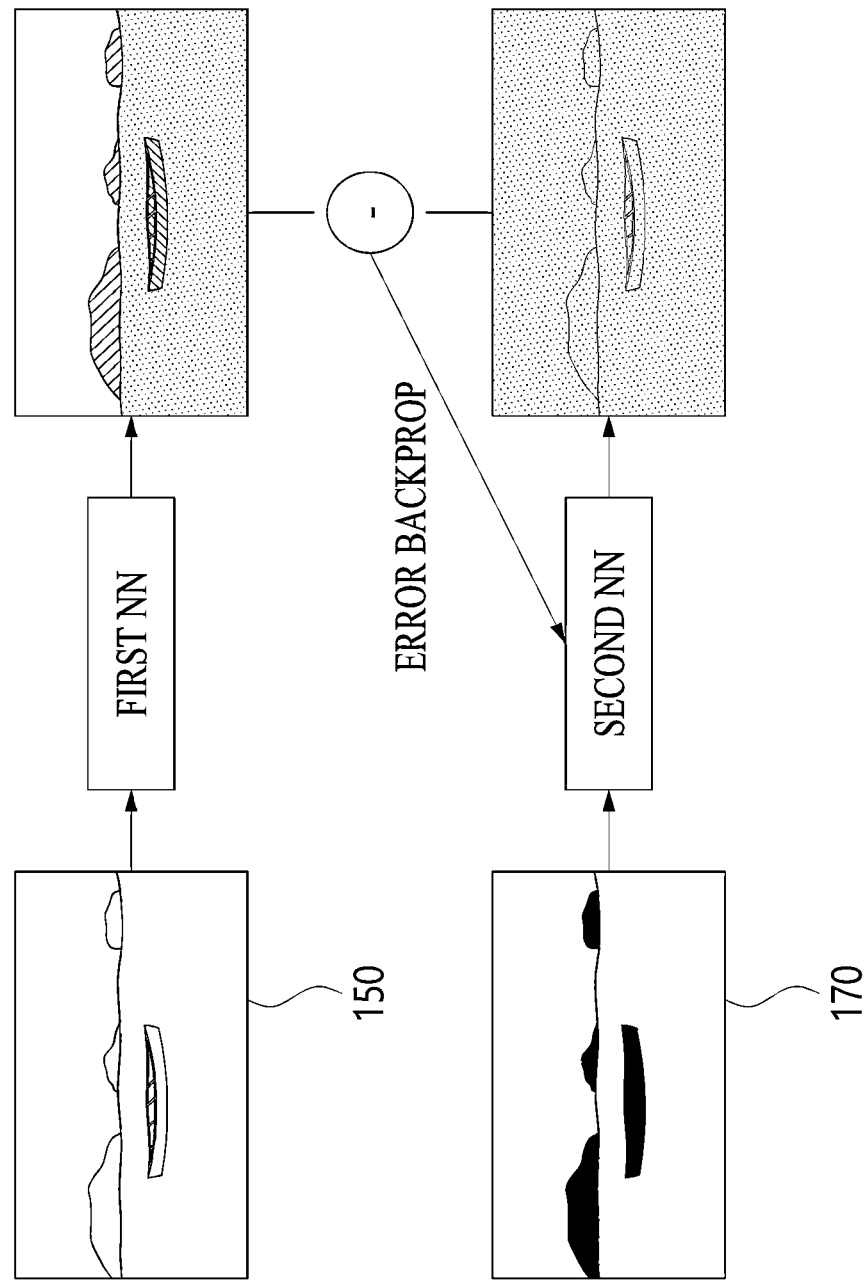
FIG. 10 is a set of diagrams relating to a neural network training method according to an exemplary embodiment of the present invention.

Labelling data may be passively generated by a user. Alternatively, labelling data may be generated by a neural network or another algorithm for generating labelling data. For example, an output of a first neural network which has been trained already may be used as labelling data of a second neural network. FIG. 10 is a set of diagrams relating to a method of training a second neural network using an output of a first neural network as labelling data according to an exemplary embodiment of the present invention. Referring to FIG. 10, a first neural network which receives a visible light image and performs image segmentation may have been trained, and a second neural network which receives an IR light image and performs image segmentation may have not been trained. When a visible image and an IR image of the same scene are obtained and input to the first and second neural networks, respectively, an output of the first neural network may be accurate segmentation results, and an output of the second neural network may be inaccurate segmentation results. The output of the first neural network may be compared with the output of the second neural network which is obtained using the output of the first neural network as labelling data of the second neural network, and the error may be backpropagated to the second neural network such that the second neural network may be trained.

Automatically generated information may be corrected thereafter and used as labelling data. For example, after pixel-specific distance information obtained from a depth camera is corrected, labelling data may be generated on the basis of the corrected data. Corrected data may be more accurate values. For example, corrected data of distance information may be more accurate distance values.

It is possible to generate labelling data by intentionally distorting information. For example, distance information obtained from a depth camera may be intentionally distorted and applied to labelling data. A small obstacle, such as a buoy, may be labelled as having a size greater than the actual size. For this reason, a neural network may be trained to detect a small obstacle well.

Another method for improving the accuracy of a neural network is to adopt an appropriate error backpropagation method. An error (loss) is a measure of the accuracy of a neural network and may refer to the difference between output data of the neural network and labelling data.

A total error of output data may be calculated using errors of output values of the output data. Alternatively, a total error of output data may be presented as a function of errors of output values of the output data. An error may be defined in various ways, such as a mean square error or a cross entropy error. For example, a total error may be the sum of errors of output values. Alternatively, a total error may be calculated by applying certain values (weights) to errors of output values. As an example, the total error may be calculated by adding up products of the weights and the errors of the output values.

A total error may be calculated using information included in output data. For example, the total error may be calculated using type information of an object included in the output data. Expression 1 below is an example of a total error calculated using type information of an object according to Table 1.

$$\mathrm{mean}\left(\sum_i E_c \times W_{class}\right)$$ Expression 1

In Expression 1, $$W_{class} = \frac{1}{\ln(c + P_{class})},$$

Pclass is the number of pixels constituting the object, c is a hyper parameter, and Ec is an identification value.

Errors of all output values may be taken into consideration to calculate a total error. Alternatively, to calculate a total error, errors of only some output values may be taken into consideration, and errors of other output values may not. For example, when output values include information on the types of objects, errors of only some objects may be taken into consideration, and errors of other objects may not. The objects taken into consideration may be objects involved in sailing, and the other objects may be objects not involved in sailing. Also, an object involved in sailing may be an obstacle, and an object not involved in sailing may be the sky.

As another method for improving the accuracy of a neural network, different neural networks may be used according to conditions. For example, a neural network may vary according to a sea color. Alternatively, a neural network may vary according to zones. A neural network may be selected automatically or passively by a user. For example, a zone may be detected using a global positioning system (GPS), and then a neural network may be changed automatically according to the zone. Alternatively, a sea color may be detected by a sensor or the like, and a neural network may be automatically changed.

To obtain a training image and/or an input image, a camera may be installed on a ship. The ship may be sailed by people or may be an autonomous ship. Alternatively, the ship may be neither a ship sailed by people nor an autonomous ship. Also, the camera may be installed in a harbor, a land, or the like rather than the ship without locational limitations.

When a camera is installed in a ship, there is no limitation on the location at which the camera is installed. The camera may be installed at any location, such as a front side, a lateral side, or a rear side of the ship. Also, the camera may be installed toward the front of the ship or a lateral side or the rear.

A sensing range may vary according to a camera. For example, a distance and/or an angle (field of view (FOV)) sensible by the camera may vary according to a lens and/or a focal length of the camera. The sensing range of a camera may vary according to the size, purpose, etc. of a ship. For example, in a large ship, a camera having a longer sensing range than a camera in a small ship may be installed.

A single camera may be installed on a ship. Alternatively, a plurality of cameras may be installed. When a plurality of cameras are used, the sensing range may be increased compared to that of the case in which a single camera is used. For example, the FOV may widen, or detected regions may be increased. Alternatively, when a plurality of cameras are used, the accuracy of situation awareness may be improved.

The plurality of cameras may be installed at difference locations. For example, a first camera may be installed on the front side of the ship, and a second camera may be installed on the rear side of the ship. Alternatively, the plurality of cameras may be installed at different heights. For example, a second camera may be installed above a first camera.

The plurality of cameras may have different sensing regions. For this reason, the plurality of cameras may be more effective in situation awareness compared to a single camera. As an example, a first camera may sense a region around the ship, and a second camera may sense a region far from the ship. Specifically, when a first camera equipped with a wide angle lens to sense an object at a short distance (e.g., 0 m to 150 m) and a second camera equipped with a zoom lens to sense an object at a long distance (e.g., 150 m to 300 m) are used together, it is possible to sense objects at both of the short distance and the long distance (e.g., 0 m to 300 m). As another example, a first camera may sense a region in front of the ship, a second camera may sense a region on a lateral side of the ship, and a third camera may sense a region behind the ship. As another example, a first camera may sense a left front region of the ship, and a second camera may sense a right front region of the ship. The sensing ranges of the plurality of cameras may partially overlap.

When the plurality of cameras is used, images generated by each of the plurality of cameras may be stitched into one image and then input to a neural network such that image segmentation may be performed. Alternatively, some images generated by each of the plurality of cameras may be stitched, and then image segmentation may be performed.

Alternatively, images generated by each of the plurality of cameras may be separately input to a neural network such that image segmentation may be performed. For example, assuming that distance information is presented as short distance, middle distance, and long distance through image segmentation, when image segmentation is performed using a first image generated by a first camera for sensing an object at a distance of 0 m to 150 m and a second image generated by a second camera for sensing an object at a distance of 150 m to 300 m, short distance (e.g., 0 m to 50 m), middle distance (e.g., 50 m to 100 m), and long distance (e.g., 100 m to 150 m) results are obtained from the first image, and short distance (e.g., 150 m to 200 m), middle distance (e.g., 200 m to 250 m), and long distance (e.g., 250 m to 300 m) results are obtained from the second image, such that image segmentation results in which a total of six stages of distance ranges are classified may be obtained.

The number of cameras installed may vary according to the size, purpose, etc. of the ship. For example, the number of cameras installed in a large ship may be greater than the number of cameras installed in a small ship.

When a camera is installed in a ship, initial setting may be required for various reasons, such as the type of ship and the location at which the camera is installed. Initial setting may be to set the camera so that image segmentation results based on pixels shown in a camera video and/or image or a neural network may become normal.

According to an initial setting method, after an appropriate installation guide may be given to a user, result values of an AIS and/or a radar and the camera may be compared such that a module may find the location and orientation of the camera.

Alternatively, after a camera is installed first, a setting value of the camera may be calculated to minimize an error according to results of test sailing, and then the setting value may be used for situation awareness. In particular, the setting value may be calculated to minimize the error on the basis of the correlation between seamarks or the like of an electronic navigational chart and result values of image segmentation. After that, when the calculated result value does not show enough distance because, for example, the camera is installed too far downward, a warning may be given, and reinstallation may be recommended.

A processing method for the case of using an image captured by a camera as an input image for image segmentation will be described below.

A camera may capture images at regular time intervals. The time intervals may be fixed or dynamically changed.

An image acquisition period of a camera and an image segmentation operation period may differ from each other. For example, image segmentation may be performed for only some images obtained through the camera. When the camera obtains images of 60 frames per second, image segmentation may be performed on the basis of images of 10 frames among the 60 frames. According to a method of selecting some images, images may be randomly selected. Otherwise, clear images may be selected from the captured images. Otherwise, images of a plurality of frames may be combined into one image, and then image segmentation may be performed. For example, an image obtained by combining a high illumination image and a low illumination image may be used for segmentation.

One image may be used to perform image segmentation once, or a plurality of images may be used. The plurality of images may be images captured by the same camera or different cameras.

When image segmentation is performed using images captured by different cameras, sensing ranges of the cameras may differ from each other. For example, a first camera may capture a short-distance image, and a second camera may capture a long-distance image.

Surroundings may be sensed in a way other than image segmentation. For example, it is possible to sense surroundings using an obstacle detection sensor, such as a radar, a LiDAR, and an ultrasonic detector, or information obtained with the obstacle detection sensor may be processed through a neural network to sense surroundings. Hereinafter, location information obtained as results of image segmentation will be referred to as first location information, and location information obtained in a way other than image segmentation will be referred to as second location information.

In the case of an image captured by a camera, it is possible to obtain location information of each pixel of the image using setting information including the type, location (height, angle, etc.), etc. of the camera. The obtained location information may be an absolute location or a location relative to the location of the camera or a location determined on an arbitrary basis.

Figure 11:
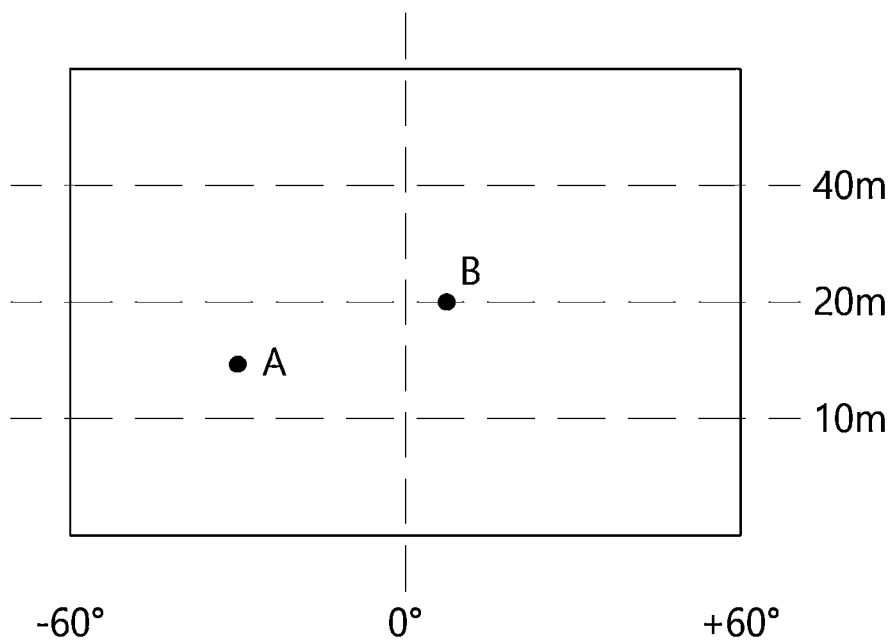
FIGS. 11 and 12 are diagrams relating to acquisition of location information based on image pixels according to an exemplary embodiment of the present invention.

FIG. 11 is a diagram relating to location information obtainment based on image pixels. Referring to FIG. 11, the left-right direction in the image may correspond to the angle of a pixel, and the up-down direction may correspond to the distance to a pixel. A pixel A may be considered to be about 15 m away at about 30° to the left, and a pixel B may be considered to be about 20 m away at about 10° to the right.

An error may occur in the above-described location information according to the position of a camera. For example, an initial installation position of the camera may be changed, and an error may occur accordingly. It is possible to correct the location information on the basis of the installation position.

Figure 12:
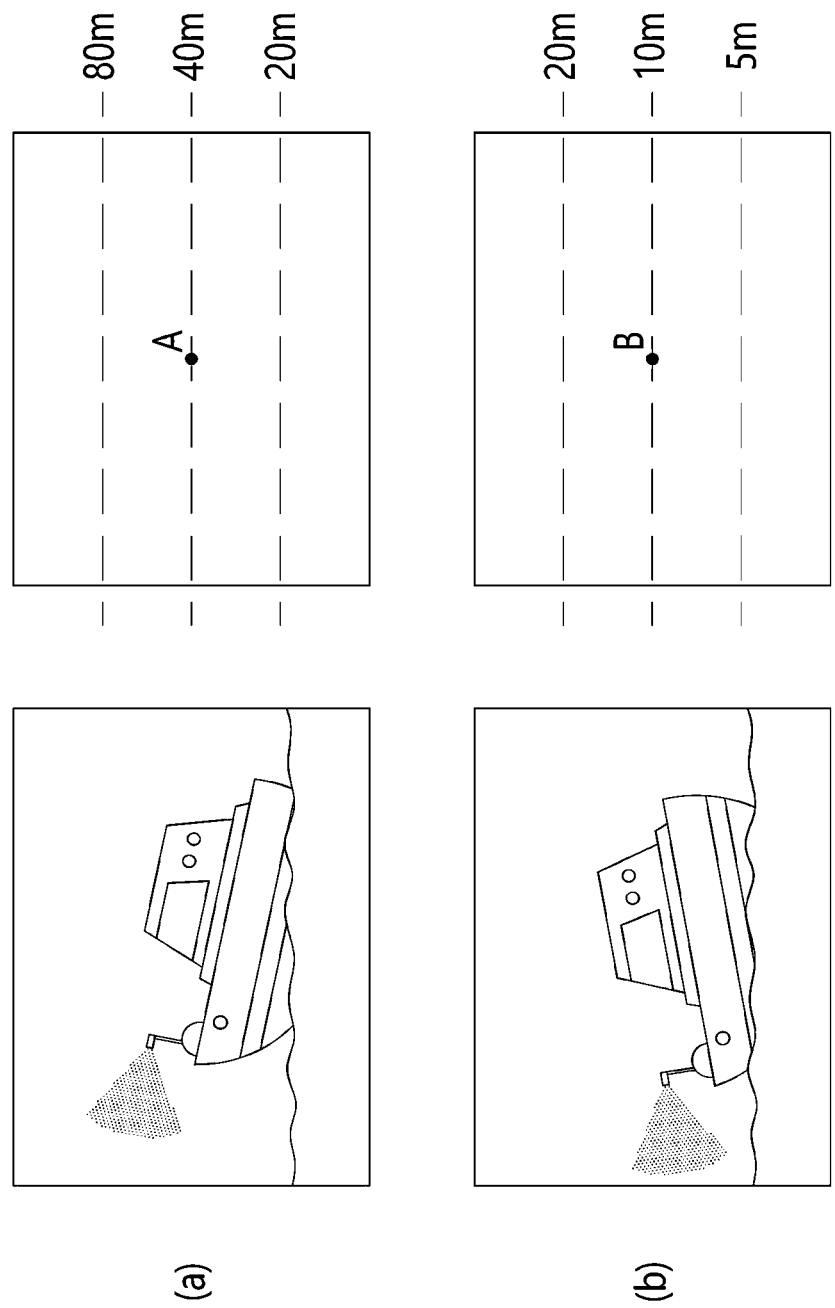

An error may occur in location information according to the movement (position) of an object in which a camera is installed. For example, when a camera is installed on a ship, location information of each pixel in an image may vary according to roll, pitch, etc. of the ship. To obtain accurate location information, the position of an object in which a camera is installed, such as the position of a ship, may be taken into consideration. For example, position information, such as heading or yaw, pitch, and roll, of a ship may be obtained from an inertial measurement unit (IMU) installed in the ship, and location information of each pixel in an image may be obtained on the basis of the position information. FIG. 12 is a set of diagrams relating to location information obtainment based on the position of a ship according to an exemplary embodiment of the present invention. In FIG. 12, only the pitch of the ship is taken into consideration. When comparing the cases in which the bow of a ship is directed upward and downward, it is possible to see that a distance corresponding to the same location on images may vary. Referring to FIG. 12, both pixels A and B are at the center of images. However, the distance of the pixel A is 40 m, and the distance of the pixel B is 10 m, that is, there is a difference in distance. Therefore, unless the pitch of the ship is taken into consideration through an inertia measurement device, distance information may be inaccurate.

It is possible to sense surroundings by combing image segmentation and a method other than image segmentation. Alternatively, information obtained through image segmentation may be corrected in a way other than image segmentation. Here, correction is not limited to obtaining absolutely accurate information and also denotes that information is changed.

Fusion of first location information and second location information will be described in detail below.

Figure 13:
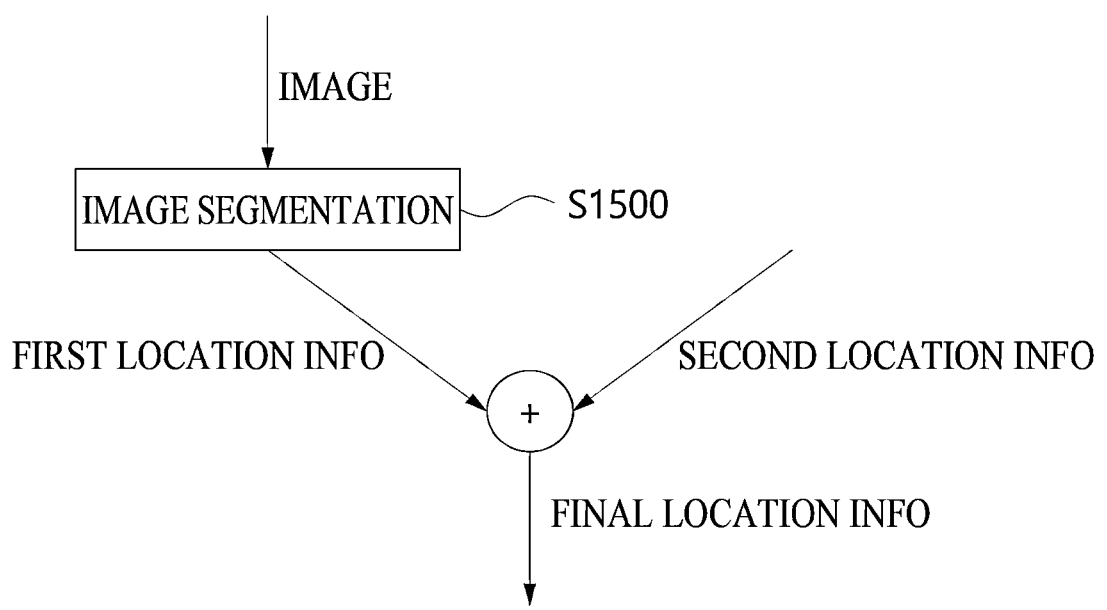
FIG. 13 is a block diagram relating to acquisition of final location information according to an exemplary embodiment of the present invention.

FIG. 13 is a block diagram relating to acquisition of final location information according to an exemplary embodiment of the present invention. Referring to FIG. 13, first location information may be obtained through image segmentation S1500, second location information may be obtained in a way other than image segmentation, and then final location information may be obtained by considering first location information and second location information.

It is unnecessary to fuse location information corresponding to all output values of output data of image segmentation together. Final location information of some output values may be obtained using the first location information and the second location information, and final location information of other output values may be obtained using only one of the first location information and the second location information. For example, it is possible to determine whether to fuse pieces of location information according to the type of object obtained through image segmentation. First location information of an obstacle may be fused with second location information, and that of a sailable region, such as the sea, may not be fused with second location information.

The type of first location information may differ from the type of second location information. For example, the first location information may contain only distance information, and the second location information may contain only direction information. In this case, final location information may be obtained by combining the first location information and the second location information.

The first location information and the second location information may include the same type of information. In this case, the first location information and the second location information may or may not correspond to each other.

When the pieces of location information correspond to each other, the first location information and the second location information may be identical or similar to each other or within the margin of error. For example, when the pieces of location information correspond to each other, the first location information may be presented as a distance region, and the second location information may be included in the distance region of the first information. Final location information may be one of the first location information and the second location information. Alternatively, final location information may be a value obtained by correcting the first location information with the second location information.

Figure 14:
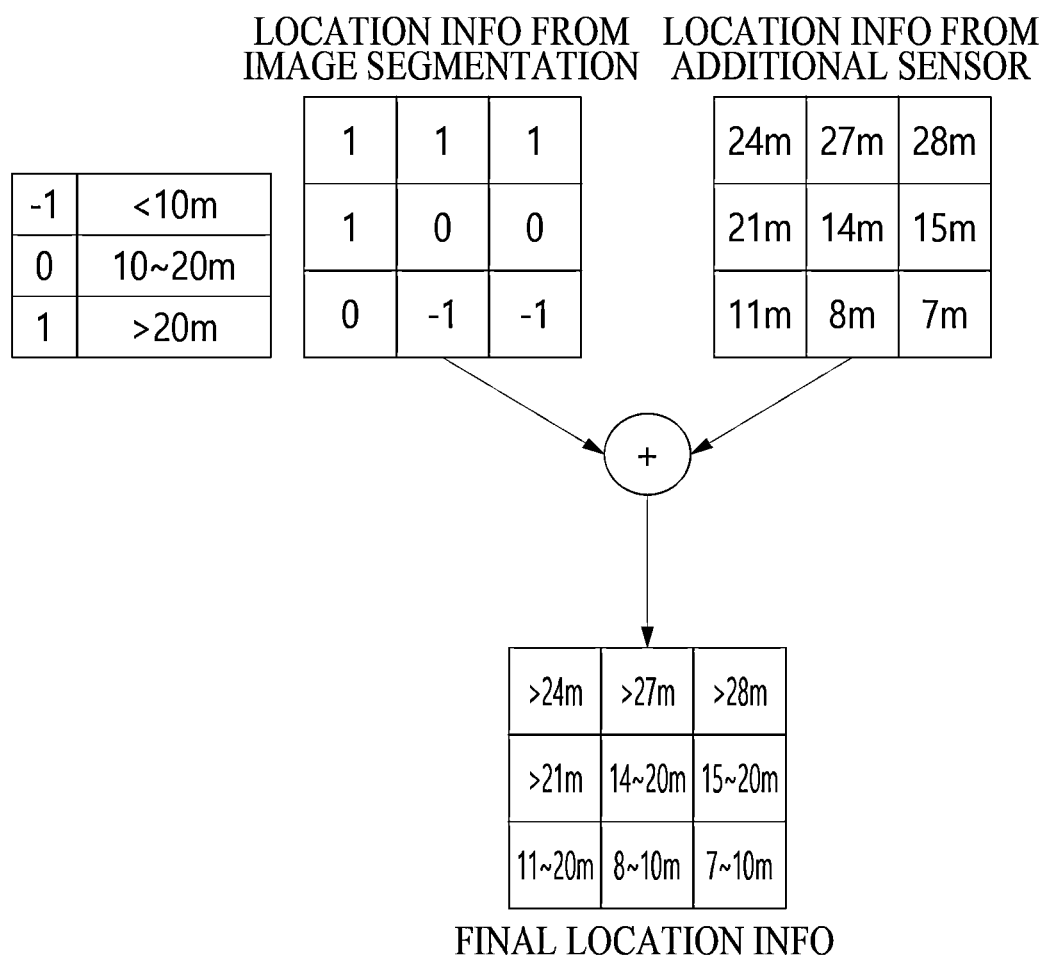
FIGS. 14, 15, and 16 show examples of acquisition of final location information according to an exemplary embodiment of the present invention.

FIG. 14 is a diagram relating to acquisition of final location information according to an exemplary embodiment of the present invention when pieces of location information correspond to each other. When first location information is presented as a distance region, an output value of −1 indicates a distance of less than 10 m, an output value of 0 indicates a distance of 10 m or more and 20 m or less, an output value of 1 indicates a distance of more than 20 m, and second location information is presented as a distance value in units of meters. Final location information is presented as a distance region on the basis of the first location information and the second location information. As an example, the first location information may determine the maximum value of final location information, and the second location information may determine the minimum value of final location information. An output value of the first location information at the center is 0, and that of the second location information at the center is 14 m. The maximum is determined to be 20 m by the first location information, and the minimum is determined to be 14 m by the second location information such that final location information may be a distance range of 14 m to 20 m.

As another example, both of the first location information and the second location information may be presented as distance values and correspond to each other. In this case, final location information may be any one of the first location information and the second location information. Alternatively, final location information may be the average of the first location information and the second location information. In addition to this, various methods may be used, such as mixing the first location information and the second location information at a specific ratio.

When pieces of location information do not correspond to each other, the first location information and the second location information are different or fall outside the margin of error. In this case, final location information may be one of the first location information and the second location information. For example, final location information may be a smaller value between the first location information and the second location information. Otherwise, pieces of location information of an output value which do not correspond to each other may be left as unknown values. Otherwise, when pieces of location information of an output value do not correspond to each other, location information of all output values of the corresponding output data may be left as unknown values.

Figure 15:
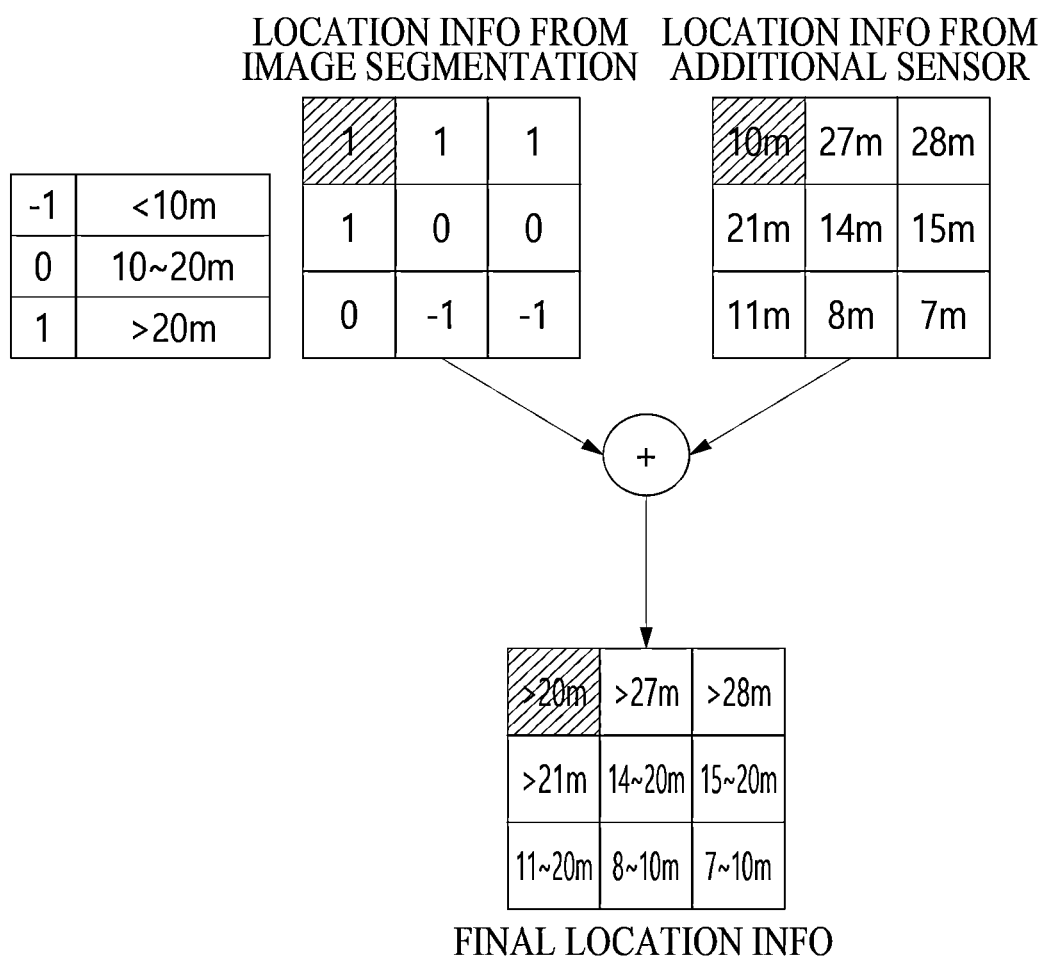

FIG. 15 is a diagram relating to acquisition of final location information according to an exemplary embodiment of the present invention when pieces of location information do not correspond to each other. FIG. 15 shows first location information and second location information in the same way as FIG. 14. Referring to FIG. 15, highlighted output values at the top-left corner do not correspond to each other, and the first location information takes precedence and is selected as final location information.

According to an exemplary embodiment, pieces of location information may be fused together for each object. For example, first location information and second location information may correspond to each of a plurality of pixels corresponding to a specific object in an image. In this case, final location information may be acquired regarding the object rather than each pixel by fusing first location information and second location information together.

According to an exemplary embodiment, fusing pieces of location information for each object may include calculating first object location information on the basis of a plurality of pieces of first location information with which a plurality of pixels corresponding to a specific object are separately labeled, calculating second object location information on the basis of a plurality of pieces of second location information with which the plurality of pixels corresponding to the specific object are separately labeled, and fusing the first object location information and the second object location information to acquire final location information corresponding to the object. As a non-limiting example, the object location information may be calculated through the average, the weighted average, the outlier processing, and the like of a plurality of pieces of location information. Also, the above-described fusing method for pieces of location information which match each other and the above-described fusing method for pieces of location information which mismatch each other may be applied to a detailed method of fusing the first object location information and the second object location information together.

Figure 16:
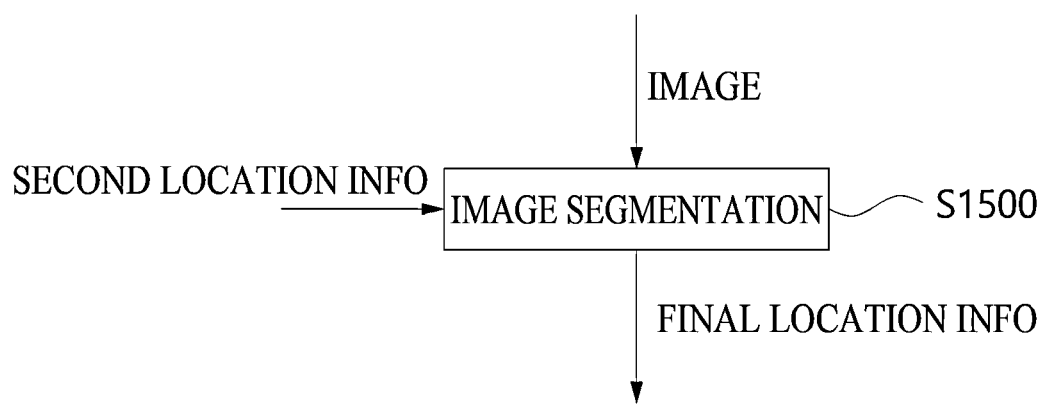

When image segmentation is performed, second location information may be used as input data together with an image. FIG. 16 is a diagram relating to acquisition of final location information according to an exemplary embodiment of the present invention. Referring to FIG. 16, an image and second location information may be used as inputs to image segmentation S1500 to obtain final location information. When the image segmentation S1500 is performed by a neural network, the second location information may be input in the same operation as the image or in a different operation from the image. For example, when the neural network includes a plurality of sequential layers, the image may be input to the first layer, and the second location information may be input to another layer. As a result, calculation may be performed with the image in all the layers and may not be performed with the second location information in one or more layers.

The case in which one piece of first location information and one piece of second location information are used to obtain one piece of final location information has been described above. However, the present invention is not limited thereto, and a plurality of pieces of first location information and/or a plurality of pieces of second location information may be used to obtain one piece of final location information. Also, it has been assumed above that second location information is presented as an actual distance value, but the present invention is not limited thereto.

Figure 17:
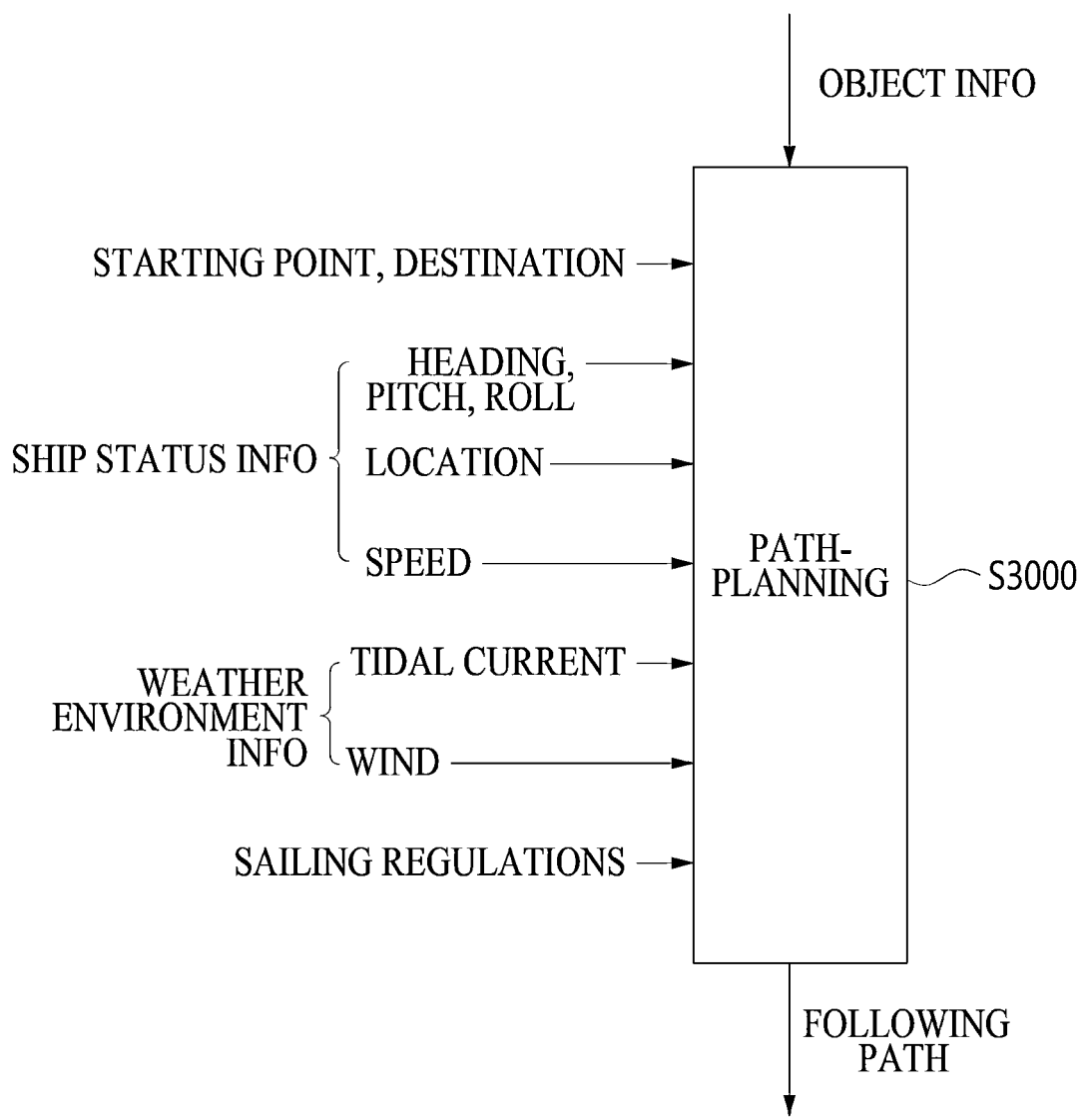
FIGS. 17 and 18 are block diagrams relating to examples of a path planning operation according to an exemplary embodiment of the present invention.

The path-planning operation may be an operation of receiving object information and outputting a path followed by a ship (hereinafter, referred to as a "following path"). FIG. 17 is a block diagram relating to the path-planning operation according to an exemplary embodiment of the present invention. Referring to FIG. 17, a starting point and a destination of a ship, ship status information, weather environment information, sailing regulations, etc. may be received in addition to object information, and a following path may be output through the path-planning operation S3000.

The starting point and the destination may be an initial starting location and a final arrival location of the ship but are not limited thereto. For example, the starting point and the destination may be arbitrary marine locations. Otherwise, the starting point may be a current location of the ship, and the destination may be the final arrival location. Otherwise, the starting point may be a current location of the ship, and the destination may be an arbitrary location on an obstacle map.

The ship status information refers to information relating to the ship, such as the location, speed, and position information of the ship. The position information refers to information relating to the position of the ship, such as heading, pitch, and roll, of the ship.

The weather environment information refers to information related to a weather environment, such as tidal current, wind, and waves.

The sailing regulations refer to agreements, regulations, or the like that are enforced for ship sailing. For example, the sailing regulations may be the international regulations for preventing collisions at sea (COLREG).

The following path is a path followed by the ship and may be a waypoint which represents the location passed by the ship. Alternatively, the following path may be a path along which the ship moves.

It is possible to generate the following path on the basis of information on seamarks. The seamarks may be obtained by situation awareness, such as image segmentation.

Input information, for example, information received in the path-planning operation, may include all the pieces of above-described information, only some thereof, or other information.

The path-planning operation may be implemented through one algorithm or neural network. For example, it is possible to train and use a neural network which outputs a following path when object information is input. Alternatively, a plurality of algorithms or neural networks may be used.

Figure 18:
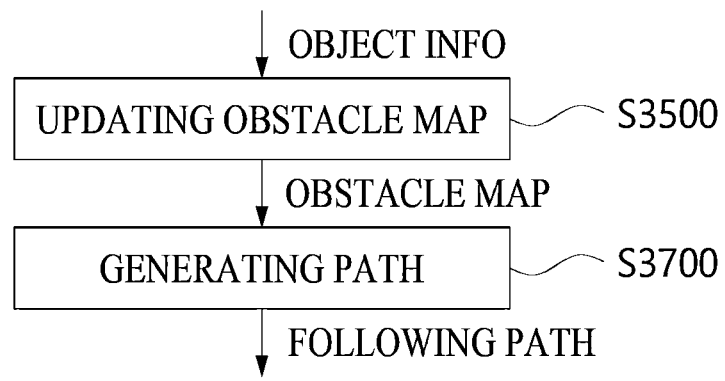

The path-planning operation may include an obstacle map update operation and a path generation operation. FIG. 18 is a block diagram relating to the path-planning operation according to an exemplary embodiment of the present invention. In an obstacle map update operation S3500, object information may be received, and an obstacle map may be output. In a path-generation operation S3700, the obstacle map may be received, and a following path may be output.

Figure 19:
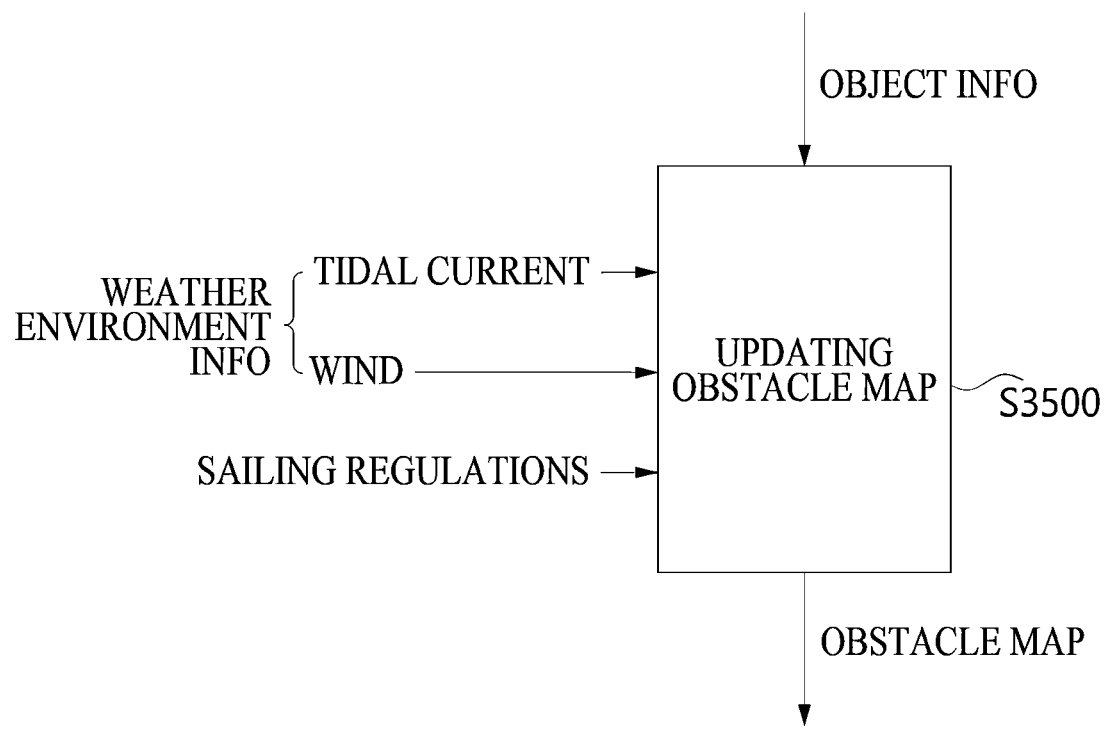
FIG. 19 is a block diagram relating to an obstacle map update operation according to an exemplary embodiment of the present invention.

FIG. 19 is a block diagram relating to an obstacle map update operation according to an exemplary embodiment of the present invention. Referring to FIG. 19, it is possible to update an obstacle map by considering object information, weather environment information, such as tidal current and wind, and sailing regulations.

The object information is not limited to object information obtained through image segmentation, and object information obtained through another sensor, such as a radar or a LiDAR, may also be an input to the obstacle map update operation. It is also possible to combine all or some of the pieces of object information.

The obstacle map refers to a means for presenting object information. As an example, the obstacle map may be a grid map. In the grid map, the space may be divided into unit regions, and object information may be displayed according to each unit region. As another example, the obstacle map may be a vector map. The obstacle map is not limited to being two dimensional and may be a 3D obstacle map. Meanwhile, the obstacle map may be a global map which presents all zones related to ship sailing from a starting point to a destination or a local map which presents certain zones around the ship.

The obstacle map may include a plurality of unit regions. The plurality of unit regions may be presented in various ways according to classification criteria. As an example, the obstacle map may include a sailable region, an unsailable region, and an unknown region which may not be determined to be sailable or not. Specifically, the sailable region may be a region in which there is no obstacle or any obstacle is highly unlikely to exist, and the unsailable region may be a region in which there is an obstacle or an obstacle is highly likely to exist. Alternatively, the sailable region may correspond to a suitable zone for sailing, and the unsailable region may correspond to an unsuitable zone for sailing. The unknown region may be a region excluding the sailable region and the unsailable region.

As another example, the obstacle map may include a region corresponding to a zone within the sensing range of a camera, an obstacle sensor, or the like and a region not corresponding thereto. The sensing range of a camera may be presented as an FOV. The region corresponding to the zone within the sensing range may include a detected region and a undetected region which is a region other than the detected region. Unit regions may be classified as detected regions and undetected regions according to whether it is possible to obtain object information through a camera, an obstacle detection sensor, or the like. Alternatively, unit regions may be classified as detected regions and undetected regions according to the accuracy of object information obtained through a camera, an obstacle detection sensor, or the like. For example, a zone occluded by an obstacle may correspond to an undetected region.

Otherwise, the obstacle map may include an update region and another region according to whether the corresponding region has been updated.

A weight may be allocated to each unit region of the obstacle map. The weight may reflect sailing suitability. For example, a weight of a high value may be allocated to a unit region corresponding to a suitable zone for sailing, such as the sea, and a weight of a low value may be allocated to a unit region corresponding to a zone which is unsuitable for sailing because there is an obstacle such as a ship. In reverse, a smaller weight may be allocated to a unit region having higher sailing suitability.

Presentation of an obstacle on a 2D obstacle map will be mainly described below, but the present invention is not limited thereto.

The term "update" may be construed as including generation. For example, when there is no obstacle map of a previous frame in the case of updating an obstacle map of a current frame, updating an obstacle map may be construed as generating an obstacle map.

On the obstacle map, object information may be presented. For example, it is possible to show whether an object exists. Also, it is possible to present various information, such as the type of object, the location of an object, the movement direction of an object, the speed of an object, and navigation mark information. On the obstacle map, only information on obstacles may be shown. The information may be presented as whether there is an obstacle or the probability of presence of an obstacle. Alternatively, the information may be presented as a weight using a number in a certain range.

Figure 20:
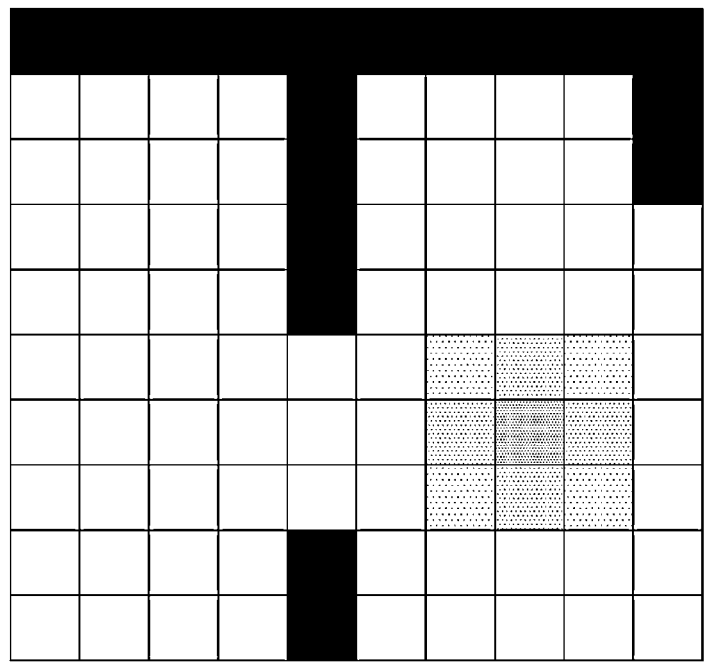
FIG. 20 is a set of diagrams relating to an obstacle map according to an exemplary embodiment of the present invention.

When obstacles are presented as weights, the weights may be categorized into a plurality of numeric ranges. The respective numeric ranges may correspond to the sailable region, the unsailable region, and the unknown region. FIG. 20 is a set of diagrams relating to an obstacle map according to an exemplary embodiment of the present invention. FIG. 20 shows examples of a 2D grid map. Referring to (a) of FIG. 20, whether there is an obstacle in each grid and/or unit region or whether each grid and/or unit region is suitable for sailing is presented using an integer of 0 to 255 as a weight. A smaller value represents that the probability of presence of an obstacle is high or the unit region is unsuitable for sailing, and a unit region without a value has a weight of 255. Unsailable regions may correspond to a weight of 0 to a, unknown regions may correspond to a weight of a+1 to b, and sailable regions may correspond to a weight of b+1 to 255. a and b are integers satisfying $0 \leq a < b \leq 254$. For example, unsailable regions may correspond to a weight of 0, sailable regions may correspond to a weight of 255, and unknown regions may correspond to a weight of 1 to 254. Alternatively, unsailable regions may correspond to a weight of 0 to 50, sailable regions may correspond to a weight of 51 to 200, and unknown regions may correspond to a weight of 201 to 255. Referring to (b) of FIG. 20, the obstacle map presented with weights may be visualized. For example, the obstacle map may be presented by adjusting the brightness of an achromatic color. In (b) of FIG. 20, a smaller weight is presented with lower brightness. A detailed method of allocating a weight to a unit region will be described below.

Object information for updating an obstacle map may be information based on an attribute of a means for obtaining the object information. For example, location information of an obstacle obtained through image segmentation may be location information relative to a camera which has captured an image input for the image segmentation. The relative location information may be converted into location information on the obstacle map so as to be applied to the obstacle map. One or both of the relative location information and the location information on the obstacle map may be used to update the obstacle map. Hereinafter, coordinates on an obstacle map are referred to as absolute coordinates.

Figure 21:
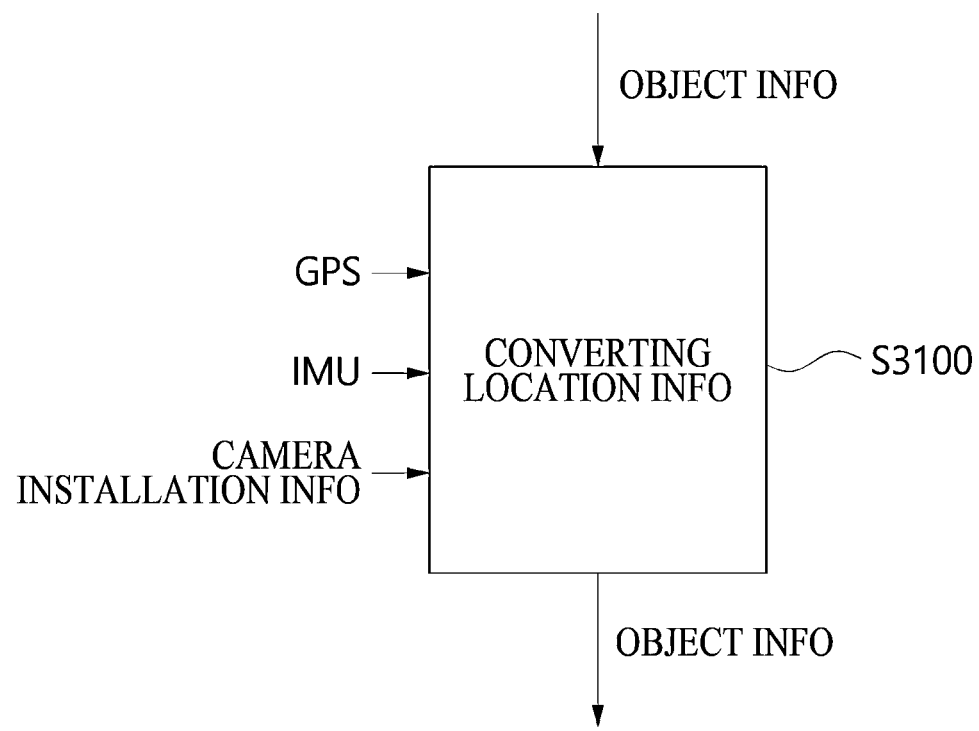
FIG. 21 is a block diagram relating to a location information conversion operation according to an exemplary embodiment of the present invention.

It is possible to obtain absolute information using a GPS, an IMU, direction information of a ship and/or camera, or the like. FIG. 21 is a block diagram relating to a location information conversion operation according to an exemplary embodiment of the present invention. Referring to FIG. 21, location information of an obstacle may be converted into absolute coordinates on the basis of the location of a ship and/or a camera calculated with a GPS installed in the ship, position information of the ship obtained by an IMU, and camera position information based on camera installation information.

In the case of an obstacle map update, the entire obstacle map may be updated. Alternatively, only some regions of the obstacle map may be updated.

Figure 22:
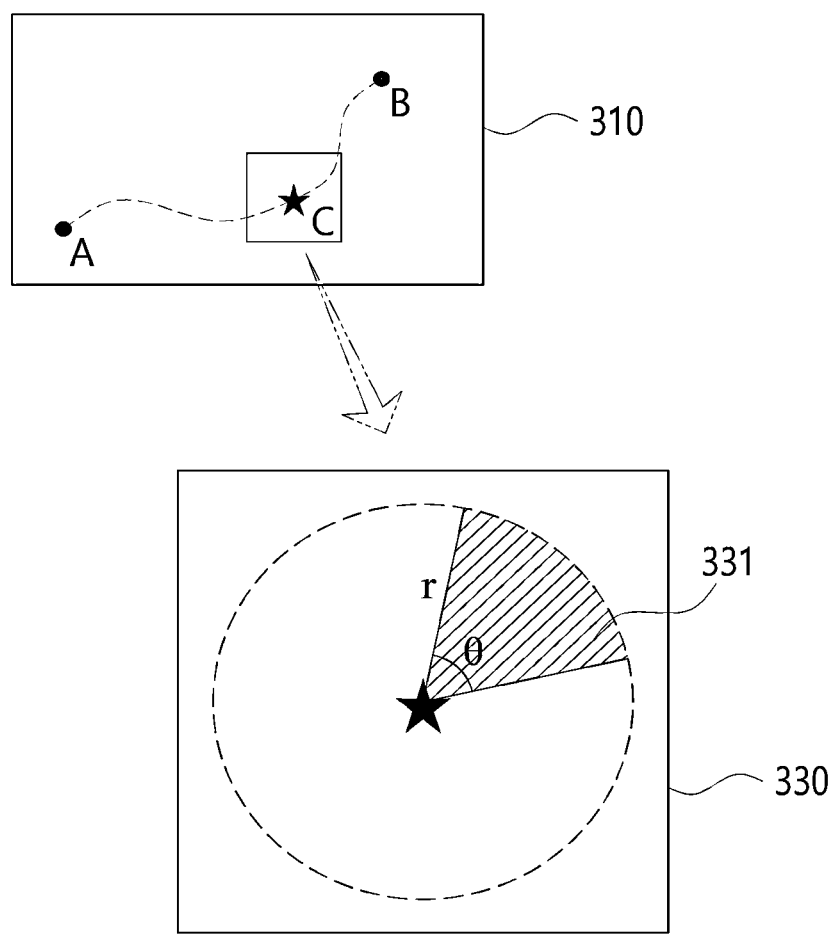
FIG. 22 is a set of diagrams relating to an update region according to an exemplary embodiment of the present invention.

An update region may be defined on the basis of an update distance and an update angle. FIG. 22 is a set of diagrams relating to an update region according to an exemplary embodiment of the present invention and shows a global map 310 including a starting point A, a destination B, and a current location C of a ship and a local map 330. An update region 331 may be defined in the local map 330 with an update distance r and an update angle θ.

An update region may be determined according to the location of a ship, heading of the ship, and the like. Alternatively, an update region may be determined according to an obstacle detection sensor, such as a camera, a radar, or a LiDAR. For example, an update region may be determined by the angle of view and/or the maximum observation distance of a camera. An update angle may be determined by the angle of view of a camera, and an update distance may be determined by the maximum observation distance. Alternatively, an update region may be a certain region around a ship. An update region may be larger than a minimum region for detecting and then avoiding an obstacle.

The case of presenting whether there is an obstacle in an obstacle map and/or whether a unit region is suitable for sailing with a weight will be described in detail below. It is assumed below that a small weight represents a high probability of presence of an obstacle or unsuitability for sailing, but the present invention is not limited thereto.

A weight may vary according to the type information of an object. As an example, when a ship and a buoy are detected as obstacles, the weight of the ship may be set to be smaller than the weight of the buoy. As another example, when a stationary object and a moving object are detected, the weight of the stationary object may be set to be smaller than the weight of the moving object.

A weight may be set on the basis of location information of an object which is corrected by considering type information of an object. Alternatively, a weight may be set for a region in which an object has not been detected on the basis of type information of the object.

Figure 23:
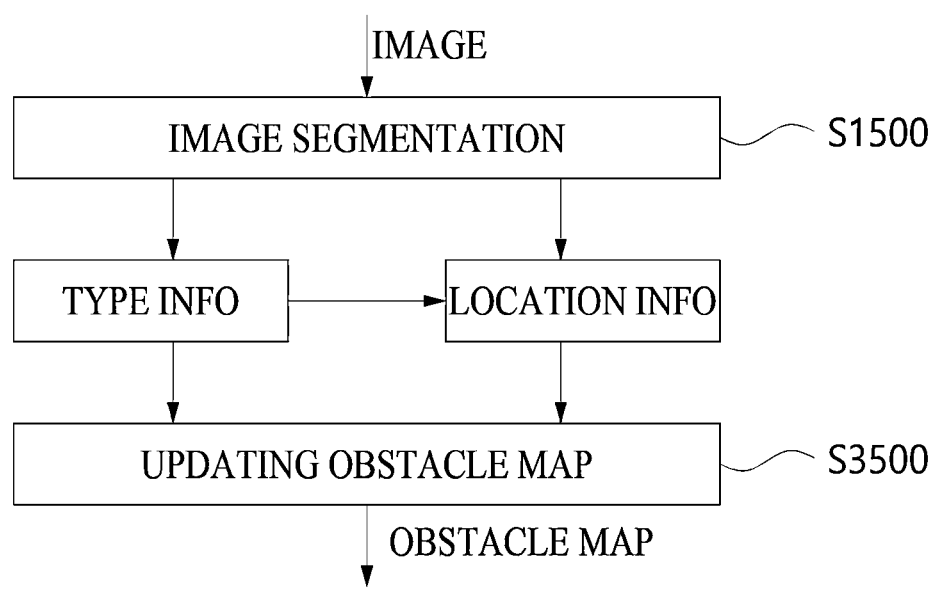
FIGS. 23 and 24 are diagrams relating to correction of location information according to an exemplary embodiment of the present invention.

FIG. 23 is a block diagram relating to correction of location information according to an exemplary embodiment of the present invention. Referring to FIG. 23, type information and location information of an object included in an image may be obtained through image segmentation, and an obstacle map may be updated after the obtained type information applied to the obtained location information.

As an example, the size of an object may be calculated on the basis of type information of the object, and unit regions corresponding to the object on an obstacle map may be calculated using the size such that weights may be set. The unit regions may vary according to a direction and the like of the object.

As another example, distance information obtained through image segmentation may include only the minimum distance to an object. When type information of the object is additionally used, it is possible to obtain the maximum distance as well as the minimum distance, and weights may be set on the basis of the distance information.

Figure 24:
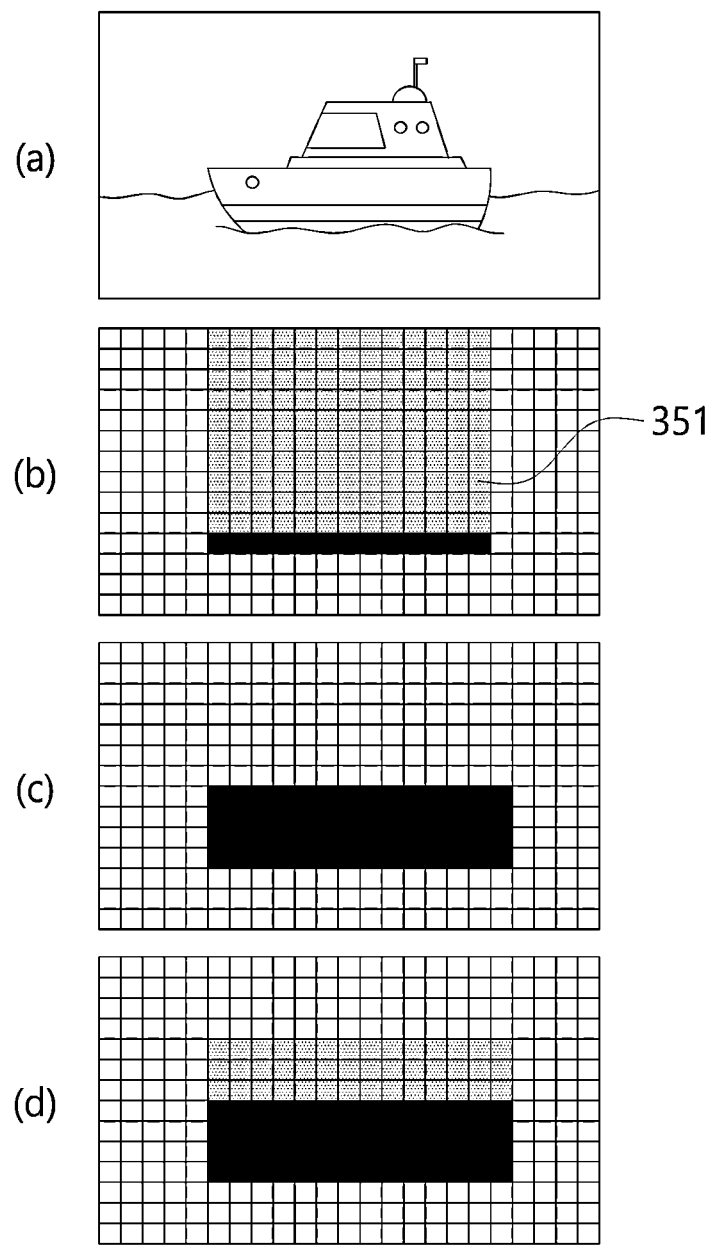

FIG. 24 is a set of diagrams relating to weight setting according to an exemplary embodiment of the present invention. The image of (a) of FIG. 24 may be input, and distance information may be obtained through image segmentation. The distance information may include only the minimum distance to an object. In this case, referring to (b) of FIG. 24, an undetected region 351, in which it is not possible to know whether an obstacle exists, may be in the image. On an obstacle map, the undetected region 351 may be processed as a region in which an obstacle exists or a region in which no obstacle exists. Alternatively, a part of the undetected region 351 may be processed as a region in which an obstacle exists, and another part may be processed as a region in which no obstacle exists.

It is possible to reduce unit regions corresponding to the region 351, in which it is not possible to know whether an obstacle exists, on the obstacle map using type information of the obstacle. For example, as shown in (c) of FIG. 24, the size of the obstacle may be calculated from the type information of the obstacle, and a region corresponding to the size on the obstacle map may be processed as an unsailable region. Alternatively, certain unit regions may be added to the region corresponding to the size of the obstacle on the obstacle map, and the resultant region may be processed as an unsailable region. A weight of the certain unit regions may differ from a weight of the region corresponding to the size of the obstacle on the obstacle map. The size of the obstacle may be an accurate size of the obstacle or may be determined on the basis of the type of obstacle. Alternatively, the size of the obstacle may be a value previously determined according to the type of obstacle.

Referring to (d) of FIG. 24, when the size of the obstacle is obtained from the type information of the obstacle, there may be a zone in which it is not possible to know whether an obstacle exists. The zone may be an occluded zone which is covered by the obstacle and thus is not shown. Location information of the occluded zone may be inaccurate information. A weight of unit regions which correspond to the occluded zone on the obstacle map may be a value between the weight of unit regions in which the obstacle exists and the weight of unit regions in which no obstacle exists.

The obstacle map may be updated by calculating a weight from corrected location information. Alternatively, a weight may be calculated from the location information before correction to update the obstacle map, and then the weight may be corrected by considering the type information.

Figure 25:
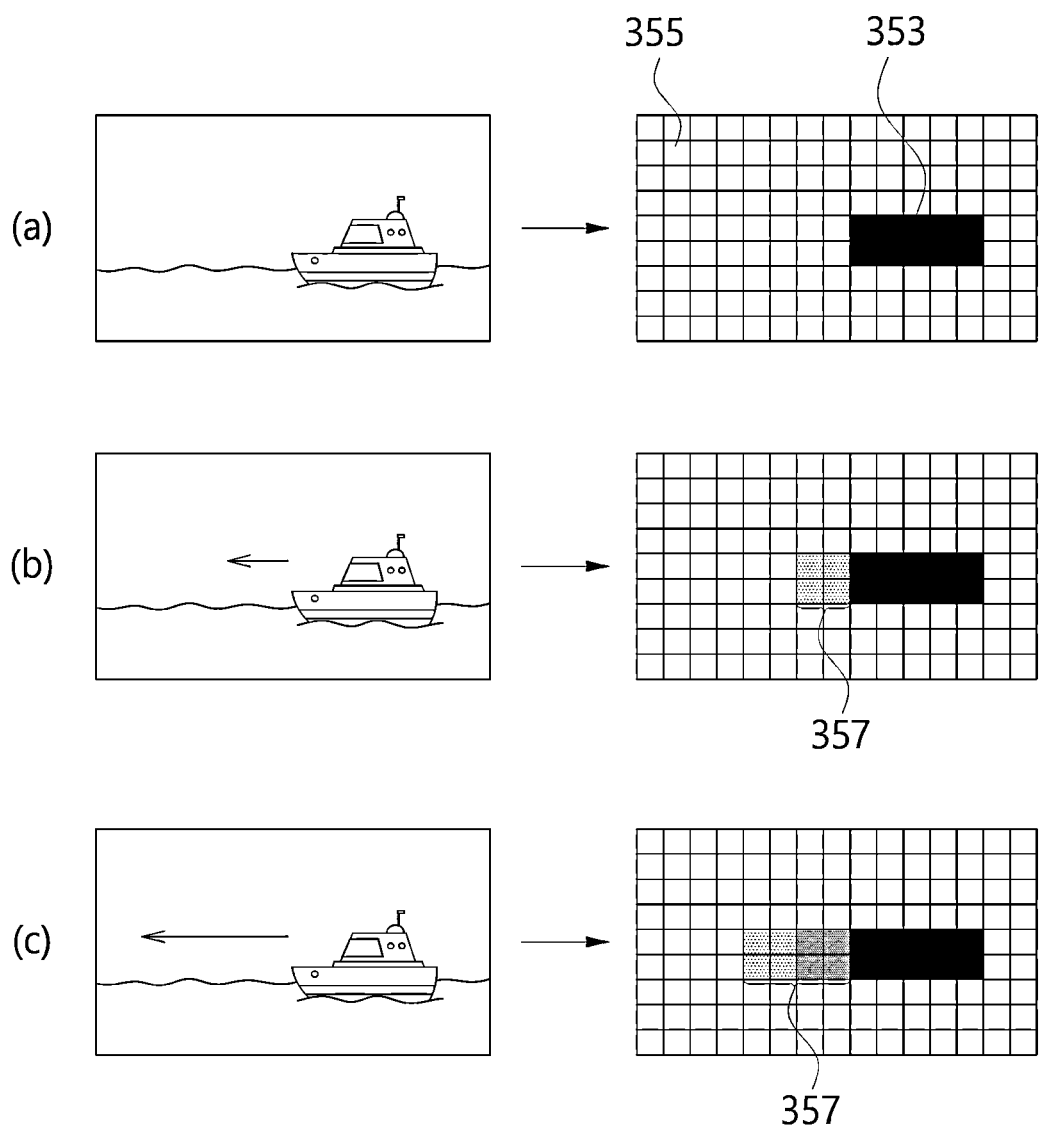
FIG. 25 is a set of diagrams relating to weight setting in which movement of an obstacle is taken into consideration according to an exemplary embodiment of the present invention.

A weight may be set by considering a movement direction and speed of an object. For example, a small weight may be set for a direction in which the object moves. Alternatively, a smaller weight may be set for higher movement speed. FIG. 25 is a set of diagrams relating to weight setting in which movement of an obstacle is taken into consideration according to an exemplary embodiment of the present invention. In the diagrams of FIG. 25, weights are presented by considering a movement direction and speed according to the object information presentation method of FIG. 20. Referring to (a) of FIG. 25, when a ship which is an obstacle is stopped, an obstacle map may be divided into an unsailable region 353 corresponding to the ship and a sailable region 355 corresponding to the sea. When the ship moves leftward, referring to (b) of FIG. 25, a weight of a predicted movement region 357 on the left side of the ship in the obstacle map may be set to a value between a weight of the unsailable region 353 and a weight of the sailable region 355. Referring to (c) of FIG. 25, as the movement speed of the ship increases, the weight of the predicted movement region 357 may be reduced. Alternatively, as the movement speed of the ship increases, the area of the predicted movement region 357 may be increased.

The danger of an object may be determined so that a weight may be set differently. For example, a smaller weight may be set for an object with higher danger. The danger may be calculated by considering object information, such as the type, movement direction, and speed of an object.

A weight may be set by considering weather environment information such as tidal current and wind. For example, a small weight may be set for unit regions to which it is difficult to move because the unit regions are present in a direction in which the ship moves against a tidal current, wind, or the like, and a large weight may be set for unit regions to which it is easy to move because the unit regions are present in a direction in which the ship moves with a tidal current, wind, or the like. Data of a tidal current, wind, etc. may be obtained through an additional sensor. Otherwise, tidal current and/or wind information dependent on a zone or the time may be stored in advance and used. Otherwise, the information may be received in real time from an external source.

Geographical features may be presented on an obstacle map through the situation awareness operation or may be presented on an obstacle map with reference to an electronic navigational chart or the like without situation awareness. Electronic navigational chart information and situation awareness results may be used together. Geographical features may be set as an unsailable region on an obstacle map.

A weight may be set by considering sailing regulations such as COLREG.

Figure 26:
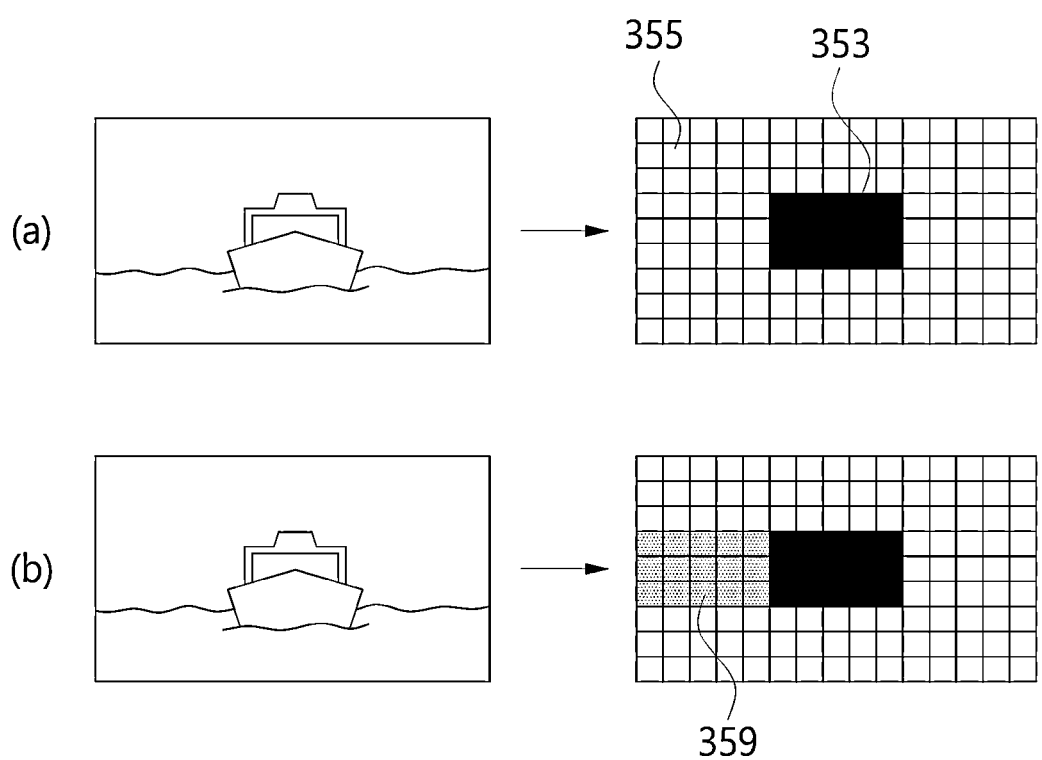
FIG. 26 is a set of diagrams relating to weight setting in which sailing regulations are taken into consideration according to an exemplary embodiment of the present invention.

According to sailing regulations, it is possible to increase a weight of a region in which a ship will sail or reduce a weight of a region in which a ship should not sail. For example, according to COLREG, when two ships move toward each other, one ship may be required to detour to the left side of a movement direction. In this case, a weight of unit regions on the right side may be increased, or a weight of unit regions on the left side may be reduced so that a ship may sail while satisfying COLREG. FIG. 26 is a set of diagrams relating to weight setting in which sailing regulations are taken into consideration according to an exemplary embodiment of the present invention. When COLREG is not taken into consideration, only unit regions corresponding to a ship moving toward a corresponding ship may be shown as an unsailable region 353 on an obstacle map. A weight of sailing regulation reflecting regions 359 which are left unit regions on the obstacle map may be reduced so that COLREG may be satisfied. The weight of the sailing regulation reflecting regions 359 may be set to a value between a weight of a sailable region 355 and a weight of the unsailable region 353. Due to the sailing regulation reflecting regions 359, a path for detouring to the right side of the ship moving toward the corresponding ship may be generated.

Figure 27:
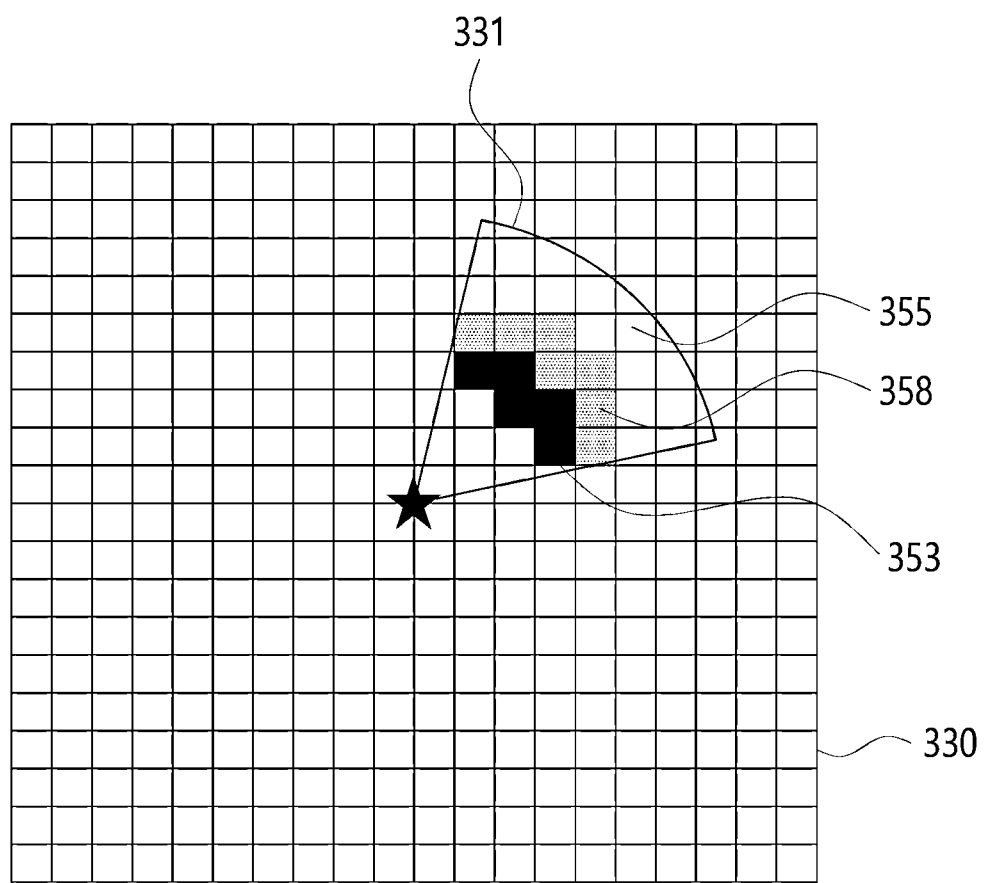
FIG. 27 is a diagram relating to weight setting in which a buffer region is taken into consideration according to an exemplary embodiment of the present invention.

A buffer region having an arbitrary weight may be provided around unsailable regions and/or sailable regions. The weight of the buffer region may be set to a value between a weight of sailable regions and a weight of unsailable regions. Alternatively, the weight of the buffer region may be set by considering the distance from an unsailable region and/or a sailable region. For example, a region close to a sailable region may have a larger weight than a region close to an unsailable region. FIG. 27 is a diagram relating to weight setting in which a buffer region is taken into consideration according to an exemplary embodiment of the present invention. In the diagram of FIG. 27, a local map 330 is presented according to the object information presentation method of FIG. 20, and an unsailable region 353, a sailable region 355, and a buffer region 358 are shown in an update region 331.

An update region of an obstacle map may be updated with object information.

The obstacle map may be updated with information about whether an obstacle exists. For example, when an obstacle is detected, the obstacle may be displayed. Alternatively, a weight may be updated in the obstacle map. For example, a weight may be calculated using object information, and the obstacle map may be updated with the weight.

An obstacle map update according to the object information presentation method of FIG. 20 will be described below. However, an obstacle map update method is not limited thereto and may also be applied to the case in which weight ranges are different, the case in which an obstacle map is presented with the probability of presence of an obstacle, and other cases.

Object information of a previous frame may be ignored, and an obstacle map may be updated only with object information obtained from a current frame. For example, an obstacle map may be generated only with information obtained through the above-described weight setting.

Alternatively, an obstacle map may be updated by considering object information of both a previous frame and a current frame. For example, an obstacle map may be updated by considering a weight of a current frame and a weight of a previous frame or an obstacle map obtained through the above-described weight setting.

Figure 28:
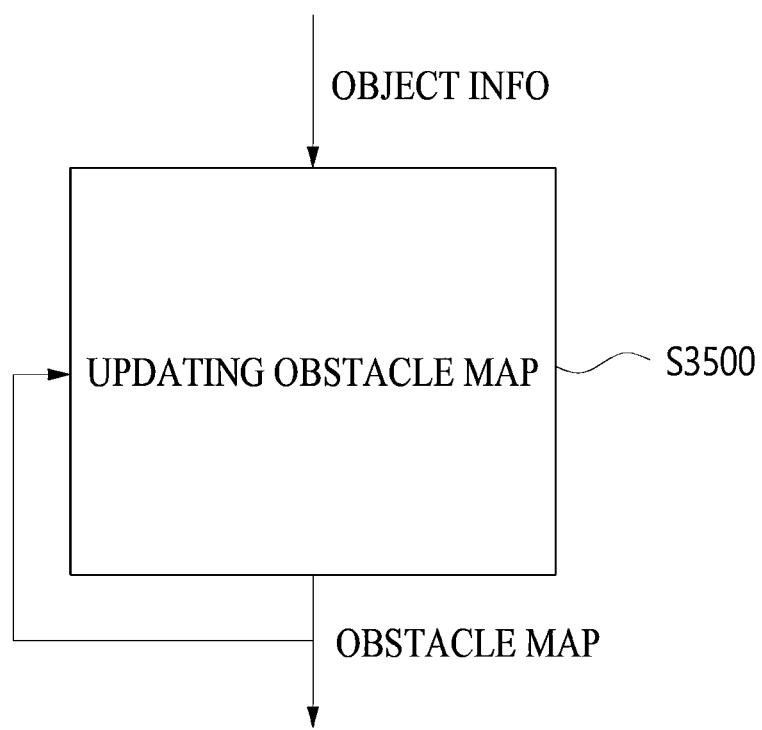
FIGS. 28 and 29 are block diagrams relating to examples of an obstacle map update operation according to an exemplary embodiment of the present invention.

FIG. 28 is a block diagram relating to an obstacle map update operation according to an exemplary embodiment of the present invention. Referring to FIG. 28, it is possible to generate an obstacle map of a current operation by considering an obstacle map of the previous operation (S3500). For example, a final obstacle map of a current frame may be generated by adding the obstacle map of the previous frame and the obstacle map of the current frame at a certain ratio. A plurality of previous frames may be used to generate a final obstacle map.

The obstacle map may be updated by ignoring the previous frame regarding a region detected in a marine image of the current frame and considering the previous frame regarding a region not detected in the marine image of the current frame. For example, a weight of unit regions determined to be an obstacle in the current frame may be set to 0, a weight of sailable regions may be set to 255, and a weight of undetected regions may be set by considering a weight of the previous frame and a weight of the current frame at a certain ratio. The weight of undetected regions may converge into a specific value over time. Also, the specific value may vary according to types of objects. For example, a weight of a stationary obstacle may converge into a smaller value than that of a moving obstacle. Alternatively, the weight of undetected regions may not be updated.

Unit regions corresponding to a zone which is not within the FOV of the marine image of the current frame may be processed in the same way as described above regarding the undetected regions.

A weight of specific regions may not be updated. For example, when a stationary obstacle which does not move is detected in a region, a weight of the region may be fixed at a specific value, such as 0, and may not change over time. The stationary obstacle may be a land, an island, a rock, or the like.

Figure 29:
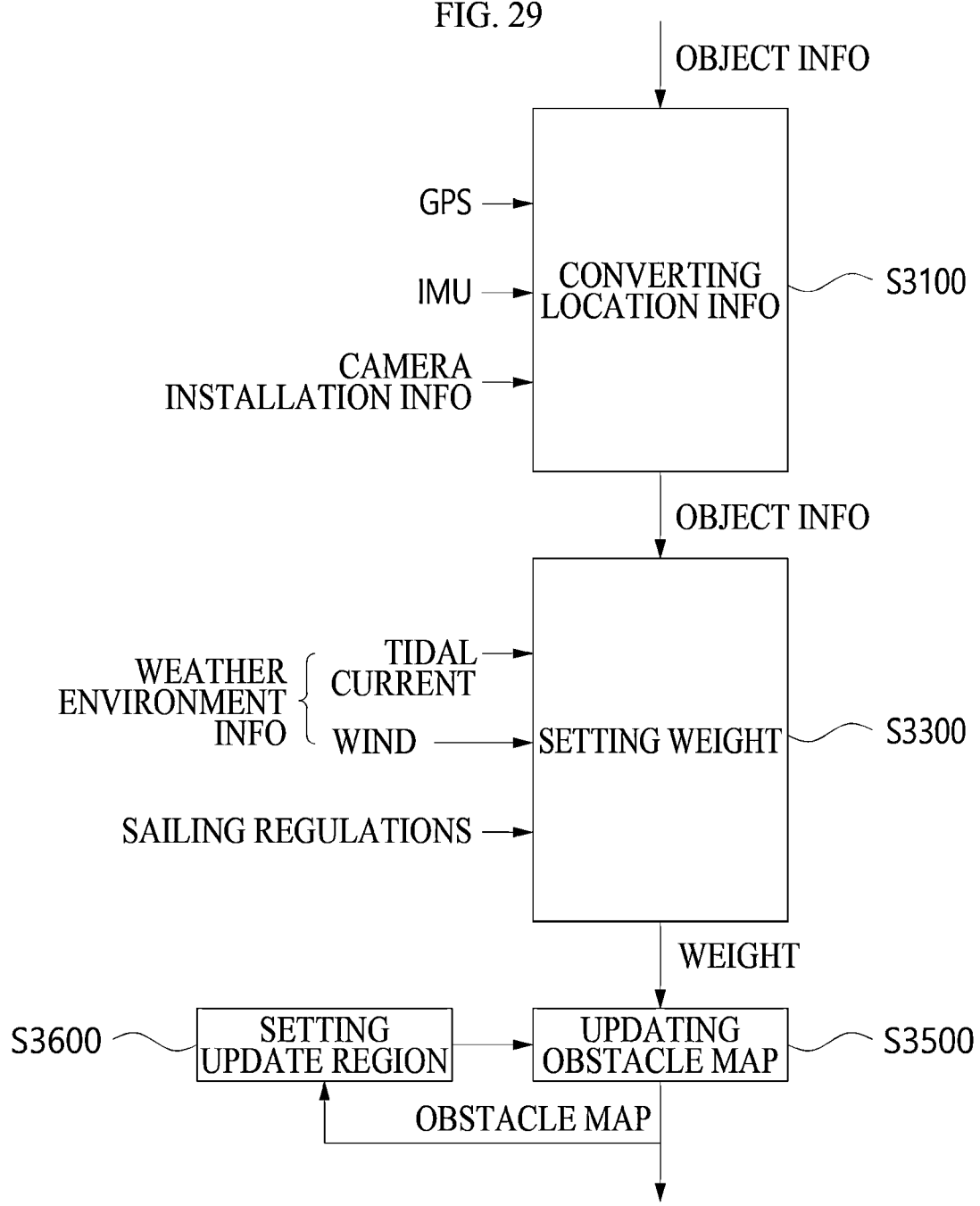

FIG. 29 is a block diagram relating to an obstacle map update operation according to an exemplary embodiment of the present invention. Referring to FIG. 29, it is possible to convert location information of an obstacle into absolute coordinates using the location of the ship and/or the camera calculated with the GPS installed in the ship, the position information of the ship obtained by the IMU, and the camera position information based on the camera position information (S3100). A weight may be set using the converted object information, weather environment information, and sailing regulations (S3300), and a final obstacle map of a current frame may be output (S3500) using the obstacle map of the previous frame and an update region set on the obstacle map (S3600).

In a path generation operation, a path which is sailable by the ship is generated. It is possible to generate the path by considering a movement distance, a movement time, the costs of sailing, and the like of the ship. The path may be generated by additionally considering the surroundings of the ship, such as tidal current and wind, and sailing regulations, such as COLREG, may also be taken into consideration.

Different paths may be generated according to circumstances by considering the minimum distance, the minimum time required, the minimum cost, the danger, and the like. For example, since the probability that a person is present is higher in the neritic zone than in the oceanic zone, the path may be generated in a high safety mode for safe sailing. In the oceanic zone or in the case of a large ship, the path may be generated in a high energy efficiency mode to reduce fuel consumption. The path may be generated in an optimal manner by considering a plurality of variables at an appropriate ratio. Such a mode may be selected manually or automatically. As an example, the path in the neritic zone may be generated in the high safety mode, which is automatically switched to the high energy efficiency mode using ship location information of a GPS or the like, and the path in the oceanic zone may be generated in the high energy efficiency mode. As another example, when many obstacles are detected, the mode may be automatically switched to the high safety mode to generate the path.

Figure 30:
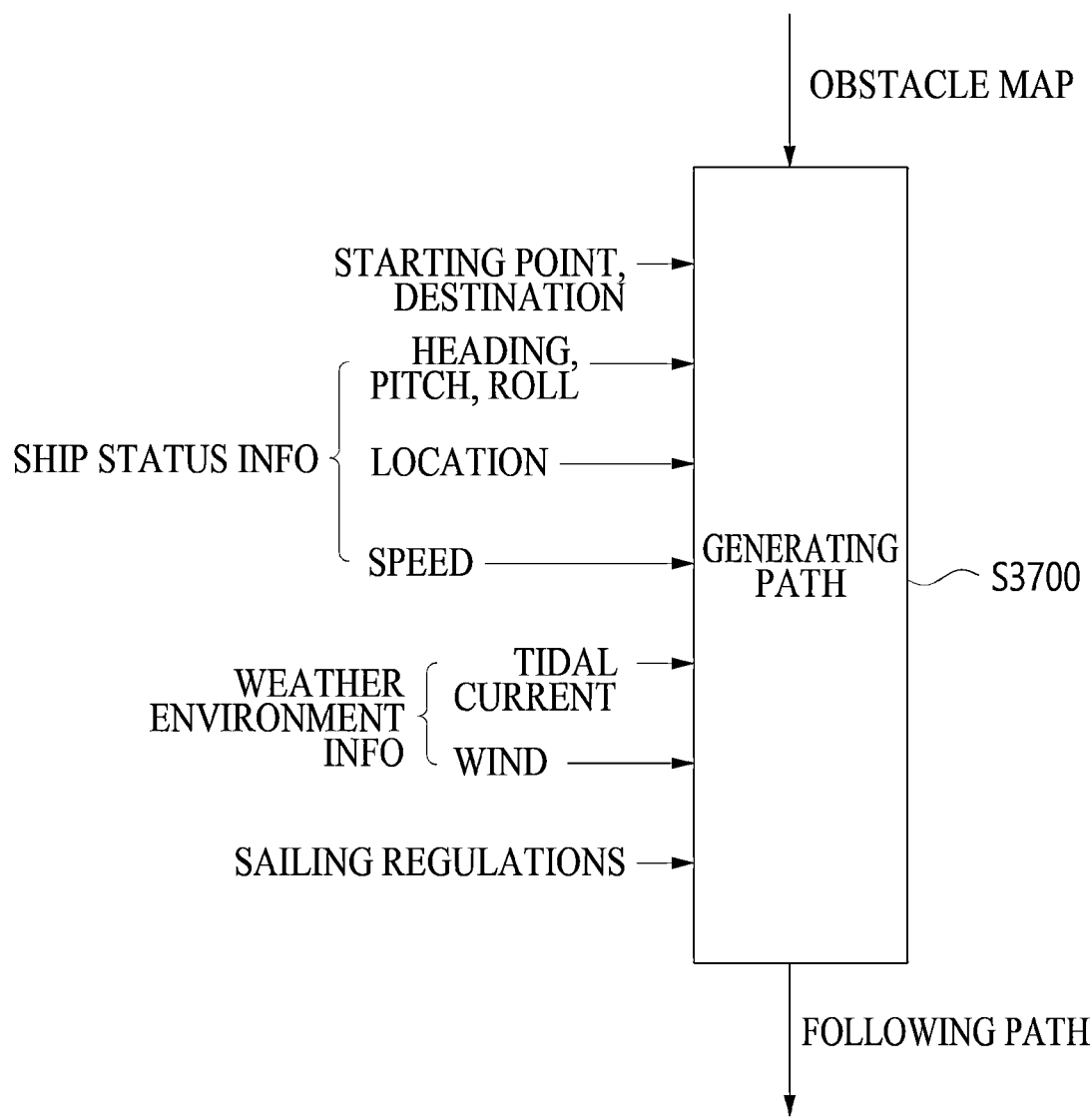
FIG. 30 is a block diagram relating to a path generation operation according to an exemplary embodiment of the present invention.

FIG. 30 is a block diagram relating to a path generation operation according to an exemplary embodiment of the present invention. Referring to FIG. 30, a following path may be generated using the obstacle map, the starting point, the destination, the ship status information, the weather environment information, and the sailing regulations as inputs (S3700). Input information may include all or only some of the aforementioned information and may also include information other than the aforementioned information.

The following path may be generated using a neural network. For example, a neural network which outputs a following path using an obstacle map or the like as an input may be trained and used in the path generation operation.

An algorithm other than a neural network may be used to generate the following path. Any path generation algorithm, such as Dijkstra's algorithm, A* algorithm, D* algorithm, and Theta* algorithm, may be used without limitations.

Figure 31:
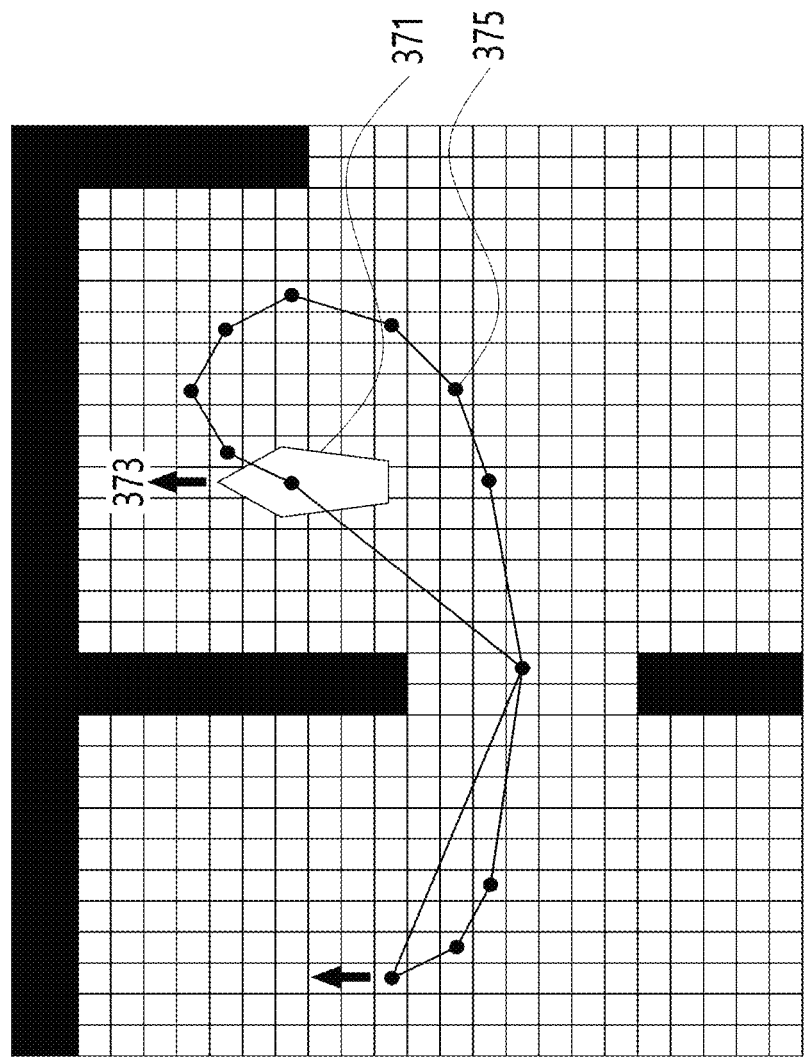
FIG. 31 is a diagram relating to a path generation operation according to an exemplary embodiment of the present invention.

The path may be generated by considering heading, the maximum rudder angle of the ship, and the like. FIG. 31 is a diagram relating to a path generation operation according to an exemplary embodiment of the present invention. Referring to FIG. 31, a ship 371 is facing a specific heading 373. The path of a solid line may be generated when the heading 373 of the ship 371 and the maximum rudder angle are not taken into consideration, and the path of a broken line may be generated when the heading 373 of the ship 371 and the maximum rudder angle are taken into consideration. The path may be presented with waypoints 375. The path of the solid line may be impossible or difficult for the ship to follow. On the contrary, the path of the broken line may be easy or possible for the ship to follow. Such an algorithm specialized for ships may be used to generate a path useful for path following.

Figure 32:
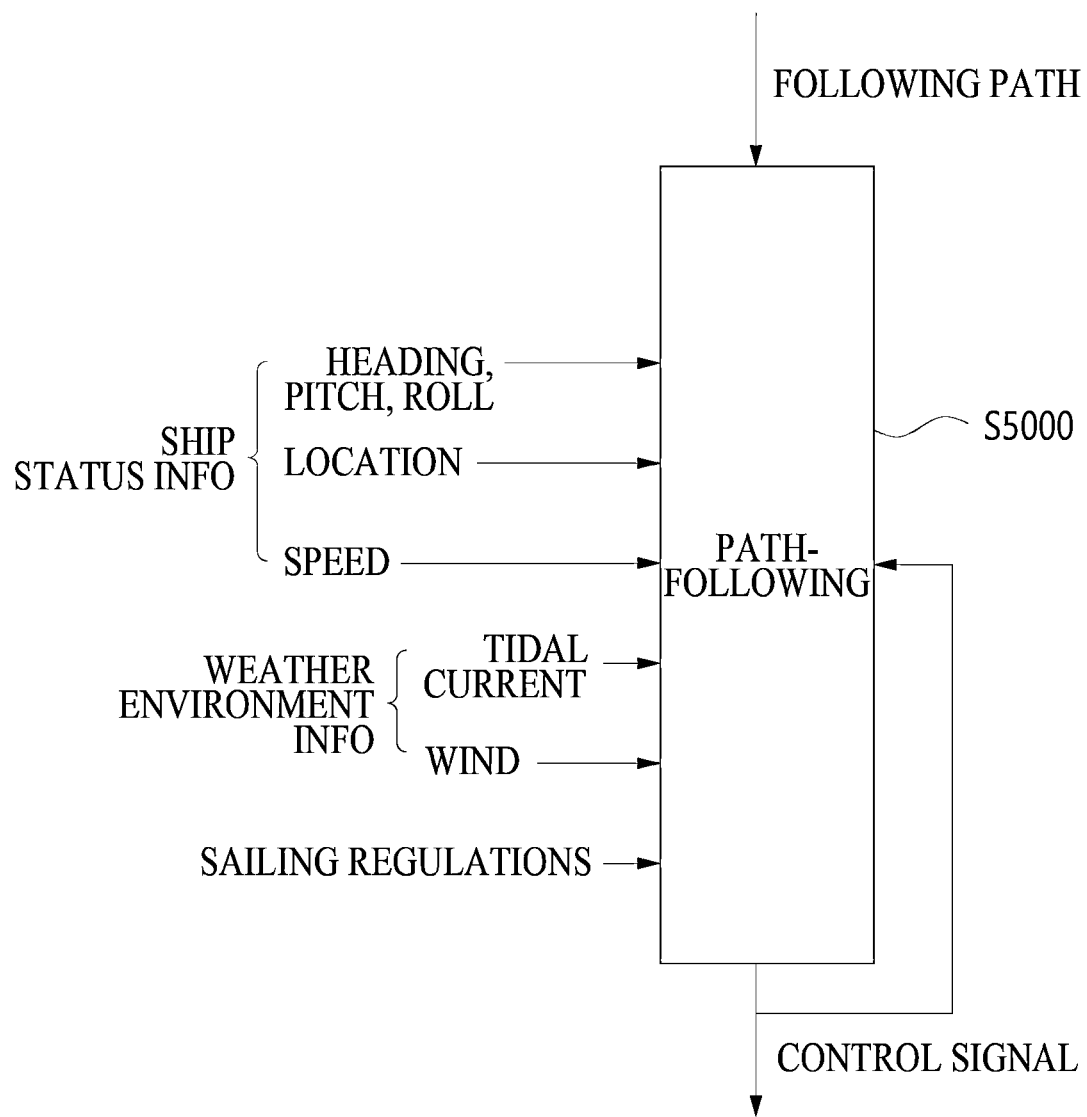
FIG. 32 is a block diagram relating to a path-following operation according to an exemplary embodiment of the present invention.

In the path-following operation, a control signal is generated so that the ship may follow the planned path. FIG. 32 is a block diagram relating to a path-following operation according to an exemplary embodiment of the present invention. Referring to FIG. 32, in the path-following operation S5000, a following path, ship status information, weather environment information, sailing regulations, etc. may be input, and a control signal for the ship may be output. The input information may include all or only some of the aforementioned information and may also include information other than the aforementioned information.

The control signal includes a speed control signal and a heading control signal. The speed control signal may be a signal for adjusting the rotational speed of a propeller. Alternatively, the speed control signal may be a signal for adjusting revolution per unit time of the propeller. The heading control signal may be a signal for adjusting the rudder. Alternatively, the heading control signal may be a signal for adjusting the wheel or helm.

Also, a control signal of a previous frame may be used in the path-following operation of a current frame.

A neural network may be used to perform the path-following operation. In this case, any method, such as supervised learning, unsupervised learning, reinforcement learning, and imitation learning, may be used to train the neural network without limitations.

When reinforcement learning is used, the neural network may be trained by providing rewards according to a sailing time, a sailing distance, safety, energy efficiency, and the like. For example, when the sailing time is short, a high reward may be provided. As the sailing distance becomes shorter, a higher reward may be provided. As the number of collisions with obstacles becomes smaller, a higher reward may be provided. As the amount of fuel used becomes small, a higher reward may be provided. Rewards may be determined in various other ways as well, and rewards may be provided by considering a plurality of variables rather than only one variable. For example, it is possible to select a reward setting method in which both of the sailing time and the energy efficiency are taken into consideration.

The path-following operation may be performed using another path-following algorithm. For example, it is possible to use algorithms, such as model predictive control (MPC), which is a technology for receiving locations to travel to for an arbitrary time period T from a current point in time and generating an optimal control signal, pure pursuit, the Stanley method, and vector pursuit.

Even in autonomous navigation, information may be required for a person to monitor the ship. Such information may be transferred to a person through visualization. Results used or generated in the above-described situation awareness, path-planning, and path-following operations may be processed and visualized.

Visualization data may be generated from one image. Alternatively, visualization data may be generated from a plurality of images. The plurality of images may be images obtained from different cameras as well as images obtained from the same camera.

When a plurality of images are used for visualization, regions presented by the images may differ from each other. In this case, the plurality of images may be stitched for visualization. For example, a plurality of images presenting surrounding regions of the ship may be stitched such that around-view monitoring may be possible. Around-view monitoring may provide surroundings of the ship in a bird's eye view.

When image segmentation results are visualized, results showing an object detected through the image segmentation may be output through a display panel. For example, the sea, a ship, geographical features, a navigation mark, etc. included in an image may be presented in different colors.

Also, it is possible to output obstacle characteristics including the distance, speed, danger, size, and collision probability of an obstacle. Obstacle characteristics may be output using color, which may vary according to the distance, speed, danger, size, and collision probability of an obstacle.

Obstacle characteristics sensed by an obstacle sensor may be output together. For example, when a region is observed through image segmentation, image segmentation results of the region may be output, and when a region is not observed, sensing results of the region obtained by an obstacle sensor may be output.

The obstacle map, the following path, a path history, and/or the like may be visualized. For example, a ship-oriented obstacle map, an existing path, and an obstacle-avoiding path may be output in a bird's eye view.

Figure 33:
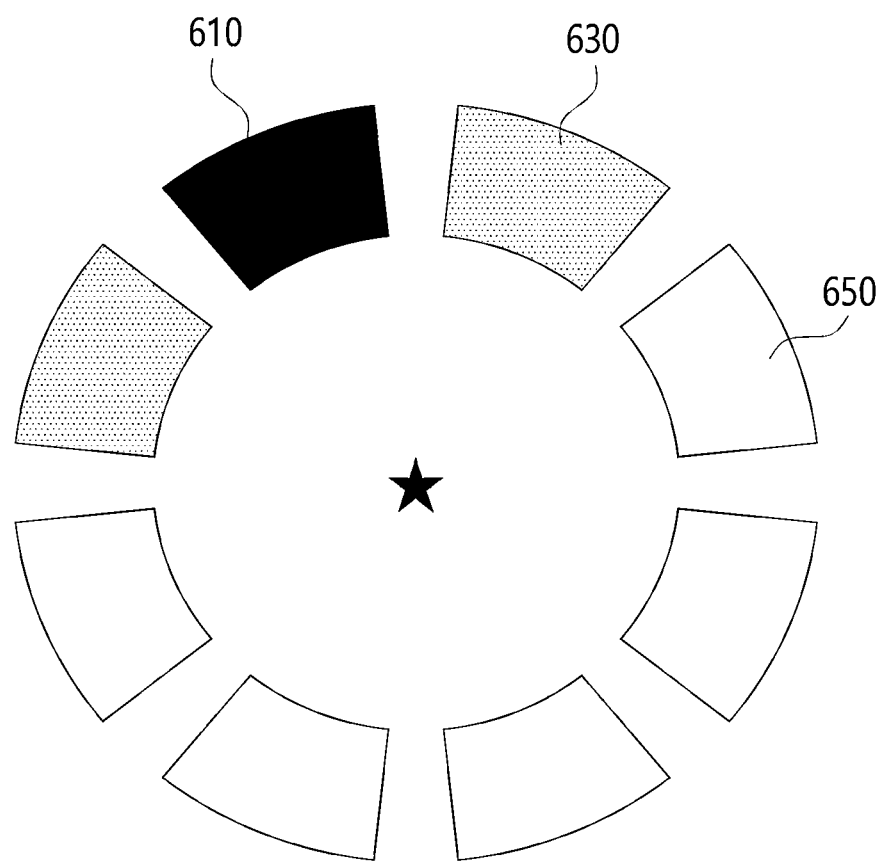
FIG. 33 is a diagram relating to visualization according to an exemplary embodiment of the present invention.

FIG. 33 is a diagram relating to visualization according to an exemplary embodiment of the present invention. Referring to FIG. 33, a display panel may output a relative position of an obstacle based on a current location of a ship, characteristics of the obstacle, and the like. For example, a black region 610 may present a first obstacle which is closer than a predetermined distance, and a grey region 630 may present a second obstacle which is farther than the predetermined distance. Alternatively, the black region 610 may present a region with high danger, the grey region 630 may present a region with medium danger, and a white region 650 may present a region with little danger.

Figure 34:
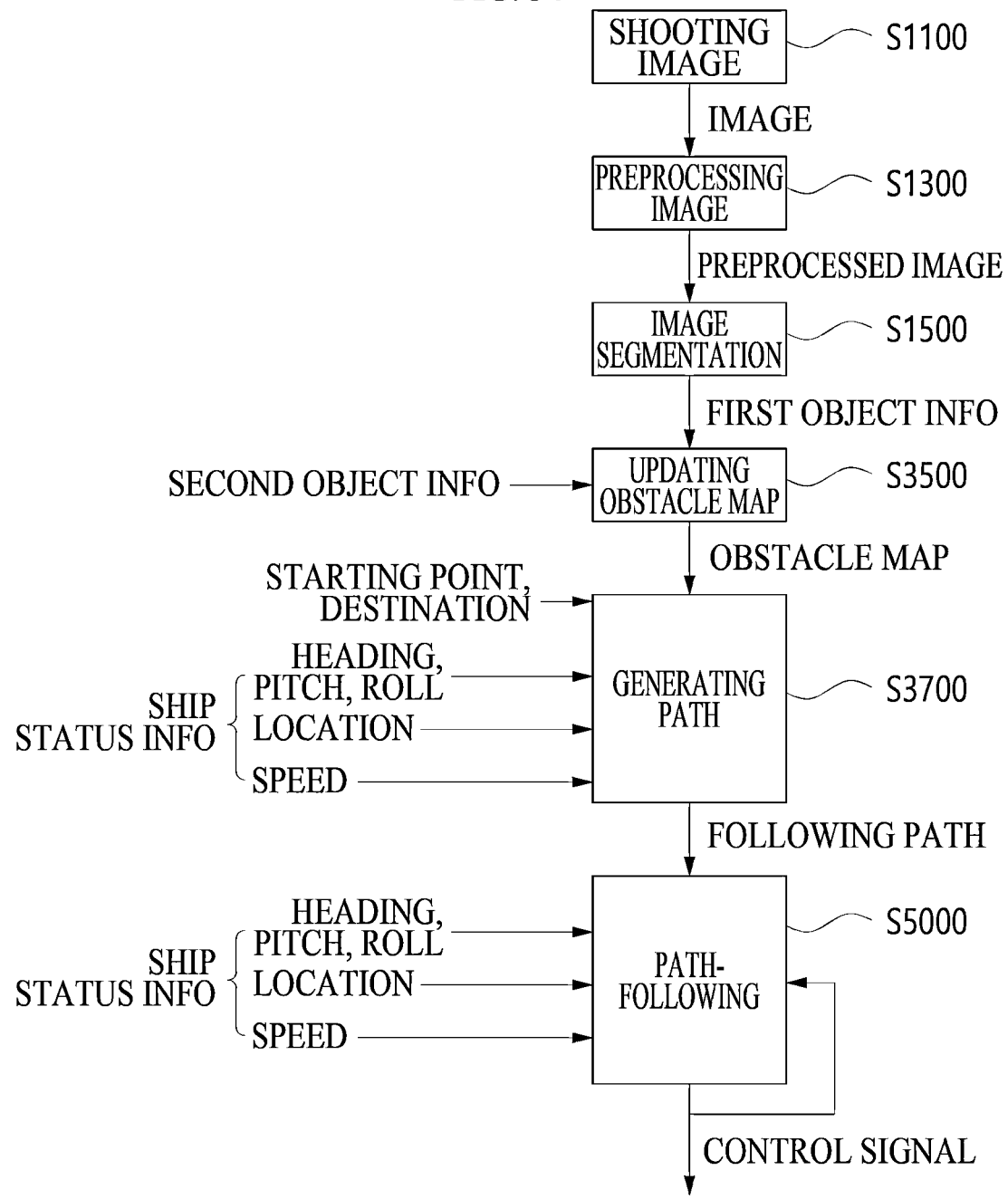
FIGS. 34, 35, and 36 are block diagrams relating to examples of autonomous navigation based on image segmentation according to an exemplary embodiment of the present invention.

FIG. 34 is a block diagram relating to an autonomous navigation method based on image segmentation according to an exemplary embodiment of the present invention. Referring to FIG. 34, an image may be obtained by capturing the image with a camera (S1100), a preprocessed image may be obtained through a preprocessing process for the image (S1300), first object information may be obtained by segmenting the preprocessed image (S1500), an obstacle map may be updated with the first object information and second object information obtained through an obstacle sensor or the like (S3500), a following path may be generated using the obstacle map, a starting point, a destination, and ship status information (S3700), and a control signal of a current frame may be generated using the following path, the ship status information, and a control signal of a previous frame (S5000). Image segmentation (S1500) may be performed using a neural network, and other operations may be performed using the above-described algorithm other than a neural network. Alternatively, image segmentation may be performed using a neural network (S1500), the path-planning operation (S3500 and S3700) may be performed using a non-neural network algorithm, and the path-following operation (S5000) may be performed using the neural network.

After a specific operation is repeated a plurality of times in one frame, the next operation may be performed. For example, image segmentation (S1500) may be performed several times, and then path planning (S3500 and S3700) and path following (S5000) may be performed. Alternatively, image segmentation (S1500) may be performed several times, and then obstacle map update (S3500) may be performed.

It is unnecessary to perform an operation on a frame after all operations are performed on the previous frame. For example, while the path generation operation (S3700) is performed on one frame, image segmentation (S1500) may be performed on the next frame. Alternatively, the path-following operation (S5000) of one frame, the path generation operation (S3700) of the next frame, and the image segmentation operation (S1500) of the second next frame may be performed together.

In the exemplary embodiment of FIG. 34, the situation awareness, path-planning, and path-following operations are performed separately. However, at least two of the situation awareness, path-planning, and path-following operations may be performed through one neural network. Described below are a case in which path-planning and path-following are performed through one neural network and a case in which all of situation awareness, path-planning, and path-following are performed through one neural network, but the present invention is not limited thereto.

Figure 35:
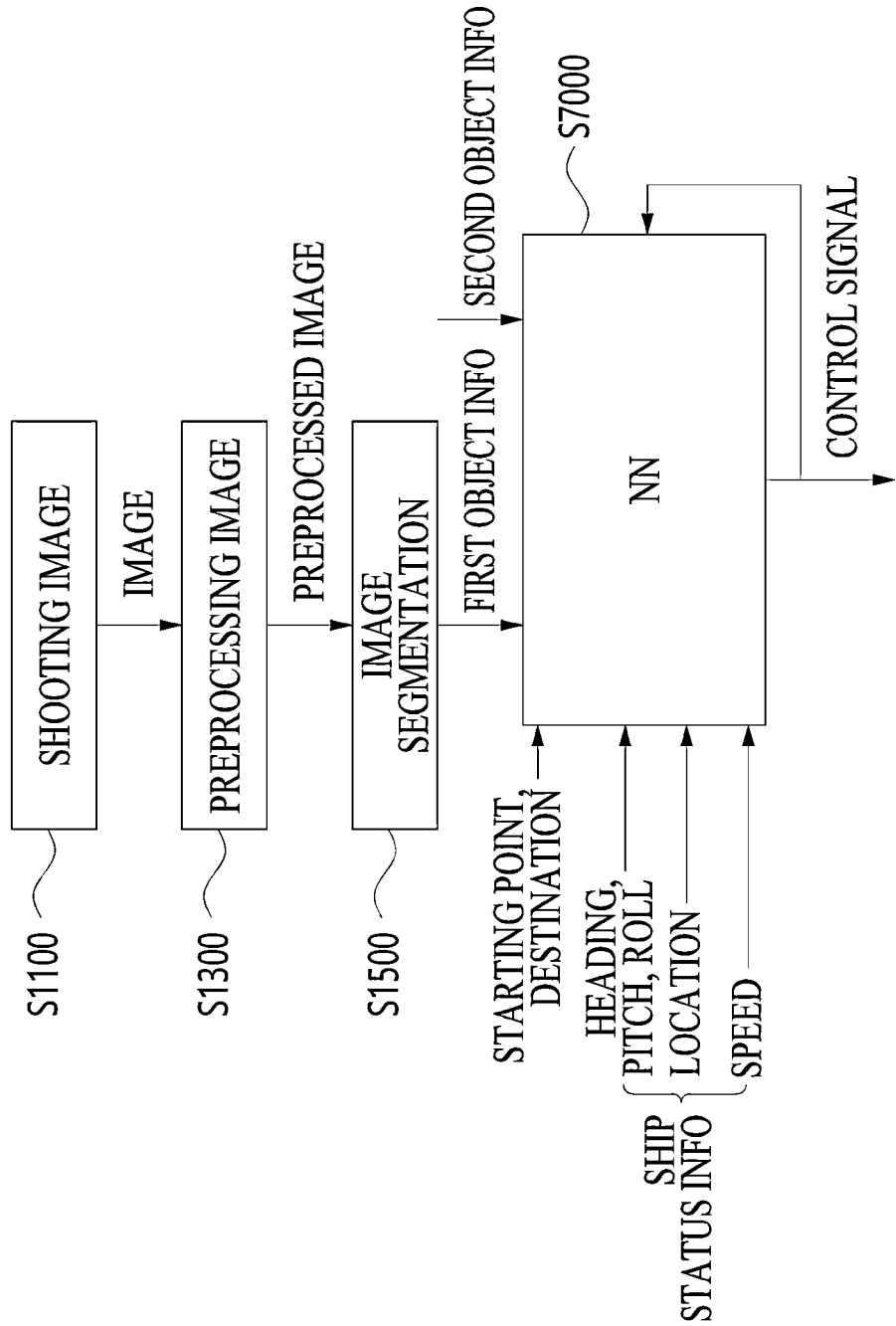

FIG. 35 is a block diagram relating to autonomous navigation based on image segmentation. Referring to FIG. 35, an image may be obtained by capturing the image with a camera (S1100), a preprocessed image may be obtained through a preprocessing process for the image (S1300), first object information may be obtained by segmenting the preprocessed image (S1500), and a control signal of a current frame may be generated using the first object information, second object information obtained through an obstacle sensor, a starting point, a destination, ship status information, and a control signal of a previous frame (S7000).

According to the autonomous navigation method of FIG. 34, a first neural network for image segmentation, a second neural network for path planning, and a third neural network for path following may be separately trained and then used for an inference operation. However, a neural network which performs all of image segmentation, path planning, and path following may be trained at once and then used. Such learning of a neural network is referred to as end-to-end learning.

Figure 36:
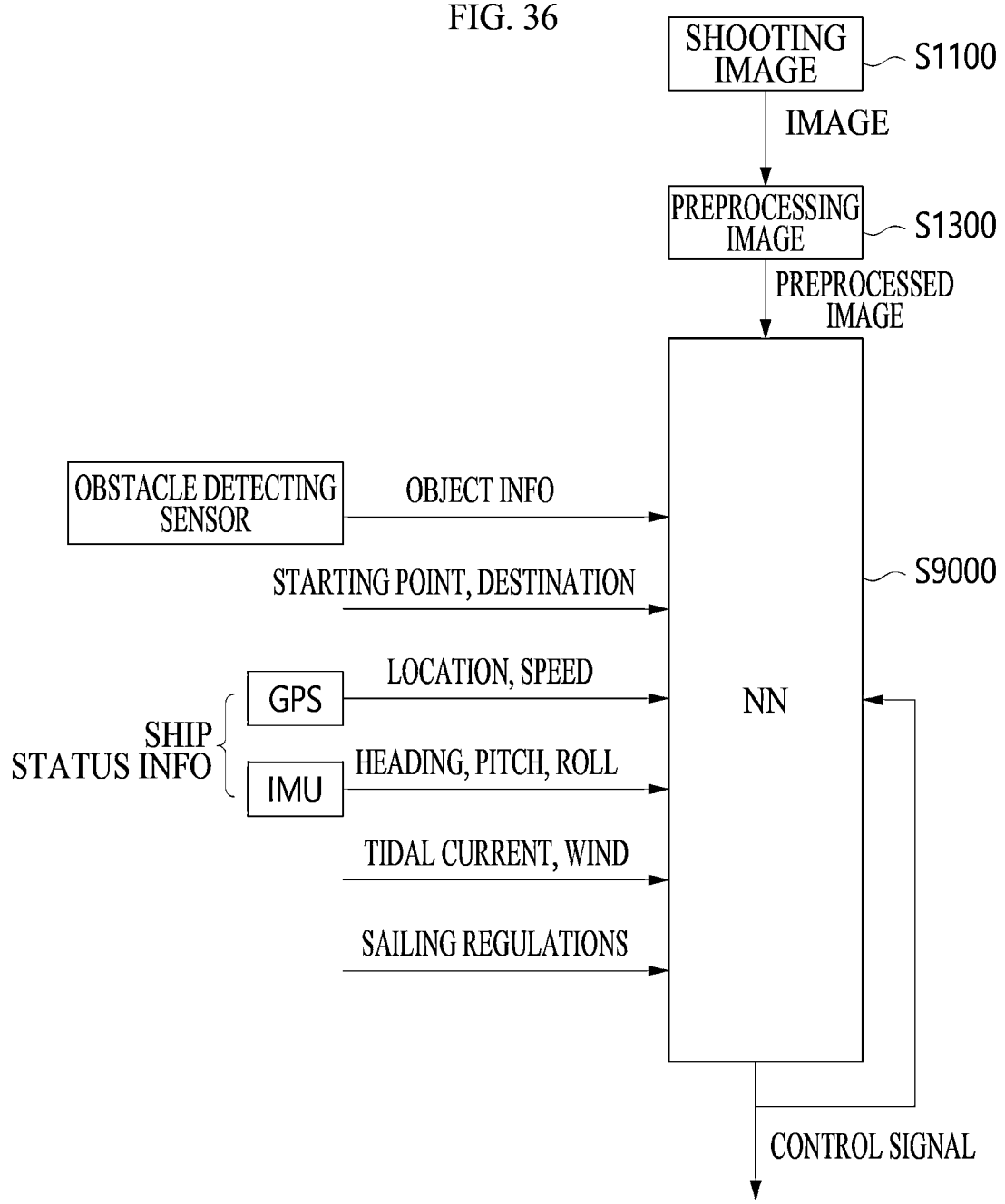

FIG. 36 is a block diagram relating to autonomous navigation based on image segmentation. Referring to FIG. 36, image segmentation, path planning, and path following may be performed using one neural network. For example, a neural network which receives information, such as an image, object information from an obstacle detection sensor, ship status information (the location and speed of a ship obtained from a GPS, the heading of the ship from an IMU, etc.) a starting point, a destination, waypoints, tidal current, wind, sailing regulations, and a control signal and outputs a ship control signal may be trained and used for autonomous navigation. The aforementioned pieces of input information are examples. All or only some of the aforementioned information may be used, and information other than the aforementioned information may also be used.

Figure 37:
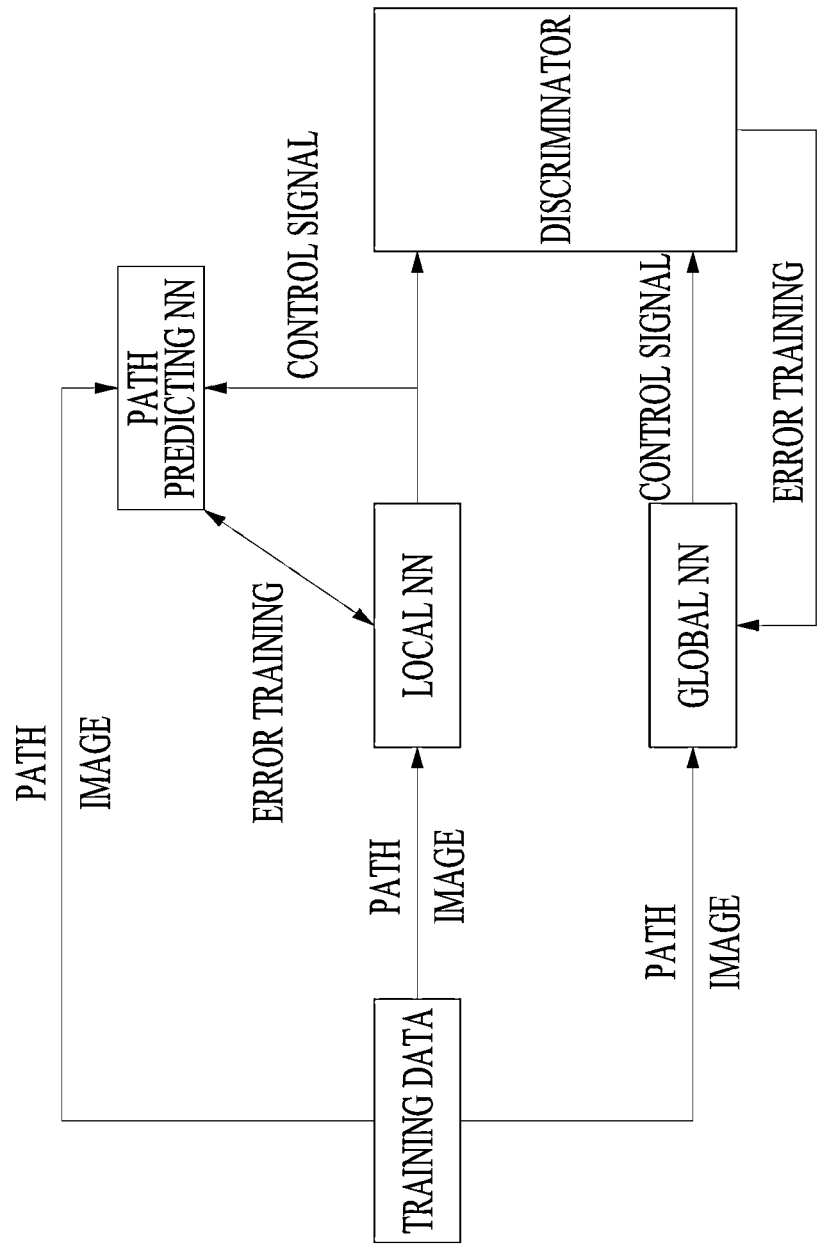
FIG. 37 is a block diagram relating to a learning method of a neural network which outputs a control signal according to an exemplary embodiment of the present invention.

FIG. 37 is a block diagram relating to a learning method of a neural network which outputs a control signal according to an exemplary embodiment of the present invention. This learning method may be useful when it is difficult to obtain a control signal as training data. In an inference operation, a global neural network is used. A local neural network is used for learning of the global neural network. The local neural network may handle linearity, and the global neural network may handle nonlinearity. The local neural network may receive a path and an image and output a control signal. A path-predicting neural network may receive a path, an image, and a control signal and output a subsequent path. It is possible to train the local neural network through error training based on the control signal output by the local neural network and the subsequent path output by the path-predicting neural network. The global neural network may receive a path and an image to output a control signal and may be trained through a discriminator which uses the control signal output by the local neural network and the control signal output by the global neural network. There may be a plurality of local neural networks and a plurality of path-predicting neural networks. The global neural network may learn errors from several local neural network and handle all inputs and outputs as a single network.

Figure 38:
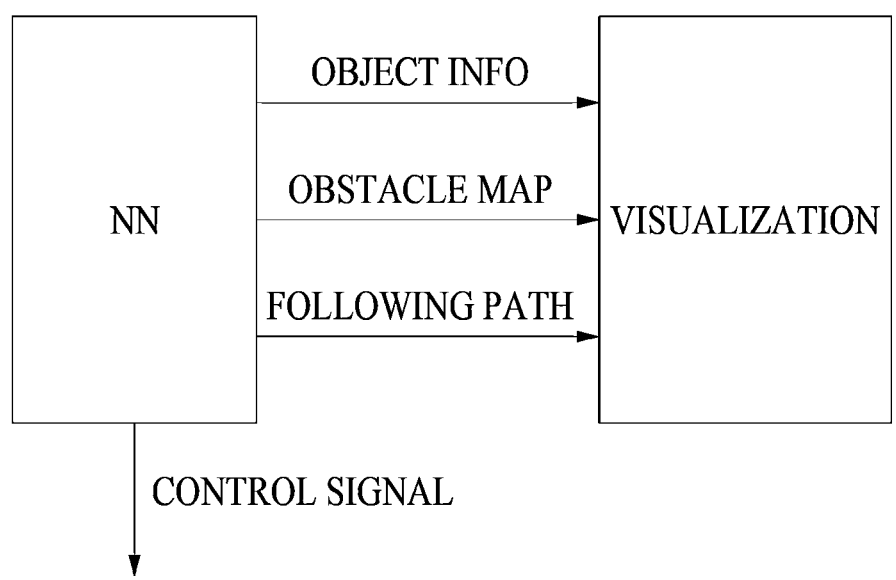
FIG. 38 is a block diagram relating to an output of a neural network according to an exemplary embodiment of the present invention.

FIG. 38 is a block diagram relating to an output of a neural network according to an exemplary embodiment of the present invention and shows only an output of the neural network of FIG. 36. In comparison to FIG. 36, for visualization, it is possible to obtain object information, an obstacle map, a following path, etc. from a neural network. Hereinafter, the pieces of information are referred to as intermediate output information. The intermediate output information may be visualized through the above-described visualization method.

A separate neural network may be used to obtain the intermediate output information. The neural network of FIG. 38 (hereinafter, referred to as "autonomous navigation neural network") may obtain intermediate output information through a neural network for visualization (hereinafter, referred to as "visualization neural network"). For example, the visualization neural network may receive information output from the autonomous navigation neural network and output object information, an obstacle map, a following path, and the like. Several pieces of intermediate output information may be obtained by one neural network. Alternatively, different neural networks may be used for respective pieces of intermediate output information.

The visualization neural network may be trained separately from the autonomous navigation neural network. Alternatively, the visualization neural network may be trained together with the autonomous navigation neural network.

As described above, objects may include obstacles, such as geographical features, structures, vessels, buoys, and people, a region in which a vessel may sail, such as the ocean, and a region which may not be related to sailing of a vessel, such as the sky. In addition, objects may include a backlight, a crane, a rope, and sea clutter. Here, the backlight may denote a phenomenon in which information on an object disappears in an image or the like generated by a device due to the sun, lighting, or the like, or a region of the image corresponding to the phenomenon (e.g., a region appears to be white in a camera image due to direct light). Here, the rope may include a mooring rope for mooring a vessel. In addition, an object which is a vessel may include a large vessel, a small vessel, and a tug. In addition, an object may include the upper surface and the side surface of a vessel. In this case, information on a region or point at which the upper surface and the side surface come into contact with each other may be acquired on the basis of the upper surface and the side surface of the vessel. Also, an object may include a side line of a vessel corresponding to a region or point at which the upper surface and the side surface of the vessel come into contact.

Some methods of representing location information and additional information according to exemplary embodiments are described below. For convenience of description, location information is distance information, and additional information is object type information, but not limited thereto.

TABLE 2

| Index (distance index, type index) | Class |
|---|---|
| (0, 0) | Undefined distance + Etc. |
| (0, 1) | Undefined distance + Sea |
| (1, 2) | Short distance + Geographical features |
| (2, 2) | Middle distance + Geographical features |
| (3, 2) | Long distance + Geographical features |
| (1, 3) | Short distance + Vessel |
| (2, 3) | Middle distance + Vessel |
| (3, 3) | Long distance + Vessel |
| (0, 4) | Undefined distance + Rope |

Table 2 shows an example of a method of representing location information and type information according to an exemplary embodiment. Referring to Table 2, an index which includes a distance index corresponding to specific distance information and a type index corresponding to specific type information may be allocated to a class corresponding to the specific distance information and the specific type information. Here, each of the distance index and the type index may be represented as a single value. As a non-limiting example, the index may be represented in the form of (distance index, type index). In this case, a region or pixel labeled with a specific index in an image may be considered as being labeled with a specific distance index and a specific type index. For example, referring to Table 2, a region or pixel labeled with an index (1, 3) may be considered as being labeled with short distance and a vessel.

Referring to Table 2, distance indices may include a first distance index (0) corresponding to undefined distance, a second distance index (1) corresponding to short distance, a third distance index (2) corresponding to middle distance, and a fourth distance index (3) corresponding to long distance. Also, type indices may include a first type index (0) corresponding to etc., a second type index (1) corresponding to the sea, a third type index (2) corresponding to geographical features, a fourth type index (3) corresponding to a vessel, and a fifth type index (4) corresponding to a rope.

TABLE 3

| Index (distance index \| type index) | Class |
|---|---|
| (0 \| 1, 0, 0, 0, 0, 0) | Undefined distance + Etc. |
| (0 \| 0, 1, 0, 0, 0, 0) | Undefined distance + Sea |
| (1 \| 0, 0, 1, 0, 0, 0) | Short distance + Geographical features |
| (2 \| 0, 0, 1, 0, 0, 0) | Middle distance + Geographical features |
| (3 \| 0, 0, 1, 0, 0, 0) | Long distance + Geographical features |
| (1 \| 0, 0, 0, 1, 0, 0) | Short distance + Vessel |
| (2 \| 0, 0, 0, 1, 0, 0) | Middle distance + Vessel |
| (3 \| 0, 0, 0, 1, 0, 0) | Long distance + Vessel |
| (0 \| 0, 0, 0, 0, 1, 0) | Undefined distance + Rope |
| (0 \| 0, 0, 0, 0, 0, 1) | Undefined distance + Crane |

Table 3 shows another example of a method of representing location information and type information according to an exemplary embodiment. Comparing Tables 2 and 3, it is possible to see that methods of representing type indices are different. Specifically, each index of Table 3 may include a distance index represented as a single value and a type index represented as a set of a plurality of single values.

Referring to Table 3, each index may be represented to include one distance index and a plurality of type indices. As a non-limiting example, an index may be represented in the form of (distance index| first type index, second type index, . . . , nth type index). In this case, each of the plurality of type indices may correspond to the type information of a specific object. For example, referring to Table 3, when a specific region or pixel in an image corresponds to first type information, a first type index corresponding to the first type information may have a first value (e.g., 1), and other type indices may have a second value (e.g., 0). In this case, the specific region or pixel may be considered as being labeled with the first type index.

Table 3 shows a case in which type indices are represented as a set of a plurality of single values. On the contrary, an index may include a distance index represented as a set of a plurality of single values and a type index represented as a single value. Otherwise, an index may include a distance index represented as a set of a plurality of single values and a type index represented as a set of a plurality of single values.

The above-described methods of representing distance information and type information are only exemplary, and distance indices, type indices, indices, classes, etc. may be defined in a way different from the methods.

A case in which one index corresponds to one object or one piece of distance information has been described above, but one index may correspond to a plurality of objects or a plurality of pieces of distance information.

Figure 39:
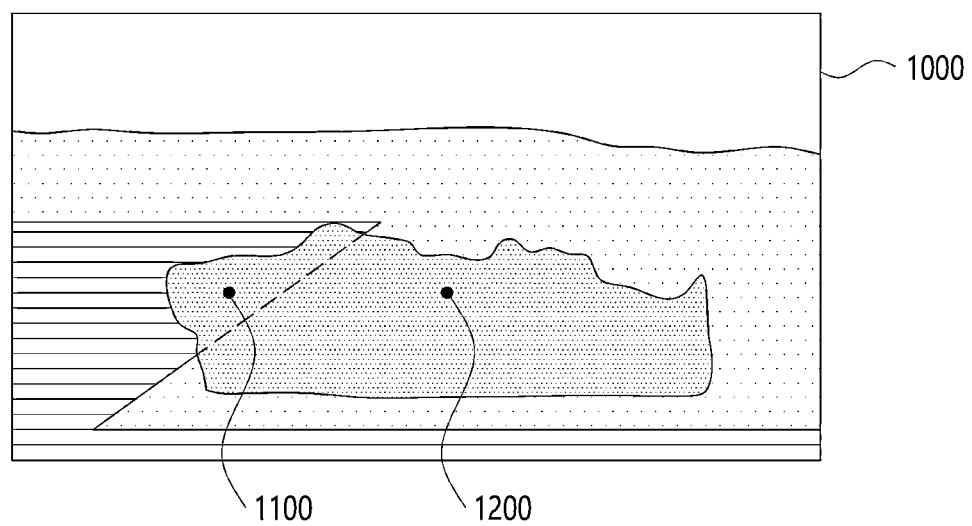
FIG. 39 is a diagram relating to an index which represents objects overlapping each other according to an exemplary embodiment.

According to an exemplary embodiment, an index may be set to represent objects overlapping each other. FIG. 39 is a diagram relating to an index which represents objects overlapping each other according to an exemplary embodiment. Referring to FIG. 39, an image 1000 may include a region 1100 in which a vessel and a geographical feature overlap and a region 1200 in which the vessel and the sea overlap.

As an example, when a single identification value is allocated to a class as shown in Table 1, identification values may include a first identification value (e.g., 11) corresponding to both the vessel and the geographical feature and a second identification value (e.g., 12) corresponding to both the vessel and the sea. In this case, referring to FIG. 39, in a region corresponding to the vessel in the image 1000, a first identification value (e.g., 11) may correspond to the region 1100 in which the vessel and the geographical feature overlap, and a second identification value (e.g., 12) may correspond to the region 1200 in which the vessel and the ocean overlap.

As another example, when classes correspond to indices including type indices represented as a single value as shown in Table 2, the type indices may include a first type index (e.g., 5) corresponding to both a vessel and a geographical feature and a second type index (e.g., 6) corresponding to both a vessel and a sea. In this case, referring to FIG. 39, in the region corresponding to the vessel in the image 1000, an index (e.g., (1, 5)) including the first type index may correspond to the region 1100 in which the vessel and the geographical feature overlap, and an index (e.g., (1, 6)) including the second type index may correspond to the region 1200 in which the vessel and the sea overlap.

As yet another example, when classes correspond to indices including type indices represented as a set of a plurality of single values as shown in Table 3, referring to FIG. 39, in the region corresponding to the vessel in the image 1000, a first index (e.g., (1|0, 0, 1, 1, 0, 0)) may correspond to the region 1100 in which the vessel and the geographical feature overlap, and a second index (e.g., (1|0, 1, 0, 1, 0, 0)) may correspond to the region 1200 in which the vessel and the sea overlap. In this case, unlike the above-described examples related to Tables 1 and 2, objects overlapping each other may be represented without adding an identification value or a type index.

Although the case in which the vessel and the geographical feature overlap and the case in which the vessel and the sea overlap have been described above, a case in which vessels overlap or the like may also be represented in the same way. For example, a first vessel and a second vessel overlap, and thus the first vessel may overlap at least a part of the second vessel behind the first vessel. In this case, an overlapping region may not be labeled to correspond to the first vessel only but may be labeled to correspond to both the first vessel and the second vessel.

Also, even when objects do not physically overlap, an sea region in which sea clutter is present may not be labeled to correspond to only one of sea clutter and the sea but may be labeled to correspond to both sea clutter and the sea. This may also be applied to other cases such as a case of labeling a region in which backlight and a vessel overlap to correspond to both the backlight and the vessel.

According to an exemplary embodiment, an index may be set to represent connectivity between objects. Here, the connectivity may denote whether the objects are physically connected. Alternatively, the connectivity may denote whether one of the objects is installed on the other.

Figure 40:
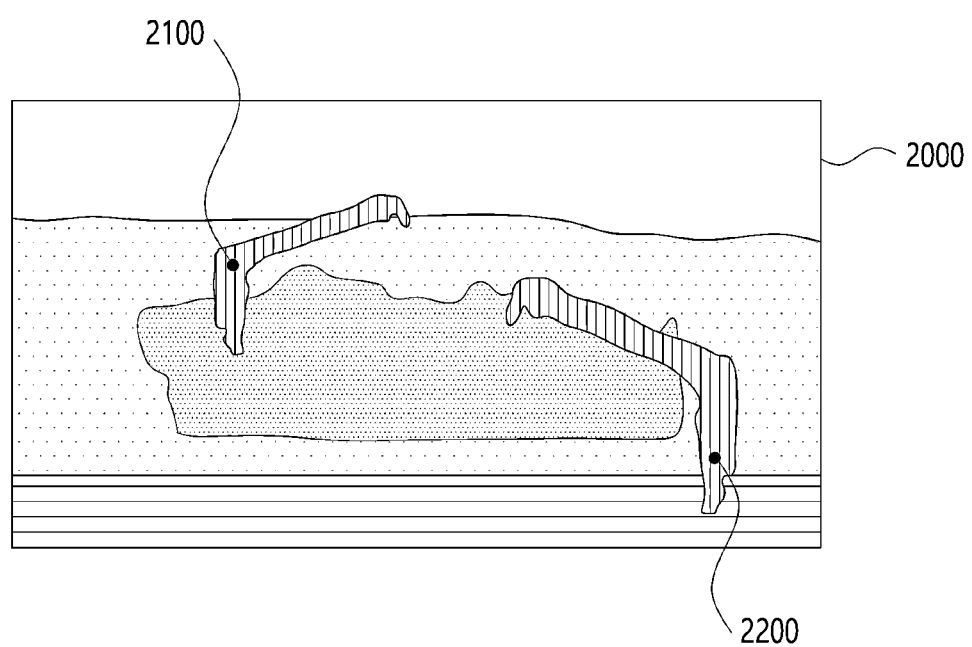
FIG. 40 is a diagram relating to an index representing connectivity between objects according to an exemplary embodiment.

FIG. 40 is a diagram relating to an index representing connectivity between objects according to an exemplary embodiment. Referring to FIG. 40, an image 2000 may include a region 2100 corresponding to a crane installed on a vessel and a region 2200 corresponding to a crane installed on a port (or a geographical feature, a land).

As an example, when a single identification value is allocated to a class as shown in Table 1, identification values may include a third identification value (e.g., 13) corresponding to the crane installed on the vessel and a fourth identification value (e.g., 14) corresponding to the crane installed on the port. In this case, referring to FIG. 40, the third identification value (e.g., 13) may correspond to the region 2100 corresponding to the crane installed on the vessel in the image 2000, and the fourth identification value (e.g., 14) may correspond to the region 2200 corresponding to the crane installed on the port.

As another example, when a class corresponds to an index including a type index represented as a single value as shown in Table 2, type indices may include a third type index (e.g., 7) corresponding to the crane installed on the vessel and a fourth type index (e.g., 8) corresponding to the crane installed on the port. In this case, referring to FIG. 40, in the image 2000, an index (e.g., (1, 7)) including the third type index may correspond to the region 2100 corresponding to the crane installed on the vessel, and an index (e.g., (1, 8)) including the fourth type index may correspond to the region 2200 corresponding to the crane installed on the port.

As yet another example, when a class corresponds to an index including a type index represented as a set of a plurality of single values as shown in Table 3, referring to FIG. 40, in the image 2000, a third index (e.g., (1|0, 0, 0, 1, 0, 1)) may correspond to the region 2100 corresponding to the crane installed on the vessel, and a fourth index (e.g., (1|0, 0, 1, 0, 0, 1)) may correspond to the region 2200 corresponding to the crane installed on the port. In this case, unlike the above-described examples related to Tables 1 and 2, connectivity between objects may be represented without adding an identification value or a type index.

Although the location at which the crane is installed has been described above as an example of connectivity between objects, connectivity between objects is not limited thereto. For example, a rope connected to at least one of a vessel or a port (or a geographical feature, a land) and the like may be represented in a similar way.

According to an exemplary embodiment, an index may be set to distinguish between the same type of objects. For example, separate identifiers may be given to a plurality of vessels included in an image to distinguish the plurality of vessels from each other. Here, the identifiers may be included in an index for representing object information. Also, giving an identifier to an object included in an image may denote labeling a region or pixel of the image corresponding to the object with the identifier.

Figure 41:
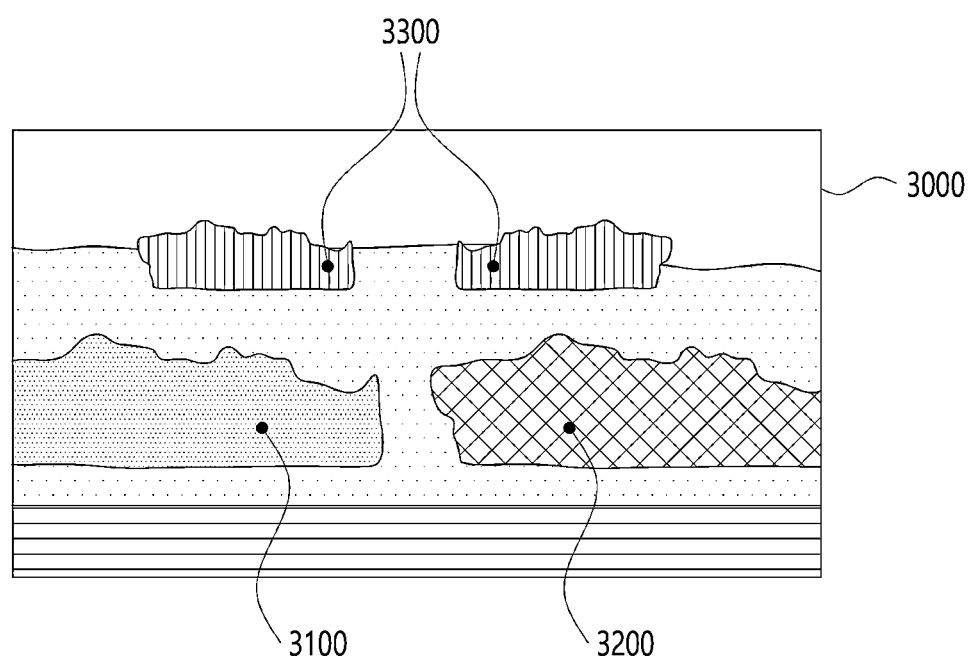
FIG. 41 is a diagram relating to distinguishing between objects of the same type based on distance information according to an exemplary embodiment.

According to an exemplary embodiment, whether to distinguish between objects of the same type may vary according to distance information of the objects. FIG. 41 is a diagram relating to distinguishing between objects of the same type on the basis of distance information according to an exemplary embodiment. Referring to FIG. 41, vessels 3100 and 3200 corresponding to a first distance range which is adjacent to a port (or a geographical feature, a land) may be distinguished from each other, and a vessel 3300 corresponding to a second distance range which is farther than the first distance range may not be distinguished. As an example, when a vessel corresponds to the first distance range, an identifier may be given to the vessel, and when the vessel corresponds to the second distance range, no identifier may be given to the vessel. As another example, different identifiers may be given to vessels corresponding to the first distance range, and the same identifier may be given to vessels corresponding to the second distance range. Here, the first distance range may be distance information closer than the second distance range.

According to an exemplary embodiment, an index may be set so that type information with which an image is labeled may depend on distance information of an object.

As an example, when an object corresponds to first distance information, the object may be labeled with first type information, and when the object corresponds to second distance information, the object may be labeled with second type information. FIG. 42 is a set of diagrams relating to an index which is set so that type information depends on distance information according to an exemplary embodiment, and illustrates setting of an index so that whether to distinguish between the upper surface and the side surface of a vessel may vary according to distance information of the vessel. Referring to the upper diagram of FIG. 42, when the distance between a vessel and a port is a certain distance or more (or corresponds to first distance information), a region corresponding to a vessel 4100 in an image 4000 may be labeled as a vessel without distinguishing between the upper surface and the side surface. On the other hand, referring to the lower diagram of FIG. 42, when the distance between a vessel and a port is less than a certain distance (or corresponds to second distance information indicating a shorter distance than the first distance information), a region corresponding to a vessel in an image 5000 may be labeled as an upper surface 5100 or a side surface 5200. Here, the upper surface 5100 and the side surface 5200 may be regions corresponding to the upper surface and the side surface of the vessel, respectively. Also, the upper surface of the vessel may include a deck and a structure installed on the deck (e.g., a bridge, a funnel, and a crane).

As another example, when an object corresponds to first distance information, the object may be labeled with first type information, and when the object corresponds to second distance information, the object may be labeled with both the first type information and second type information. Referring to the upper diagram of FIG. 42, when the distance between the vessel and the port is a certain distance or more (or corresponds to first distance information), the region corresponding to the vessel 4100 in the image 4000 may be labeled as a vessel without distinguishing between the upper surface and the side surface. On the other hand, referring to the lower diagram of FIG. 42, when the distance between the vessel and the port is less than a certain distance (or corresponds to second distance information indicating a shorter distance than the first distance information), a region corresponding to the vessel in the image 5000 may be labeled as at least one of the upper surface 5100 or the side surface 5200, also labeled as the vessel at the same time.

As yet another example, type information with which an image may be labeled when an object corresponds to first distance information may be at least partially different from type information with which the image may be labeled when the object corresponds to second distance information. For example, only when the distance between the vessel and a port is less than a certain distance (or corresponds to first distance information), may a specific object (e.g., a rope, a crane) be separately labeled in the image.

Although the method of setting an index so that whether to distinguish between the upper surface and the side surface of a vessel may vary according to distance information of the vessel has been mainly described above, an index may be set in a way other than the above-described method so that type information with which an image is labeled may depend on distance information of an object.

Hereinafter, some embodiments of a method of labeling distance information in an image are described.

According to an exemplary embodiment, distance information may be labeled on the basis of one region, one line, or one point in an image. Alternatively, distance information may be labeled on the basis of a specific object in an image. A specific object which is a reference of distance information is referred to as a reference object below. As a non-limiting example, a reference object may be a vessel, a quay, a geographical feature, or the like. Alternatively, a reference object may be an object in which a device (e.g., a camera) that generates an image to be labeled is installed.

Figure 43:
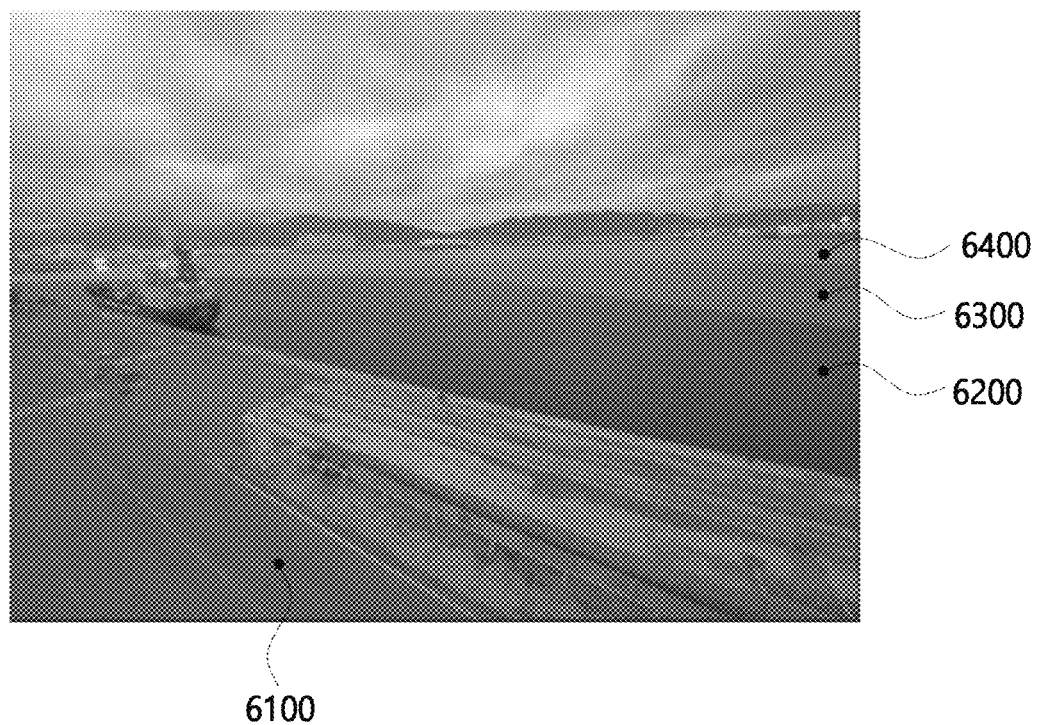
FIG. 43 is a diagram relating to distance information based on a reference object according to an exemplary embodiment.

FIG. 43 is a diagram relating to distance information based on reference objects according to an exemplary embodiment. Referring to FIG. 43, distance information may include a first distance range 6200, a second distance range 6300 which is farther than the first distance range 6200, and a third distance range 6400 which is farther than the second distance range 6300 on the basis of a geographical feature which is a reference object 6100. In this case, a region or pixel of an image corresponding to an object (e.g., a vessel, an obstacle) within the first distance range 6200 may be labeled with a distance index indicating the first distance range 6200. Also, a region or pixel of an image corresponding to an object within the second distance range 6300 and a region or pixel of an image corresponding to an object within the third distance range 6400 may be labeled with a distance index indicating the second distance range 6300 and a distance index indicating the third distance range 6400, respectively.

According to an exemplary embodiment, labeling distance information based on a reference object may denote labeling the distance information based on a part of the reference object. For example, referring to FIG. 43, distance information may be labeled based on a boundary of the geographical feature which is the reference object. In addition, distance information may also be labeled on a region or point of a reference object.

According to an exemplary embodiment, a reference object may be present in a specific region of an image. As an example, a reference object may be present in a lower portion of an image. As another example, a reference object may be present in at least one of upper, lower, left, or right portions of an image.

According to an exemplary embodiment, distance information may include a plurality of distance ranges defined between first and second references in an image. As an example, at least one of the first or second references may be a reference object. As another example, the first reference may be a reference object, and the second reference may be a specific region, a specific line, or a specific point in an image.

According to an exemplary embodiment, distance information may be set for a drivable region (e.g., a sea, a road) in an image. For example, a drivable region may be divided into a plurality of regions, and different pieces of distance information (e.g., short distance, middle distance, long distance) may be set for each of the plurality of regions. In this case, an object located on any one of the plurality of regions may be labeled with a distance index corresponding to distance information set for the any one of the plurality of regions.

According to an exemplary embodiment, the boundary between adjacent distance ranges among the plurality of distance ranges may be set by considering a reference object. For example, the boundary may be set by considering at least one of the shape or boundary of a reference object. Referring to FIG. 43, the boundary between the first distance range 6200 and the second distance range 6300 may be set by considering the boundary of the geographical feature which is the reference object.

According to an exemplary embodiment, when an object is located over a plurality of distance ranges, the object may be labeled with a distance index corresponding to any one of the plurality of distance ranges. For example, when one portion of the object is present within a first distance range and the other portion is present within a second distance range, the whole object may be labeled with a distance index corresponding to a closer one of the first and second distance indices.

Although the case in which distance information includes three distance ranges has been mainly described above, the distance information is not limited thereto. Distance information may include two distance ranges or four or more distance ranges. Also, the setting of distance ranges may vary by considering the installation position, installation direction, specifications (e.g., FOV), etc. of a camera. For example, the setting of distance ranges in a first image may differ from the setting of distance ranges in a second image.

According to an exemplary embodiment, whether to reflect an object in an obstacle map may vary according to distance information of the object. For example, only an object corresponding to a specific distance range may be reflected in an obstacle map. Here, the specific distance range may be a distance range indicating a relatively close distance among a plurality of distance ranges which may correspond to an object.

According to an exemplary embodiment, when an object is present within a first distance range, the object may not be reflected in an obstacle map, and when an object is present within a second distance range, the object may be reflected in the obstacle map. Here, the second distance range may be closer than the first distance range.

According to an exemplary embodiment, a first object present within a first distance range may not be reflected in an obstacle map, and a second object present within a second distance range may be reflected in the obstacle map. Here, the second distance range may be closer than the first distance range.

According to an exemplary embodiment, whether to track an object may vary according to distance information of the object. Here, tracking an object may denote storing and/or monitoring information on an object such as the type, location, direction, velocity, and speed of the object.

According to an exemplary embodiment, when an object is present within a first distance range, the object may not be tracked, and when the object is present within a second distance range, the object may be tracked. Here, the second distance range may be closer than the first distance range.

According to an exemplary embodiment, a first object present within a first distance range may not be tracked, and a second object present within a second distance range may be tracked. Here, the second distance range may be closer than the first distance range.

According to an exemplary embodiment, location information and type information of an object may be acquired together through one model. For example, output data including location information and type information corresponding to a pixel of an image may be acquired by inputting the image to the model. As a non-limiting example, the model may be an artificial neural network.

According to an exemplary embodiment, type information of an object may be acquired through a first model, and location information of the object may be acquired through a second model. For example, an image may be input to the first model to acquire first output data including type information corresponding to a pixel of the image, and at least one of the image or the first output data may be input to the second model to acquire second output data including location information corresponding to the pixel of the image. As a non-limiting example, at least one of the first model or the second model may be an artificial neural network According to an exemplary embodiment, in an inference operation employing a model such as an artificial neural network, at least some of a plurality of pieces of object information outputted from the model may be handled differently from output information outputted from the model such as being changed or ignored on the basis of other pieces of the object information. For example, when an image is inputted to the model to acquire location information and type information, the location information may not be taken into consideration according to the type information.

According to an exemplary embodiment, even when a region or pixel of an image corresponding to a sea in training data is labeled with a distance index corresponding to an undefined distance (e.g., Table 2 or Table 3), in an inference operation, a region or pixel of an image corresponding to a sea may be labeled with a distance index other than the undefined distance (e.g., a short distance, a middle distance, a long distance). In this case, distance information of the region or pixel of the image corresponding to the sea may be considered the undefined distance regardless of which distance index is outputted through inference.

According to an exemplary embodiment, a model (e.g., an artificial neural network) which outputs information on at least one of the bow or stern of a vessel may be provided. For example, the model may receive an image and output location information of at least one of the bow or stern of a vessel included in the image. Here, the model may output the location information by displaying at least one of the bow or stern in the image. Alternatively, the model may output coordinate values corresponding to at least one of the bow or stern in the image.

According to an exemplary embodiment, the model which outputs information on at least one of the bow or stern of a vessel may be trained with training data including an input image and location information of at least one of the bow or stern of a vessel included in the input image. For example, the model may be trained on the basis of output data outputted from the model receiving the input image and the location information included in the training data.

According to an exemplary embodiment, a model which outputs information on a side line of a vessel may be provided. For example, the model may receive an image and output information on a side line of a vessel included in the image. Here, the model may output the information on the side line by displaying the side line in the image. Alternatively, the model may output the information on the side line by displaying one or more points corresponding to the side line in the image. Alternatively, the model may output coordinate values corresponding to one or more points corresponding to the side line in the image.

According to an exemplary embodiment, the model which outputs information on a side line of a vessel may be trained with training data including an input image and information on a side line included in the image. For example, the model may be trained on the basis of output data outputted from the model receiving the input image and the information on the side line included in the training data.

According to an exemplary embodiment, a model which outputs an angle between a plurality of objects may be provided. For example, the model may receive an image and output the angle between a plurality of objects included in the image. As an example, the angle between a plurality of objects may be the angle between a vessel and a quay (or a geographical feature, a land). As another example, the angle between a plurality of objects may be the angle between a vessel and another vessel.

According to an exemplary embodiment, the model which outputs the angle between a plurality of objects may be trained with training data including an input image and the angle between a plurality of objects included in the input image. For example, the model may be trained on the basis of output data outputted from the model receiving the input image and the angle included in the training data.

According to an exemplary embodiment, a model which converts an image into a bird's eye view may be provided. For example, the model may receive a perspective-view image and output a bird's-eye view image.

According to an exemplary embodiment, the model which converts an image into a bird's eye view may be trained with training data including an input perspective-view image and an image obtained by converting the input image into a bird's eye view. For example, the model may be trained on the basis of output data outputted from the model receiving the input perspective-view image and the image obtained by converting the input image into a bird's eye view.

The methods according to exemplary embodiments may be implemented in the form of program instructions, which are executable by various computer means, and stored in a computer-readable recording medium. The computer-readable recording medium may include program instructions, data files, and data structures independently or in combination. The program instructions stored in the computer-readable recording medium may be specially designed and constructed for the exemplary embodiments or may be well-known to those of ordinary skill in the computer software field. Examples of the computer-readable recording medium may include magnetic media, such as a hard disk, a floppy disk, and a magnetic tape, optical media, such as a compact disc read-only memory (CD-ROM) and a digital versatile disc (DVD), magneto-optical media, such as a floptical disk, and hardware devices, such as a ROM, a random access memory (RAM), and a flash memory, which are specifically constructed to store and execute program instructions. Examples of the program instructions include high-level language code executable by a computer using an interpreter or the like as well as machine language code made by a compiler. The hardware devices may be configured to operate as one or more software modules or vice versa to perform operations of the exemplary embodiments.

According to exemplary embodiments of the present invention, it is possible to sense surroundings using a neural network which performs image segmentation.

According to exemplary embodiments of the present invention, it is possible to train a neural network for situation awareness.

Effects of the present invention are not limited to the effects described above, and other effects that are not mentioned above may be clearly understood by those of ordinary skill in the art to which the present invention pertains from this specification and the appended drawings.

Since various substitutions, modifications, and variations can be made from the above-described present invention without departing from the technical spirit of the present invention by those of ordinary skill in the art, the present invention is not limited to the above-described embodiments or the accompanying drawings. Also, the exemplary embodiments described herein are not separately applied, and all or some of the exemplary embodiments may be selectively combined so that various modifications can be made. Further, operations constituting each exemplary embodiment may be used separately from or in combination with operations constituting another exemplary embodiment.

What is claimed is:

1. A method for generating a segmentation image, the method comprising:
    obtaining a target maritime image generated from a camera, wherein the camera is installed on a port or a vessel, and the target maritime image represents a target object; and
    generating a target segmentation image using the target maritime image and a neural network,
    wherein the neural network is trained to output a segmentation image in response to an input image,
    wherein, in the segmentation image, pixels in an area corresponding to an object represented in the input image are assigned a value corresponding to the object,
    wherein the value is selected from identification values including at least a first value, a second value, and a third value,
    wherein the first value corresponds to a water surface, the second value corresponds to a first object at a first distance range, and the third value corresponds to the first object at a second distance range different from the first distance range,
    wherein the first distance range is closer than the second distance range,
    wherein, in the segmentation image, different identifiers are assigned to each of objects corresponding to the second value.
2. The method of claim 1, wherein the target maritime image represents a plurality of target objects, and wherein the method comprises:
    distinguishing the plurality of target objects based on target identifiers corresponding to each of the plurality of target objects in the obtained target segmentation image.
3. The method of claim 2, wherein, in the segmentation image, the object corresponding to the third value is assigned an identifier different from the identifier assigned to the object corresponding to the second value.
4. The method of claim 3,
    wherein, in the segmentation image, the identifiers assigned to the objects corresponding to the third value are the same.
5. The method of claim 1,
    wherein the identification values include at least a fourth value and a fifth value,
    wherein the fourth value is corresponding to a second object at the first distance range and the fifth value corresponding to the second object at the second distance range, and
    wherein the second object is of a different type than the first object.
6. The method of claim 5, wherein the method comprises:
    determining a type of the target object based on the value corresponding to the target object in the obtained segmentation image.
7. The method of claim 5,
    wherein the first object is a first type vessel, and
    wherein the second object is a second type vessel.
8. The method of claim 1,
    wherein the identification values include at least a sixth value,
    wherein the sixth value is corresponding to the first object at a third distance range, and
    wherein the third distance range is greater than the first distance range and the second distance range.
9. The method of claim 1,
    wherein the identification values include at least a seventh value,
    wherein the seventh value corresponding to a rope,
    wherein the target maritime image represents a target rope, and
    wherein the method comprises:
    determining whether the target object is moored based on a value corresponding to the target rope in the obtained segmentation image.
10. The method of claim 1,
    wherein the identification values include at least an eighth value, and
    wherein the eighth value corresponding to a buoy.
11. A non-transitory computer-readable storage medium storing instructions thereon, the instructions when executed by a processor cause the processor to:
    obtain a target maritime image generated from a camera, wherein the camera is installed on a port or a vessel, and the target maritime image represents a target object; and
    generate a target segmentation image using the target maritime image and a neural network,
    wherein the neural network is trained to output a segmentation image in response to an input image,
    wherein, in the segmentation image, pixels in an area corresponding to an object represented in the input image are assigned a value corresponding to the object,
    wherein the value is selected from identification values including at least a first value, a second value, and a third value, wherein the first value corresponds to a water surface, the second value corresponds to a first object at a first distance range, and the third value corresponds to the first object at a second distance range different from the first distance range, wherein the first distance range is closer than the second distance range, wherein, in the segmentation image, different identifiers are assigned to each of objects corresponding to the second value.

12. A device for situation awareness, the device comprising:
a memory storing a neural network, wherein the neural network is trained to output a segmentation image in response to an input image, wherein, in the segmentation image, pixels in an area corresponding to an object represented in the input image are assigned a value corresponding to the object, wherein the value is selected from identification values including at least a first value, a second value, and a third value, wherein the first value corresponds to a water surface, the second value corresponds to a first object at a first distance range, and the third value corresponds to the first object at a second distance range different from the first distance range, wherein, in the segmentation image, different identifiers are assigned to each of objects corresponding to the second value, and
a controller configured to:
obtain a target maritime image generated from a camera, wherein the camera is installed on a port or a vessel, and the target maritime image represents a target object, and
generate a target segmentation image using the target maritime image and the neural network.

13. The device of claim 12,
wherein the target maritime image represents a plurality of target objects, and
wherein the controller is configured to:
distinguish the plurality of target objects based on target identifiers corresponding to each of the plurality of target objects in the obtained target segmentation image.

14. The device of claim 13, wherein, in the segmentation image, the object corresponding to the third value is assigned an identifier different from the identifier assigned to the object corresponding to the second value.

15. The device of claim 14, wherein, in the segmentation image, the identifiers assigned to the objects corresponding to the third value are the same.

16. The device of claim 12, wherein the identification values include at least a fourth value and a fifth value,
wherein the fourth value is corresponding to a second object at the first distance range and the fifth value corresponding to the second object at the second distance range, and
wherein the second object is of a different type than the first object.

17. The device of claim 16, wherein the controller is configured to:
determine a type of the target object based on the value corresponding to the target object in the obtained segmentation image.

18. The device of claim 16, wherein the first object is a first type vessel, and
wherein the second object is a second type vessel.

19. The device of claim 12, wherein the identification values include at least a sixth value,
wherein the sixth value is corresponding to the first object at a third distance range, and
wherein the third distance range is greater than the first distance range and the second distance range.

20. The device of claim 12, wherein the identification values include at least a seventh value,
wherein the seventh value corresponding to a rope,
wherein the target maritime image represents a target rope, and
wherein the controller is configured to:
determine whether the target object is moored based on a value corresponding to the target rope in the obtained segmentation image.

* * * * *